US012769792B1

(12) United States Patent
Kintali et al.

(10) Patent No.: US 12,769,792 B1
(45) Date of Patent: Oct. 20, 2026

(54) TRANSACTION DENIAL RESOLUTION USING CONDITIONED MULTI-STAGE LANGUAGE MODEL INFERENCE

(71) Applicant: Adonis Technology, Inc., New York, NY (US)

(72) Inventors: Manoj Kintali, East Brunswick, NJ (US); William Bastardi, Miami, FL (US); Shefali Dahiya, New York, NY (US); Qian Shi, Jersey City, NJ (US); Aman Magoon, New York, NY (US); Akash Magoon, New York, NY (US)

(73) Assignee: Adonis Technology, Inc., New York, NY (US)

( * ) Notice: Subject to any disclaimer, the term of this patent is extended or adjusted under 35 U.S.C. 154(b) by 0 days.

(21) Appl. No.: 19/565,263

(22) Filed: Mar. 12, 2026

(51) Int. Cl.
*G06F 16/9032* (2019.01)
*G06F 21/62* (2013.01)

(52) U.S. Cl.
CPC ...... *G06F 16/9032* (2019.01); *G06F 21/6254* (2013.01)

(58) Field of Classification Search
CPC ............................. G06F 16/9032; G06F 21/62
See application file for complete search history.

(56) References Cited

U.S. PATENT DOCUMENTS 11,894,128 B2 2/2024 Streich et al.
11,990,229 B2 5/2024 Gilmore et al.
12,300,392 B2 5/2025 Bate et al.
12,314,745 B1 * 5/2025 Cichy .................... G06N 5/022
12,386,593 B1 * 8/2025 Browder .................. G06F 8/24
2019/0371438 A1 12/2019 Chintamaneni et al.
2020/0160985 A1 * 5/2020 Kusuma ................. G16H 30/40
2022/0044328 A1 2/2022 Ligon
2024/0202520 A1 * 6/2024 Adaboina ................ G06N 3/08
2024/0419702 A1 * 12/2024 Adaboina ........... G06F 16/3329
2025/0111440 A1 * 4/2025 Khashman ............. G06Q 40/08
2025/0165648 A1 * 5/2025 Gomez ............... G06F 21/6254
2025/0182170 A1 * 6/2025 Anderson .............. G06Q 10/10
2025/0245750 A1 7/2025 Heinen et al.
2025/0307277 A1 * 10/2025 Bandugula ............ G06F 16/243
(Continued)

*Primary Examiner* — Jorge A Casanova
(74) *Attorney, Agent, or Firm* — Young Basile Hanlon & MacFarlane, P.C.

(57) ABSTRACT

Structured transaction fields and unstructured text data are transformed according to a unified data schema to generate a unified context representation for a denied transaction. A first prompt including the unified context representation is provided to an artificial intelligence component including a large language model. The artificial intelligence component processes the first prompt and generates a first structured output including a predicted action category from a pre-defined taxonomy, a first confidence score, and a first natural-language justification. A category-specific prompt template is selected from stored templates based on the predicted action category and populated to construct a second prompt. The artificial intelligence component generates a second structured output including a recommended action code from action codes associated with the predicted action category, a second confidence score, and a second natural-language justification. The recommended action code and second natural-language justification are provided to a downstream processing component.

20 Claims, 27 Drawing Sheets

(56) References Cited

U.S. PATENT DOCUMENTS

| | | | | |
|---|---|---|---|---|
| 2025/0356054 | A1* | 11/2025 | Paul | G06F 21/6254 |
| 2025/0357007 | A1* | 11/2025 | Oermann | G06N 3/084 |
| 2026/0004004 | A1* | 1/2026 | Rosales | G06F 16/953 |
| 2026/0010556 | A1* | 1/2026 | Jade | G06F 16/345 |
| 2026/0030378 | A1* | 1/2026 | Gonsalves | G06F 21/6218 |
| 2026/0039635 | A1* | 2/2026 | Ronen | G06F 16/258 |
| 2026/0044555 | A1* | 2/2026 | Kelly | G06F 16/3344 |
| 2026/0057190 | A1* | 2/2026 | Amin | G06F 40/40 |
| 2026/0072971 | A1* | 3/2026 | Kudaisya | G06F 16/338 |
| 2026/0073129 | A1* | 3/2026 | Rahimi | G06F 16/353 |
| 2026/0120191 | A1* | 4/2026 | Khashman | G06Q 40/08 |
| 2026/0147930 | A1* | 5/2026 | Mann | G06F 16/212 |

* cited by examiner

800

TRANSACTION DENIAL RESOLUTION USING CONDITIONED MULTI-STAGE LANGUAGE MODEL INFERENCE

FIELD

The present disclosure relates to artificial intelligence systems, and more particularly to an artificial intelligence system for orchestrating a transactional workflow using a versioned orchestration object.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
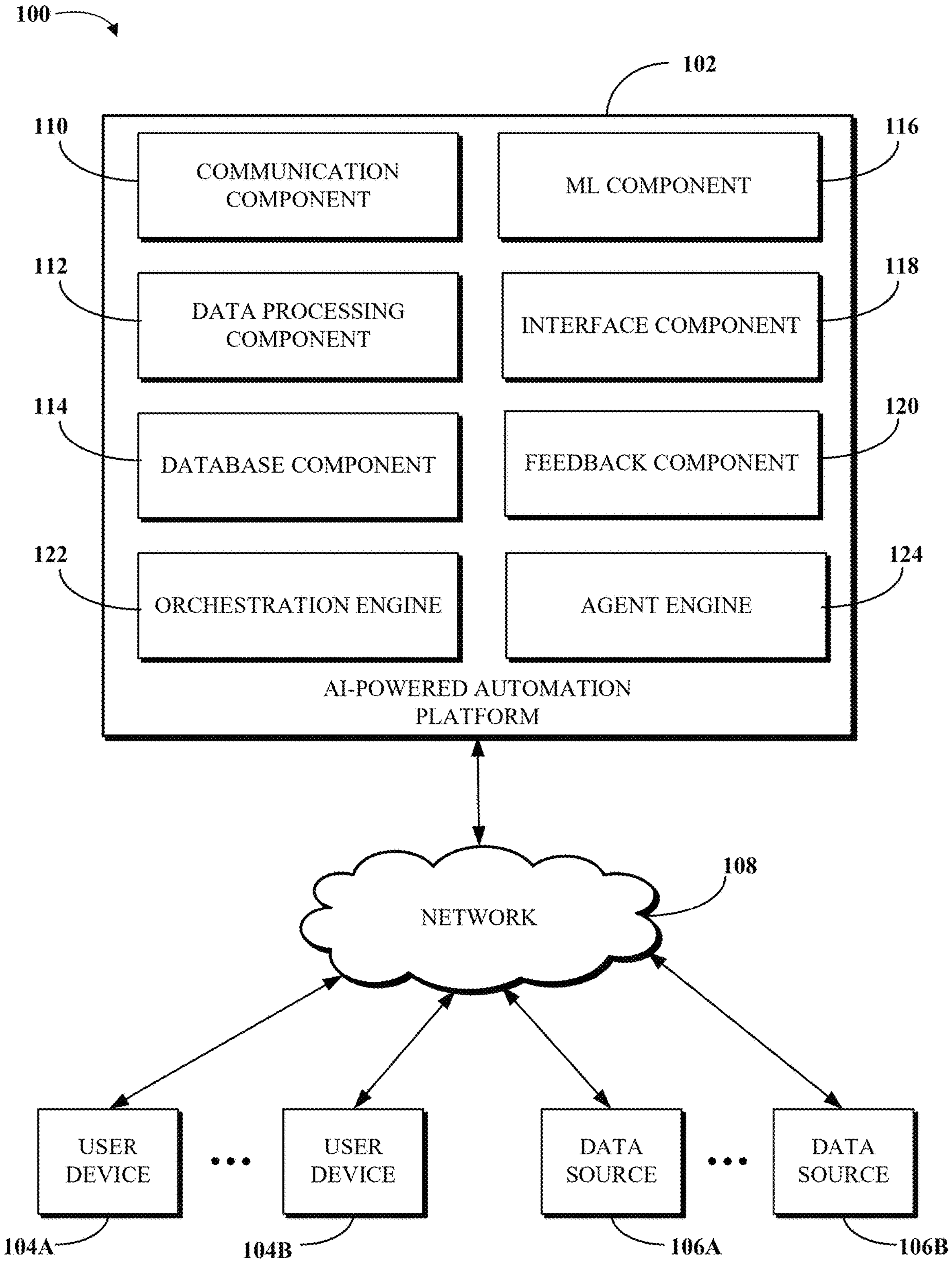
FIG. 1A is a block diagram of an example of an artificial intelligence (AI) system.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Aspects and examples generally include a method, apparatus, network node, system, computer program product, non-transitory computer-readable medium, computing device, and/or processing system as described or substantially described herein with reference to and as illustrated by the drawings and specification.

This disclosure may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, are better understood from the following description when considered in connection with the accompanying figures. Each of the figures is provided for the purposes of illustration and description, and not as a definition of the limits of the claims.

While aspects are described in the present disclosure by illustration to some examples, such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component-based devices (e.g., end-user devices, communication devices, computing devices, industrial equipment, retail/purchasing devices, medical devices, and/or artificial intelligence (AI) devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of signals or data may include one or more components for analog and digital purposes (e.g., hardware components including antennas, radio frequency (RF) chains, power amplifiers, modulators, buffers, processors, interleavers, adders, and/or summers). Aspects described herein may be practiced in a wide variety of devices, components, systems, distributed arrangements, and/or end-user devices of varying size, shape, and constitution.

Several aspects of an AI system will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Automated systems for generating recommendations from multi-source data face a recurring set of technical challenges when the underlying decision space is hierarchically structured and the input data is heterogeneous in format. This disclosure describes these challenges in the context of transaction denial resolution in healthcare revenue cycle environments, where a transaction processing system generates structured transaction fields (such as procedure codes, diagnosis codes, denial reason codes, charge amounts, and identifiers for patients, providers, and insurance carriers) and where additional data sources provide unstructured text data (such as call notes, correspondence records, and policy documents). The structured transaction fields and the unstructured text data originate from different systems, conform to different schemas, and represent different modalities of information. A recommendation system operating in this environment must ingest data from these disparate sources, transform and unify that data into a representation suitable for machine learning inference, and generate a recommendation from a hierarchically organized output space in which high-level categories encompass sets of more granular action codes.

From a data processing perspective, the heterogeneity of the input data presents a technical challenge. The structured transaction fields are typically encoded as discrete values within fixed schemas, such as standardized code sets transmitted via electronic data interchange (EDI) messages, whereas the unstructured text data is free-form natural language with variable length, vocabulary, and structure. Combining these modalities into a single representation that preserves the semantic content of both the structured fields and the unstructured text, while conforming to an input specification compatible with a machine learning inference component, involves a transformation operation that maps data from multiple source schemas into a unified data schema. Without such a transformation, an inference component would need to process raw inputs in their native heterogeneous formats, increasing input preprocessing complexity and reducing the consistency of downstream inference results.

From an inference architecture perspective, the hierarchically structured output space presents a distinct technical challenge. In transaction denial resolution, the remedial action space is organized into approximately twelve high-level action categories (such as resubmission, documentation submission, reconsideration, formal appeal, claim correction, coverage verification, secondary billing, patient responsibility transfer, timely filing response, payment review, case closure, and follow-up scheduling), and within each category there are multiple specific action codes that specify a particular remedial step. This hierarchical structure means that the total number of possible action codes across all categories may be large, but the number of action codes within any single category is comparatively small.

A single-stage inference architecture that attempts to predict a specific action code directly from the full input context must operate over the entire flattened action code space. This presents a well-recognized limitation in machine learning classification: when the label space is high-dimensional and hierarchically organized, a model tasked with predicting across the full space must simultaneously learn both coarse-grained distinctions (which category of action is appropriate) and fine-grained distinctions (which specific action code within that category is appropriate). The coarse-grained and fine-grained distinctions depend on different features of the input and may benefit from different learned representations. A single model attempting to learn both levels of distinction may produce degraded prediction accuracy relative to an architecture that decomposes the problem along the hierarchical boundary, because the model's learned representations must serve two competing objectives and cannot specialize for either. Additionally, a single-stage model that produces an incorrect action code provides no intermediate output indicating whether the error originated from misidentification of the action category or from misselection of the action code within a correctly identified category, limiting the ability to diagnose and correct systematic inference failures.

Prior multi-model approaches have attempted to decompose similar problems into separate inference stages, but have done so using independent models that do not share state between stages. For example, one approach uses a first model to estimate a likelihood score and a second model to identify a corrective action, but the second model does not receive the first model's prediction, confidence assessment, or reasoning as input. The second model therefore cannot condition its output on the rationale produced by the first model. This lack of inter-stage conditioning is an architectural limitation: because the downstream model operates without knowledge of the upstream model's inference state, it cannot adjust its prediction based on the upstream model's confidence level or the specific features of the input that the upstream model identified as most relevant. Furthermore, these prior multi-model approaches typically operate on structured features and do not incorporate unstructured text data, limiting the input context available for inference.

Rule-based systems provide an alternative approach but are constrained by their inability to process unstructured input data. These systems map combinations of structured field values (such as denial reason codes and transaction attributes) to predetermined outputs using static rule sets. Because the rules operate on discrete structured fields, the systems cannot incorporate unstructured text context that may contain information bearing on the correct output. Rule-based systems are further limited by the fixed nature of their rule sets, which do not adapt to novel input patterns that fall outside predefined rules.

Implementations of this disclosure address problems such as these by providing a method and system for generating recommendations for denied transactions using a two-stage conditioned inference architecture operating on a unified context representation generated from heterogeneous multi-source data. An AI system (which may also be referred to as an AI-powered automation platform, a distributed computing system, or a cloud computing system) may be configured to receive structured transaction fields from a transaction processing system and unstructured text data from at least one additional data source, transform the received data according to a unified data schema to generate a unified context representation, and process the unified context representation through a two-stage inference pipeline in which the second stage is explicitly conditioned on the output and reasoning of the first stage. The AI system may include an orchestration engine configured to manage and coordinate the inference pipeline, a database component configured to store unified context representations and a plurality of category-specific prompt templates, an ML component (which may also be referred to as an artificial intelligence component or a machine learning inference system) comprising at least one large language model, a prompt engine configured to construct prompts by assembling context data with prompt templates retrieved from the database component, an interface component configured to provide user-facing services through an application service component, a communication component configured to manage information flow between the AI system and external systems including user devices and data sources, a feedback component containing an ML training component configured to support continuous improvement of the system, and a downstream processing component configured to execute or route recommended actions. The two-stage architecture decomposes the hierarchical classification problem along its natural category boundary: a first inference operation classifies the input into one of the high-level action categories, and a second inference operation, explicitly conditioned on the first-stage output and constrained to the action codes within the selected category, determines the specific action code. This decomposition reduces the output dimensionality at each stage and may facilitate each stage's learned representations specializing for its respective level of the hierarchy.

The method begins with the construction of a unified context representation for a denied transaction. The unified context representation (which may also be referred to as an assembled context object, a normalized claim context, or a consolidated data representation) may be configured to combine structured transaction fields obtained from a transaction processing system and unstructured text data obtained from at least one additional data source into a format suitable for input to the ML component. The communication component may receive data from the transaction processing system and the additional data sources, and a data processing component may perform transformation operations to structure the received data according to a unified data schema. The transformation operations may map structured transaction fields from their native schema representations into a target schema defined by the unified data schema, and may segment, tokenize, or otherwise preprocess unstructured text data for inclusion alongside the structured fields. The unified context representation may be stored in the database component. The structured transaction fields may include, but are not limited to, a denial reason code identifying the carrier's stated basis for the denial, a transaction identifier uniquely identifying the claim, a timestamp indicating when the claim was submitted or denied, and a party identifier identifying the patient, provider, or carrier associated with the transaction. In some implementations, the structured transaction fields may be obtained from an electronic data interchange message. The unstructured text data may include at least one of call notes recording the substance of conversations with carrier representatives, correspondence records documenting written communications regarding the claim, or policy documents specifying the carrier's adjudication rules and requirements. In some implementations, the method may further include retrieving one or more payer policy documents from a document repository and incorporating relevant policy content into the unified context representation. In some implementations, the policy content may be retrieved using a retrieval-augmented generation technique in which the policy documents are indexed as vector embeddings and relevant passages are retrieved at runtime based on semantic similarity to the claim context.

In some implementations, the unified context representation may further include one or more historical transaction examples retrieved via a similarity search over a corpus of previously resolved transactions. The similarity search may identify past transactions sharing characteristics with the current denied transaction (such as the same carrier, similar denial reason codes, comparable procedure codes, or analogous documentation requirements) that were successfully resolved through known remedial actions. These historical examples may be incorporated into the first prompt as few-shot conditioning examples, providing the ML component with concrete precedents to inform its inference.

Once the unified context representation is assembled, the method proceeds to a first inference stage. The prompt engine constructs a first prompt comprising the unified context representation and provides the first prompt as input to the ML component comprising at least one large language model. In some implementations, the ML component may be hosted within a secure computing environment that enforces data residency and access control policies, such that sensitive data within the unified context representation does not leave a controlled infrastructure boundary during processing. The ML component processes the first prompt and generates a first structured output comprising a predicted action category selected from a predefined taxonomy of action categories, a first confidence score, and a first natural-language justification explaining why the predicted action category was selected. Because the first inference stage operates over the taxonomy of action categories rather than the full space of action codes, the output dimensionality of this stage is limited to the number of categories in the taxonomy.

The predefined taxonomy of action categories (which may also be referred to as a hierarchical action classification scheme, a remedial action ontology, or a categorical decision framework) defines the set of high-level remedial strategies available for denied transactions. In some implementations, the predefined taxonomy may include categories such as resubmission, documentation submission, reconsideration, formal appeal, claim correction, coverage verification, secondary billing, patient responsibility transfer, timely filing response, payment review, case closure, and follow-up scheduling. Each category encompasses a set of more granular action codes that specify the particular remedial step to be taken.

The first structured output provides a machine-readable representation of the first-stage inference result. In some implementations, the first structured output and the second structured output described below may each be formatted as a machine-readable data object comprising key-value pairs. In some implementations, the machine-readable data object may be a JSON object. The first confidence score represents the ML component's assessment of the probability that the predicted action category is the correct high-level classification for the denied transaction. The first natural-language justification provides a human-readable and machine-parseable explanation of the inference that led to the category selection, identifying which elements of the unified context representation most strongly support the selected category. The first natural-language justification serves a dual function in the architecture: it provides an auditable record of the first-stage inference, and it serves as conditioning input to the second inference stage, grounding the second stage's inference in the specific features and reasoning identified by the first stage.

After the first structured output is obtained, the method proceeds to a second inference stage that is conditioned on the output of the first stage. The prompt engine selects, based on the predicted action category, a category-specific prompt template from a plurality of category-specific prompt templates (which may also be referred to as domain-tailored inference templates, specialized query structures, or action-class-specific reasoning frameworks) stored in the database component. Each category-specific prompt template may correspond to a respective action category in the predefined taxonomy. The prompt engine populates the selected category-specific prompt template with the unified context representation, the predicted action category, and the first natural-language justification to construct a second prompt. In some implementations, the second prompt may further include the first confidence score. The category-specific prompt template approach constrains the second inference stage in two ways: the template directs the ML component toward the set of action codes associated with the predicted action category (rather than the full action code space), and the template may include category-specific instructions that focus the ML component's processing on the features and distinctions most relevant to the selected category. For example, a category-specific prompt template associated with a documentation submission category may direct the ML component to evaluate which specific documents are absent or insufficient based on the context data, whereas a category-specific prompt template associated with a claim correction category may direct the ML component to identify which specific transaction fields contain errors.

The ML component processes the second prompt and generates a second structured output comprising a recommended action code selected from a set of action codes associated with the predicted action category, a second confidence score, and a second natural-language justification. Because the set of valid action codes is constrained to those associated with the predicted action category, the second-stage inference operates over a reduced output space relative to a single-stage architecture that would need to predict across the full set of all action codes in all categories. This output space reduction may facilitate improved prediction accuracy at the second stage by permitting the ML component's inference to focus on distinguishing among a smaller set of candidates. Additionally, because the second prompt includes the first natural-language justification as conditioning input, the second-stage inference is grounded in the specific features of the unified context representation that the first stage identified as most relevant to the category selection, providing the second stage with an explicit signal regarding which aspects of the input context bear on the fine-grained action code determination.

In some implementations, the ML component may comprise a single large language model that processes both the first prompt and the second prompt. In some implementations, the ML component may comprise a first large language model that processes the first prompt and a second large language model that processes the second prompt, where the first and second large language models may differ in architecture, capacity, or optimization characteristics.

The method provides the recommended action code and the second natural-language justification to a downstream processing component for further processing. In some implementations, the orchestration engine may coordinate the flow of data between the prompt engine, the ML component, and the downstream processing component, and may create versioned records of each stage's output to maintain a complete audit trail of the recommendation process. The downstream processing component may surface the recommendation through the interface component to a user device via the application service component, route the recommendation to a human reviewer, or initiate automated execution of the recommended action depending on the confidence and risk profile of the recommendation.

In some implementations, the method may include confidence-based routing. The method may determine whether the second confidence score satisfies a confidence threshold. When the second confidence score satisfies the confidence threshold, the method may automatically initiate execution of the recommended action code by the downstream processing component. When the second confidence score does not satisfy the confidence threshold, the method may route the recommended action code and the second natural-language justification to a human review queue, where a human reviewer may evaluate the recommendation via a user device and provide an indication of whether the recommended action code was accepted or overridden. This confidence-based routing mechanism may facilitate autonomous execution of high-confidence recommendations while preserving human oversight for ambiguous or low-confidence cases.

In some implementations, the method may include a feedback mechanism for continuous improvement. The feedback component may obtain a resolution outcome indicating whether the denied transaction was subsequently approved, partially approved, or written off after the recommended action was taken. The resolution outcome may be stored in the database component in association with the recommended action code, creating a record linking the claim context, the recommendation, and the eventual financial result. In some implementations, the ML training component within the feedback component may use the resolution outcome as a training signal to refine parameters of the ML component. The parameters may be refined by adjusting prompt templates based on patterns in which recommendations led to successful resolutions, or by fine-tuning model weights using historical pairs of claim contexts, recommended actions, and resolution outcomes.

In some implementations, the method may further include receiving, from a human reviewer via a user device, an indication of whether the recommended action code was accepted or overridden, and storing the indication in the feedback component in association with the denied transaction. This adherence data, combined with resolution outcome data, provides a rich feedback signal that captures both whether human experts agree with the system's recommendations and whether following or overriding the recommendations leads to better financial outcomes.

In some implementations, the method may include data protection measures applied prior to inference. The method may, prior to constructing the first prompt, de-identify sensitive data within the unified context representation by replacing sensitive data elements with surrogate identifiers. After obtaining the second structured output, the method may re-identify the sensitive data by replacing the surrogate identifiers with the corresponding sensitive data elements. This de-identification and re-identification pipeline may permit the ML component to perform inference without exposure to individually identifiable information, while preserving the ability to associate the recommendation output with the original transaction data for downstream processing and record-keeping.

In some implementations, the method may include governance logging. The method may log the first structured output and the second structured output to a governance registry (which may also be referred to as an audit repository, a model performance tracking system, or a compliance monitoring infrastructure). The governance registry may be stored within or associated with the database component and may be configured to track model performance metrics over time, including accuracy rates, confidence calibration, override frequency, resolution outcomes, and potential distributional shifts in the types of claims or denials being processed. Each logged record may include the prompt submitted to the ML component, the output received, the model version used, and the prompt template version used, providing a comprehensive audit trail that supports compliance, retrospective analysis, and systematic improvement.

The two-stage conditioned inference architecture disclosed herein may provide several technical advantages over certain other approaches. By decomposing the recommendation task into two hierarchically coupled inference steps, the architecture may convert a high-dimensional classification problem (e.g., selecting one of fifty or more possible action codes) into two lower-dimensional problems: selecting one of a plurality of action categories (e.g., approximately twelve), and then selecting one of a handful of action codes within that category. This decomposition may improve accuracy at both levels by allowing each stage to focus on a more tractable decision space. The conditioning mechanism, in which the second stage receives and is grounded in the first stage's reasoning, may preserve coherence between the strategic and tactical decisions, thereby reducing the risk that the specific action code contradicts or is misaligned with the rationale for the action category. The intermediate structured output from the first stage may provide an independently valuable artifact for human review, confidence-based routing, and/or audit purposes, which may permit the system to detect and route ambiguous cases before the second stage executes. The category-specific prompt template architecture may provide modularity, wherein adding new action categories to the taxonomy may involve adding a new template to the prompt engine and updating the first-stage prompt, without necessarily disturbing the prompts for existing categories. Furthermore, the structured output format at both stages, which may include predictions, confidence scores, and natural-language justifications, may provide dual-level auditability that may be substantially richer than what certain single-stage approaches may offer, and may support the compliance and governance requirements of healthcare transaction processing environments.

FIG. 1A is a block diagram of an example of an AI system 100, which can be, or include, a distributed computing system, a cloud computing system, and/or a clustered computing system, among other examples. As shown, the AI system 100 includes an AI-powered automation platform 102, user devices (shown as user device 104A and user device 104B), and data sources (shown as data source 106A and data source 106B), communicatively coupled by a network 108. The AI system 100 may be implemented using a hardware environment that includes computer system components, such as general-purpose computers, dedicated computer systems, peripheral devices, components, and modules, and/or a combination thereof. In some implementations, the AI system 100 may be implemented within one or more cloud computing environments, where various components of the AI system 100 may be executed in various configurations, including in parallel. In some implementations, one or more components of the AI system 100 can be implemented using one computing device or a combination of several interconnected computing devices.

The user devices 104A and 104B may include any device that facilitates a user to interact with the AI system 100. The user devices 104A and 104B may include a mobile device, a tablet, a personal computer, a wearable device, or any other computing device. The user devices 104A and 104B may operate a suitable operating system, such as a desktop operating system, a mobile operating system, or a web browser. In some implementations, the user devices 104A and 104B may be implemented using one or more computing devices such as the computing device 200 illustrated with respect to FIG. 2.

The data sources 106A and 106B may include one or more computing devices configured to provide electronic data, electronic files, electronic signatures, electronic documents, or any other electronic data to the AI system 100 or to another aspect of the AI system 100. For example, the data sources 106A and 106B may be implemented within one or more cloud computing environments, where various components of the data sources 106A and 106B may be executed in various configurations, including in parallel. In some implementations, one or more components of the data sources 106A and 106B can be implemented using one computing device or a combination of several interconnected computing device such as the computing device 200 illustrated with respect to FIG. 2. The data sources 106A and 106B may include a cloud resource, a workstation, an EHR, a practice management system, a clearinghouse service, a payor portal, and/or a financial system, among other examples of data sources 106A and 106B.

The network 108 may be a public communication network (e.g., the Internet, cellular data network, dialup connectivity, etc.), a private communications network (e.g., private LAN, leased line, etc.), or a combination of a public communications network and a private communications network. In some cases, the network 108 may include, and/or may communicate with, any one or more of a Bluetooth network, a near-field communication network, a satellite communication network, a wireless communication network, and/or any other communication network. The network 108 may include any combination of wired and/or wireless networks. The communication over the network 108 can traverse one or more of the Internet, a wide area network (WAN), a metropolitan area network (MAN), a local area network (LAN), a virtual private network (VPN), a wireless local area network (WLAN), a virtual private wireless network (VP), a radio access network, a mobile data network, a power distribution network, a satellite network, a plain old telephone system (POTS), and/or a cellular or third generation (3G) or fourth generation (4G) data network, among other examples, and/or any combination of the above.

As shown, the AI-powered automation platform 102 includes a communication component 110, a data processing component 112, a database component 114, an ML component 116, an interface component 118, a feedback component 120, an orchestration engine 122, and an agent engine 124. In some implementations, one or more of the communication component 110, the data processing component 112, the database component 114, the ML component 116, the interface component 118, the feedback component 120, orchestration engine 122, and the agent engine 124 may be implemented using one computing device or a combination of several interconnected computing device such as the computing device 200 illustrated with respect to FIG. 2. In some implementations, two or more of the communication component 110, the data processing component 112, the database component 114, the ML component 116, the interface component 118, the feedback component 120, orchestration engine 122, and the agent engine 124 may be combined into a single component.

The AI-powered automation platform 102 may process and analyze healthcare revenue cycle data to provide actionable insights and automate various tasks. The platform 102 may be implemented using cloud computing infrastructure in some implementations, facilitating scalability and flexibility. In some implementations, the platform 102 could be deployed on-premises or in a hybrid cloud configuration, depending on the specific needs and regulatory requirements of healthcare providers.

The communication component 110 may manage the flow of information between the platform and external systems, including user devices 104A and 104B, and data sources 106A and 106B. This component may implement various communication protocols and data exchange standards specific to healthcare IT, such as HL7 FHIR or X12 EDI. In some implementations, the communication component 110 may also support blockchain technology for enhanced data integrity and traceability in healthcare transactions.

The data processing component 112 may be responsible for ingesting, cleaning, and transforming the raw data received from various sources into a standardized format suitable for analysis. This component may employ data integration techniques, including probabilistic matching algorithms, to reconcile inconsistencies across different data sources. The data processing component 112 may utilize parallel processing frameworks, such as Apache Spark, to handle large volumes of healthcare data efficiently. In some implementations, this component may also incorporate NLP capabilities to extract meaningful information from unstructured clinical notes or payor correspondence.

The database component 114 may provide a unified data repository for the AI system 100, storing both raw and processed data in a structured manner. This component may utilize a combination of relational and NoSQL databases to accommodate the diverse types of healthcare data encountered in revenue cycle management. The database component 114 may implement data modeling techniques to represent complex relationships between various entities, such as patients, claims, providers, and payors. In some implementations, the database component 114 may incorporate a data lake architecture to store and analyze large volumes of unstructured and semi-structured data.

The ML component 116 may be configured to leverage any number of various ML algorithms to detect patterns, anomalies, or trends in healthcare revenue cycle data, among other examples. ML is a subset of AI that focuses on the development of algorithms that allow computers to learn from data inputs and make predictions or decisions without explicit programming. ML leverages large datasets to identify patterns, make decisions, and improve over time based on experience. ML focuses on creating systems that can learn from data, adapt to new inputs, and generate predictions or actions.

For example, an ML component may be or include one or more ML models, ML algorithms, and/or ML systems including combinations of ML algorithms and ML models. An ML component may be implemented on any number of different hardware devices and may include one or more ML models. ML is a field of study that gives computers the ability to perform certain tasks without being explicitly programmed to perform those tasks. In traditional computing, a programmer would encode instructions (e.g., to solve a quadratic equation using the quadratic formula), and the computer would perform those exact instructions. In contrast, in ML, a computer can be provided with examples and be trained to perform a task such as prediction or classification, without the programmer encoding explicit instructions for the task. ML explores the study and construction of algorithms, also referred to herein as tools, models, and/or components, which may learn from existing data and make predictions about new data. Such ML tools operate by building a model from example training data in order to make data-driven predictions or decisions expressed as outputs or assessments. Although example embodiments are presented with respect to a few ML models, the principles presented herein may be applied to other ML models. In some example embodiments, different ML models may be used. ML models may include, for example, K-means clustering models, linear regression models, logistic regression (LR) models, Naive-Bayes models, random forest regression models, gradient boost models, neural networks (NN), matrix factorization models, LLMs, and/or support vector machines (SVMs), among other examples.

The ML component 116 may employ supervised learning techniques to predict claim denials, unsupervised learning for anomaly detection, and reinforcement learning to optimize billing workflows. The ML component 116 may utilize ensemble methods, combining multiple models to improve accuracy and robustness. In some implementations, the ML component 116 may also incorporate deep learning techniques, such as recurrent neural networks (RNNs), to analyze sequential data in claims processing.

The interface component 118 may provide the user-facing layer of the AI system 100, delivering insights and functionalities through intuitive dashboards, reports, and interactive visualizations. This component may implement responsive design principles to facilitate a consistent user experience across various devices and screen sizes. The interface component 118 may utilize data visualization libraries, such as D3.js, to create dynamic and interactive representations of complex revenue cycle metrics. In some implementations, the interface component 118 could incorporate augmented reality features to provide immersive data exploration experiences for healthcare finance professionals.

The feedback component 120 may contribute to the continual improvement of the AI system 100 by capturing feedback that may include, for example, user interactions, preferences, or manual corrections, among other examples. The feedback component 120 may implement mechanisms to collect both explicit feedback (e.g., user ratings) and implicit feedback (e.g., usage patterns) to refine the system's algorithms and recommendations. The feedback component 120 may employ A/B testing frameworks to evaluate the effectiveness of different features or UI elements. In some implementations, this component may utilize sentiment analysis techniques to gauge user satisfaction and identify areas for improvement based on natural language feedback.

The orchestration engine 122 may be configured to manage and coordinate transactional workflows within the AI system 100. The orchestration engine 122 may facilitate these functions by creating and manipulating a versioned orchestration object for each transactional workflow, which may be maintained as a data structure within the database component 114. In some implementations, the orchestration engine 122 may be configured to receive state change data from various internal and external sources, such as data sources 106A and 106B or the agent engine 124, and create a new version of the orchestration object in response. Each new version may preserve a complete historical context of the workflow by storing metadata associated with the state change. The orchestration engine 122 may also be configured to apply rule-based logic to the versioned orchestration object to manage workflow progression and, in response to a trigger event, may be configured to invoke the agent engine 124 to execute one or more automated tasks.

The orchestration engine 122 may serve as a coordination hub that manages complex, multi-step workflows across the AI system 100. In some implementations, the orchestration engine 122 may maintain a comprehensive view of all active workflows, tracking their current states, dependencies, and progression criteria. The orchestration engine 122 may implement scheduling algorithms to optimize resource allocation and task sequencing, facilitating efficient workflow progression while respecting priority levels and deadline constraints. The engine may also provide fault tolerance capabilities, automatically handling failures or exceptions by implementing retry mechanisms, alternative execution paths, or escalation procedures when workflows encounter unexpected conditions.

The orchestration engine 122 may utilize event-driven architecture to respond dynamically to changes in workflow conditions or external system states. In some implementations, the orchestration engine 122 may monitor multiple data streams and trigger appropriate actions based on predefined rules or ML-based decision models. The engine may support both synchronous and asynchronous workflow execution patterns, facilitating real-time processing of urgent tasks while managing longer-running background processes. The orchestration engine 122 may also implement workflow templates and reusable components, facilitating healthcare organizations to standardize their processes while maintaining flexibility to customize workflows for specific use cases or regulatory requirements.

In some implementations, the orchestration engine 122 may provide comprehensive audit trails and performance analytics for all managed workflows. The engine may track execution times, resource utilization, success rates, and bottlenecks across different workflow types, facilitating continuous optimization of operational processes. The orchestration engine 122 may also support workflow versioning and rollback capabilities, facilitating organizations to safely deploy new workflow configurations while maintaining the ability to revert to previous versions if issues arise. The engine may integrate with external systems through standardized APIs and may support various workflow definition languages, making it adaptable to different organizational needs and existing technology stacks.

The agent engine 124 may be configured to manage a plurality of software agents and to execute automated tasks based on instructions received from the orchestration engine 122. In some implementations, the agent engine 124 may be configured to deploy various types of agents, including a voice AI agent for performing automated telephone calls, a document management agent for retrieving and transmitting electronic documents, a document creation agent, an appeal status tracking agent for monitoring external systems, or a task assignment engine for managing work queues. The agent engine 124 may be further configured to report the outcomes of these automated tasks to the orchestration engine 122, which may generate new state change data and thereby facilitate a subsequent step in the transactional workflow.

The agent engine 124 may implement a distributed architecture that facilitates scalable deployment and management of software agents across multiple computing environments. In some implementations, the agent engine 124 may utilize containerization technologies to isolate individual agents and facilitate dynamic scaling based on workload demands. The agent engine 124 may incorporate load balancing mechanisms to distribute tasks efficiently among available agents, preventing bottlenecks and facilitating optimal resource utilization. The engine may also implement agent lifecycle management capabilities, including automated deployment, monitoring, health checks, and graceful shutdown procedures. In some implementations, the agent engine 124 may support hot-swapping of agents, facilitating updates or replacements without disrupting ongoing operations.

The agent engine 124 may employ coordination mechanisms to manage interactions between multiple agents working on related tasks. In some implementations, the engine may implement message queuing systems to facilitate asynchronous communication between agents and facilitate reliable task execution even in the presence of temporary failures. The agent engine 124 may utilize state management techniques to track the progress of long-running tasks and facilitate recovery from interruptions. The engine may also incorporate conflict resolution algorithms to handle scenarios where multiple agents attempt to modify the same data or resources simultaneously. In some implementations, the agent engine 124 may implement priority-based scheduling to facilitate that time-sensitive tasks receive appropriate attention while maintaining overall system throughput.

In some implementations, the agent engine 124 may provide monitoring and analytics capabilities to track agent performance and identify optimization opportunities. The engine may collect metrics such as task completion times, success rates, resource consumption, and error frequencies across different agent types and workflows. The agent engine 124 may utilize ML techniques to analyze these metrics and automatically adjust agent configurations or deployment strategies to improve overall system performance. The engine may also implement alerting mechanisms to notify administrators of agent failures, performance degradation, or unusual patterns that may require intervention. In some implementations, the agent engine 124 may support integration with external monitoring and logging systems to provide centralized visibility into agent operations across the entire AI system 100.

Figure 1B:
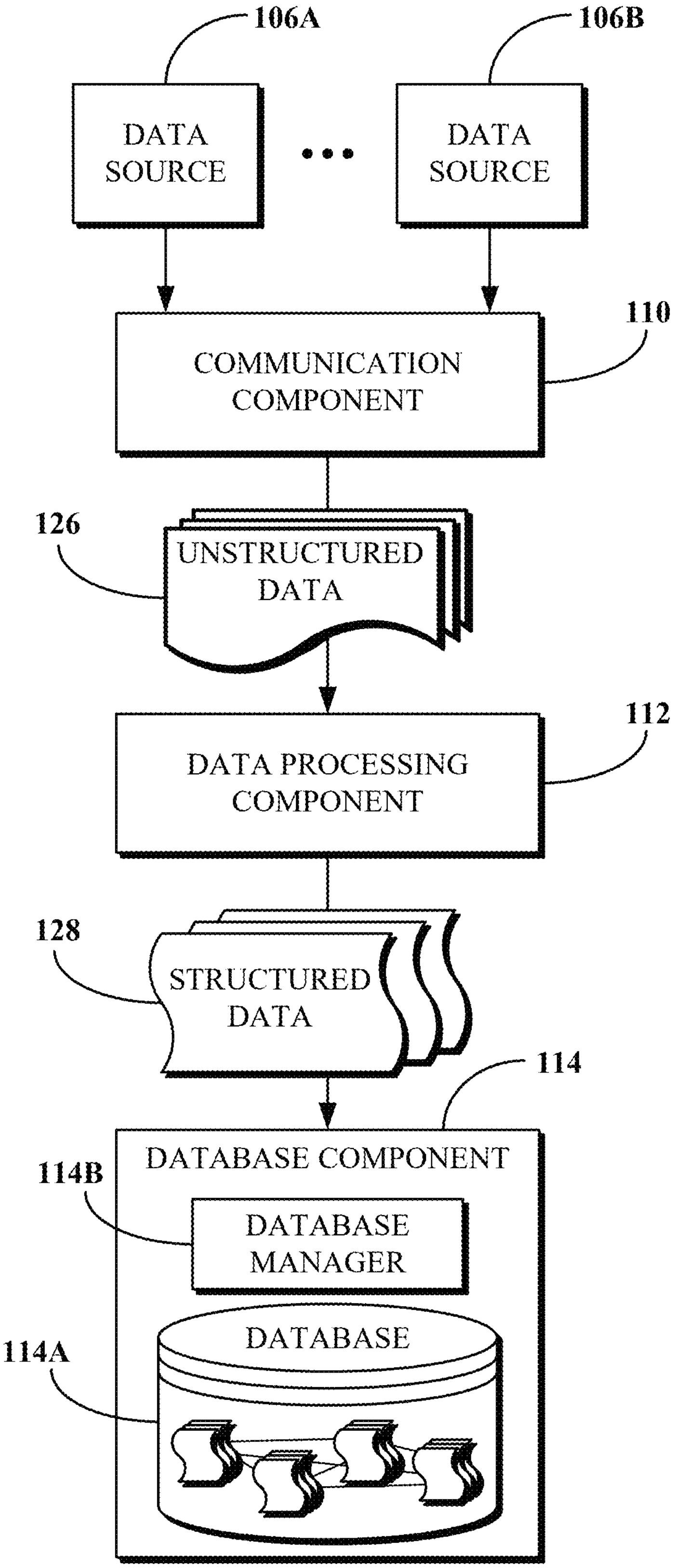
FIG. 1B is a block schematic diagram associated with processing data from disparate data sources.

FIG. 1B illustrates a block schematic diagram associated with processing data from disparate data sources, highlighting the data flow and transformation processes within the AI system 100. The communication component 110 receives data from multiple sources, including data source 106A and data source 106B, and outputs unstructured data 126. This unstructured data may include a mix of structured (e.g., claims data in standardized formats) and unstructured (e.g., clinical notes, denial reasons) information from various healthcare IT systems.

The data processing component 112 takes the unstructured data 126 as input and performs a series of transformations to generate structured data 128. This process may involve data cleaning, normalization, and enrichment tasks tailored to healthcare revenue cycle management. The data processing component 112 may employ entity resolution techniques to reconcile patient and provider information across different systems, ensuring data consistency and accuracy.

The structured data 128 is then passed to the database component 114, which manages its storage and retrieval. The database component 114 includes a database 114A and a database manager 114B that oversees the organization and indexing of data within the database 114A. This architecture may allow for efficient querying and analysis of large-scale healthcare financial data, supporting both real-time operational needs and long-term analytical requirements.

The data flow illustrated in FIG. 1B may be managed by an orchestration engine (e.g., the orchestration engine 122 shown in FIG. 1A). In such an implementation, the ingestion of unstructured data 126 may trigger the orchestration engine to create an initial version of a versioned orchestration object (VOO) for the batch of data being processed. The transformation performed by the data processing component 112 to generate structured data 128 may be an orchestrated step. The successful completion of this transformation and the storage of the structured data 128 in the database 114A may be recorded as a state change, causing the orchestration engine to create a new version of the VOO that contains or references the clean, structured data and preserves a historical record of the transformation process.

Figure 1C:
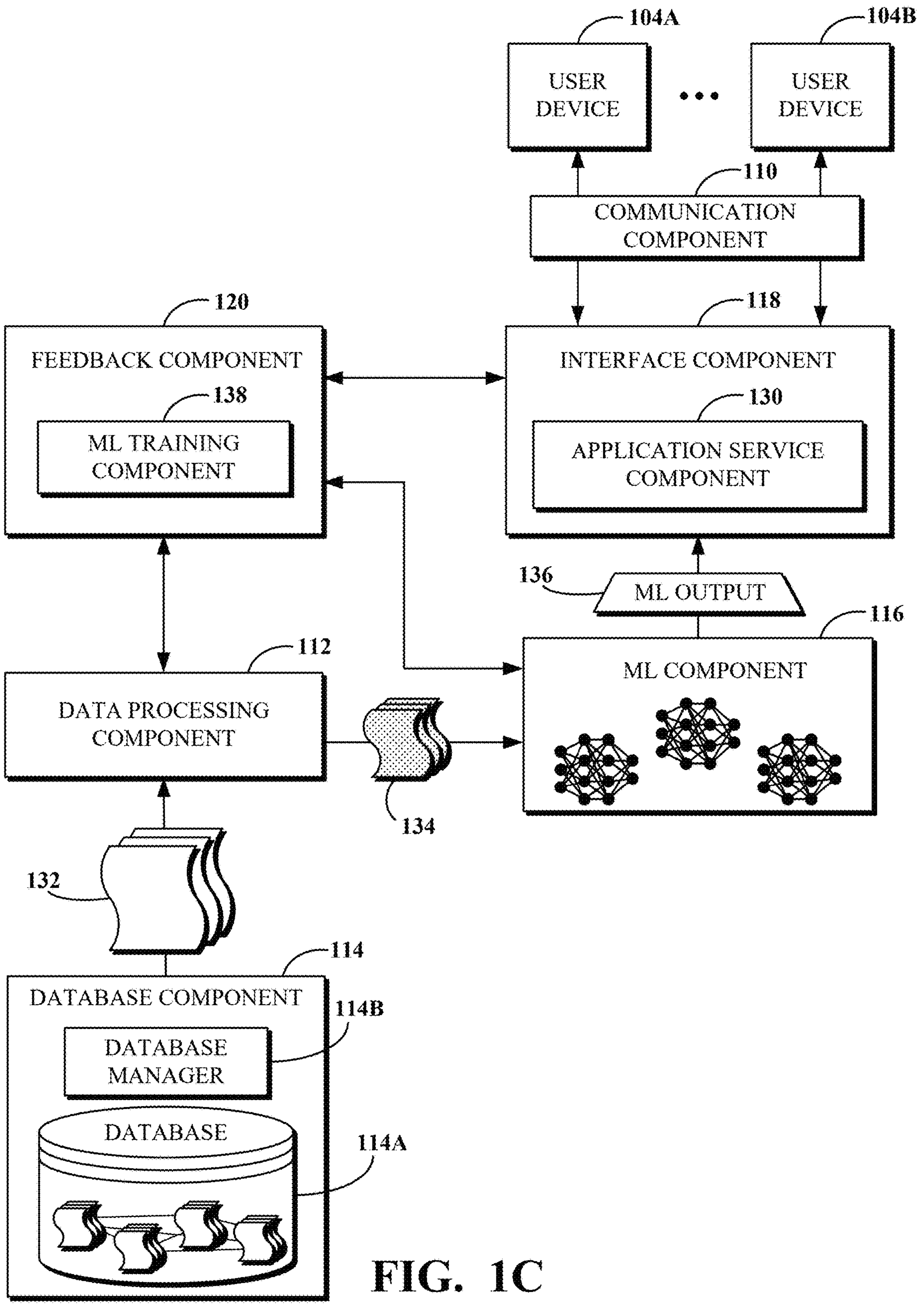
FIG. 1C is a block schematic diagram associated with processing data to provide intelligent informational services.

FIG. 1C is a block schematic diagram associated with processing data to provide intelligent informational services. FIG. 1C provides a more detailed view of the data processing and ML pipeline within the AI system 100. The system interacts with multiple user devices (104A, 104B) through the communication component 110, which interfaces with the interface component 118. The interface component 118 contains an application service component 130, which manages the business logic and user interactions of the AI system.

The data processing component 112 retrieves data 132 from the database component 114 and generates processed data 134. This processed data serves as input for the ML component 116, which applies various ML algorithms to produce ML output 136. The ML output, which may include predictions, anomaly detections, or optimized workflows, is then provided to the application service component 130 for presentation to users.

A feature of the AI system 100 may be its ability to continuously learn and improve. The feedback component 120 contains an ML training component 138 that interacts with both the data processing component 112 and the interface component 118. This feedback loop may enable the system to adapt to changing patterns in healthcare billing and user preferences, enhancing its accuracy and relevance over time.

The ML component 116 may be configured to perform various types of training to enhance its capabilities in healthcare revenue cycle management. In some implementations, the ML component 116 may utilize supervised learning techniques to train models for predicting claim denials, reimbursement amounts, and other metrics. This training process may involve feeding the models large datasets of historical claims data, including features such as patient demographics, diagnosis codes, procedure codes, provider information, and payor details, along with the corresponding outcomes (e.g., approved, denied, partially paid).

To create training datasets, the AI system 100 may aggregate data from multiple healthcare providers across various specialties and geographical regions. This comprehensive dataset may include information from EHRs, practice management systems, clearinghouses, and payor portals. In some cases, the system may employ data augmentation techniques to enhance the quality and quantity of training data. For instance, the AI system 100 may use generative adversarial networks (GANs) to create synthetic medical claims that mimic the characteristics of real claims, helping to balance datasets for rare conditions or uncommon billing scenarios.

The ML component 116 may also implement unsupervised learning algorithms to detect anomalies and patterns in the revenue cycle data without relying on labeled outcomes. These models may be trained on large volumes of unlabeled claims data to identify unusual trends, potential fraud, or emerging issues in payor behavior. The training process for unsupervised models may involve techniques such as clustering, dimensionality reduction, and anomaly detection algorithms like isolation forests or autoencoders.

In some implementations, the ML component 116 may employ reinforcement learning techniques to optimize decision-making processes in revenue cycle management. This training approach may involve creating a simulated environment that mimics the complexities of healthcare billing, where the model learns to make optimal decisions through trial and error. The reinforcement learning models may be trained to maximize revenue capture, minimize denial rates, or optimize resource allocation in billing workflows.

The AI system 100 may implement dynamic retraining mechanisms to ensure that the ML models remain accurate and relevant in the face of changing healthcare regulations and payor policies. One approach to dynamic retraining may involve implementing a sliding window technique, where the system continuously updates the training dataset with the most recent claims data while gradually phasing out older data. This approach may help the models adapt to evolving patterns in claim adjudication and payor behavior.

Another method for dynamic retraining may leverage federated learning techniques, allowing the AI system 100 to learn from data across multiple healthcare providers without directly sharing sensitive patient or claim information. In this approach, model updates may be distributed to individual healthcare providers, who then train the model on their local data and return only the updated model parameters. The system may then aggregate these updates to improve the global model, potentially capturing nuanced patterns that may not be apparent in any single provider's data alone.

The creation of retraining datasets may involve a combination of automated data collection and human-in-the-loop processes. The AI system 100 may automatically gather new claims data, remittance advice, and payor correspondence as they become available. In some implementations, the system may incorporate feedback from human billers and revenue cycle managers, capturing information about successful appeals, coding corrections, and other manual interventions that lead to positive claim outcomes. This feedback may be used to enrich the retraining datasets, helping the models learn from expert knowledge and adapt to complex edge cases.

In some implementations, the ML component 116 may utilize active learning techniques to identify the most informative samples for retraining. This approach may involve selecting claims that the current model is uncertain about or that represent edge cases in the data distribution. For example, if the model consistently misclassifies certain types of claims or struggles with specific payor-provider combinations, these cases may be prioritized in the retraining dataset. The active learning approach may help optimize the retraining process by focusing on the most challenging and informative examples, potentially improving model performance more efficiently than random sampling of new data.

In some implementations, the processes depicted in FIG. 1C may be coordinated by an orchestration engine. The ML output 136 generated by the ML component 116 may be treated as state change data for a transactional workflow. Upon generation of the ML output 136, the orchestration engine may be configured to create a new version of a VOO associated with the relevant transaction or data subject. This new version may store the prediction, classification, or detected anomaly from the ML output 136 as a new attribute or metadata. This process facilitates a comprehensive, versioned audit trail of all analytical insights applied to a given transaction throughout its lifecycle. Furthermore, the feedback captured by the ML training component 138 may trigger the orchestration engine to initiate a model retraining workflow, the completion of which may be recorded in a VOO associated with the system's operational management.

Figure 1D:
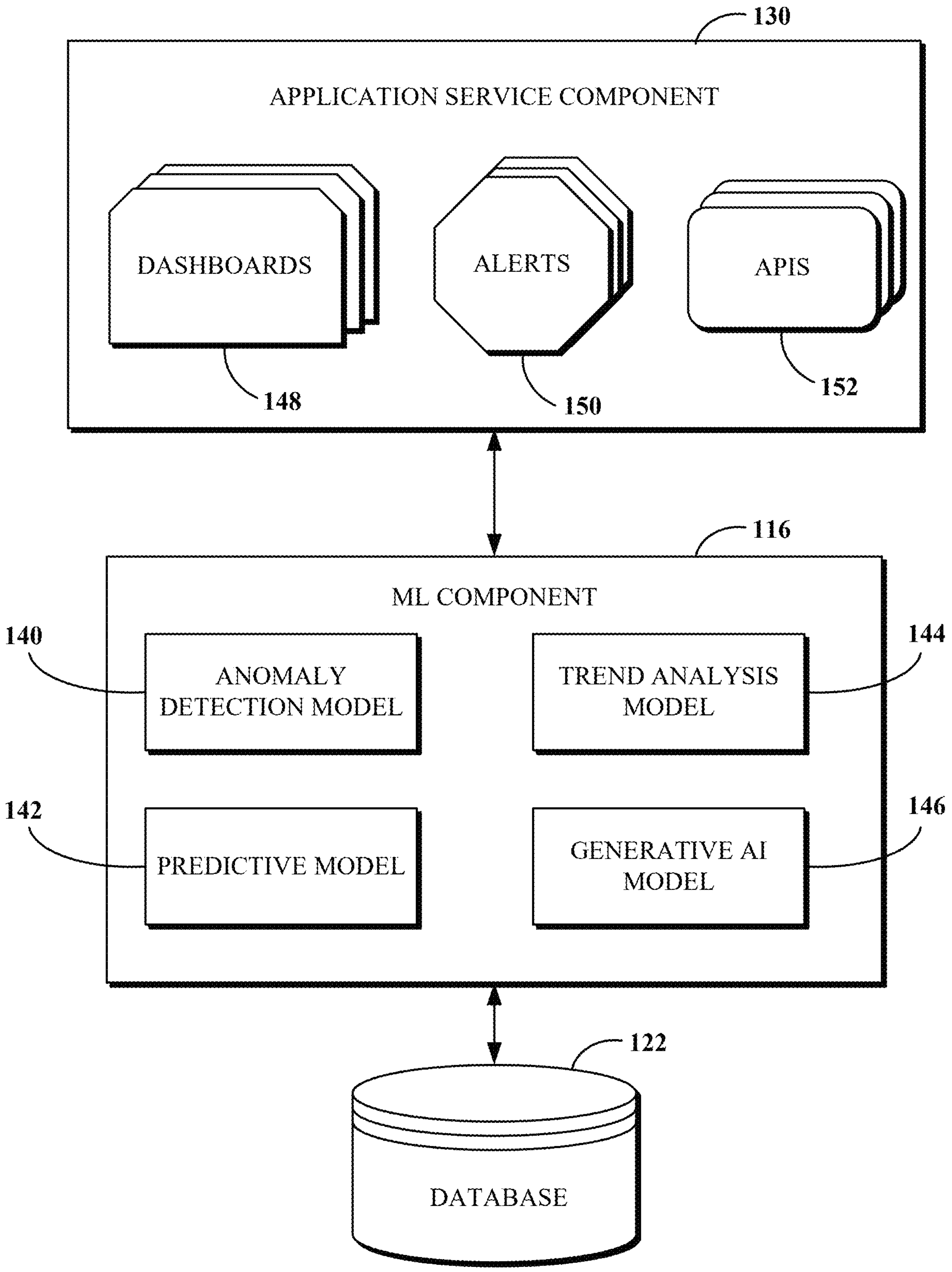
FIG. 1D is a block diagram of another example of an AI system.

FIG. 1D illustrates the ML architecture of the AI system 100 in greater detail. The application service component 130 provides three main interfaces: dashboards 148, alerts 150, and APIs 152. These interfaces may enable users to interact with the system's insights and functionalities in various ways, from visual analytics to programmatic integrations.

The ML component 116 houses multiple specialized models, each addressing specific aspects of healthcare revenue cycle management. The anomaly detection model 140 identifies unusual patterns in claims data, helping to flag potential issues before they impact revenue. The predictive model 142 forecasts outcomes such as claim denials or payment timelines, enabling proactive interventions. The trend analysis model 144 uncovers long-term patterns in revenue cycle performance, supporting strategic decision-making. The generative AI model 146 may be used for tasks such as automated report generation or natural language interactions with the system.

This AI architecture may provide a solution to technical challenges of fragmented and inefficient healthcare revenue cycle management. By integrating data from multiple sources, applying ML techniques, and providing actionable insights through intuitive interfaces, the AI system 100 may enable healthcare providers to optimize their financial operations, reduce claim denials, and improve overall revenue capture. The system's ability to learn and adapt may allow it to remain effective in the face of evolving healthcare regulations and payor policies, providing advantages for healthcare organizations that implement this technology.

The functions of the ML architecture shown in FIG. 1D may be integrated into workflows managed by an orchestration engine. When any of the specialized models, such as the anomaly detection model 140 or the predictive model 142, generate an output for a specific transaction, this event may serve as a trigger. In response, the orchestration engine may be configured to create a new version of the corresponding VOO, storing the model's output as metadata. This may facilitate maintenance of a complete, immutable history of all AI-driven analyses is maintained for each transaction. The alerts 150 presented through the interface may be generated in response to the VOO transitioning into a state that satisfies a predefined alert condition.

Figure 2:
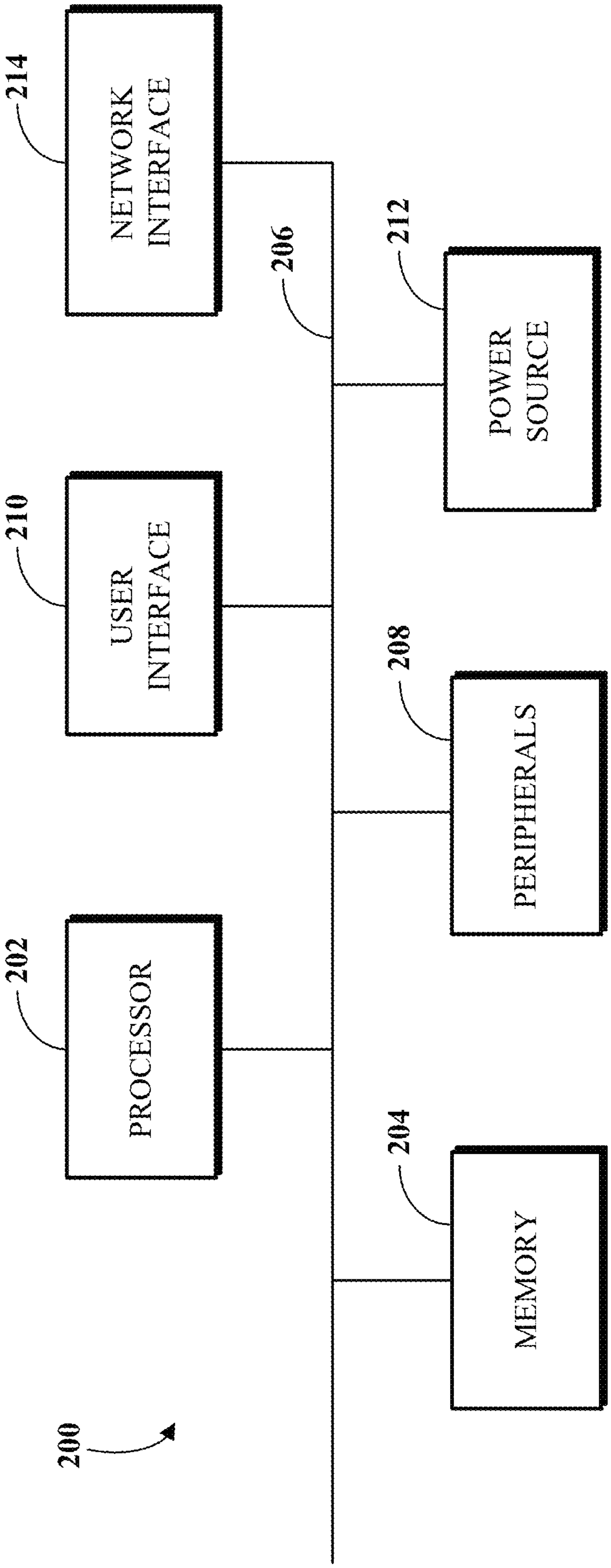
FIG. 2 is a block diagram of a computing device.

FIG. 2 is a block diagram of a computing device 200. In some implementations, the computing device 200 may implement one or more of the AI-powered automation platform 102, the user devices 104A and 104B, and the data sources 106A and 106B of the AI system 100 shown in FIG. 1A.

The computing device 200 includes a processor 202, a memory 204, a bus 206, peripherals 208, a user interface 210, a power source 212 and a network interface 214. In some implementations, the computing device 200 may include any number of other components. The bus 206 may facilitate communication between two or more of the processor, the memory 204, the peripherals 208, the user interface 210, the power source 212 and the network interface 214.

The processor 202 (referred to herein interchangeably as "processing circuitry" or "processing system") may include a central processing unit, such as a microprocessor. The processor 202 may include single or multiple processors having single or multiple processing cores. In some implementations, the processor 202 may include another type of device, or multiple devices, configured for manipulating or processing information. One or more operations of the processor 202 may be distributed across multiple devices or units that may be coupled directly or across a local area network or other suitable type of network. The processor 202 may include a cache, or cache memory, for local storage of operating data or instructions.

The processor 202 may include one or more chiplets, chips, system-on-chips (SoCs), network-on-chips (NoCs), chipsets, packages, or devices that individually or collectively constitute or include a processing system. The processing system may include a processor (or "processing") circuitry in the form of one or multiple processors, microprocessors, processing units (such as CPUs), GPUs, neural processing units (NPUs) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor," "the processing system," or "the processor circuitry"). The processor 202 may include a cache, or cache memory, for local storage of operating data or instructions.

One or more of the processors may be individually or collectively configurable or configured to perform various operations described herein. In some implementations, a single processor may perform all of the operations described as being performed by the processor (or one or more processors). In some implementations, a group of processors collectively configurable or configured to perform a set of operations may include a first set of (one or more) processors configurable or configured to perform a first operation of the set and a second processor configurable or configured to perform a second operation of the set, or may include the group of processors all being configured or configurable to perform the set of operations. The first set of processors and the second set of processors may be the same set of processors or may be different sets of processors.

The memory 204 includes one or more memory components, which may each be volatile memory or non-volatile memory, that individually or collectively constitute a memory system. The memory system may include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory," "the memory system," or "the memory circuitry"). The memory 204 may include non-transitory memory, transitory memory, or a combination thereof. Volatile memory may include RAM (e.g., a dynamic RAM (DRAM) module, such as a double data rate (DDR) synchronous DRAM (SDRAM)). Non-volatile memory may include a disk drive, a solid state drive, flash memory, or phase-change memory. In some implementations, the memory 204 may be distributed across multiple devices. For example, the memory 204 may include network-based memory or memory in multiple clients or servers performing the operations of those multiple devices. The memory 204 may be referred to as one or more computer-readable storage media. A computer-readable storage medium may include any storage unit (or multiple storage units) that store data or instructions that are readable by a processing system. A computer-readable storage medium may include, for example, at least one of a data repository, a data storage unit, a computer memory, a hard drive, a disk, or a random access memory.

One or more of the memories may be coupled (for example, operatively coupled, communicatively coupled, electronically coupled, or electrically coupled) with one or more of the processors and may individually or collectively store processor-executable instructions (e.g., code such as software) that, when executed by one or more of the processors, may configure or otherwise cause one or more of the processors to perform various functions or operations described herein. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise.

In some implementations, the executable instructions may include application data or an operating system, among other examples. The executable instructions may include one or more application programs, which may be loaded or copied, in whole or in part, from non-volatile memory to volatile memory to be executed by the processor 202. For example, the executable instructions may include instructions for performing techniques described in this disclosure. In some implementations, the application data may include functional programs, such as computational programs, analytical programs, or database programs, among other examples. The operating system may be, for example, Microsoft Windows®, Mac OS X®, or Linux®; an operating system for a mobile device, such as a smartphone or tablet device; or an operating system for a non-mobile device, such as a mainframe computer.

Reference to "one or more memories" should be understood to refer to any one or more memories of a corresponding device, such as the memory described in connection with FIG. 2. For example, operation described as being performed by, or data described as being stored on, one or more memories can be performed by, or stored on, respectively, the same subset of the one or more memories or different subsets of the one or more memories. Additionally or alternatively, in some examples, one or more of the processors may be preconfigured to perform various functions or operations described herein without requiring configuration by software. For example, the memory 204 may include data or instructions that are hard-wired into the processing system.

In the description herein, language describing a system, an apparatus, or a device as taking an action (such as performing, determining, initiating, receiving, calculating, deciding, computing, processing, etc.) is to be understood as describing that some appropriate component of the system, apparatus, or device is taking the action. As used herein, the term "component" is intended to be broadly construed as hardware and/or a combination of hardware and software.

The processor 202 may implement one or more techniques or perform one or more operations associated with transactional workflows, as described in more detail elsewhere herein. For example, the processor 202 may perform or direct operations of, for example, technique 2100 of FIG. 21, technique 2200 of FIG. 22, technique 2300 of FIG. 23 or other techniques as described herein (alone or in conjunction with one or more other processors). The memory 204 may store data and program codes for the computing device 200. In some examples, the memory 204 may include a non-transitory computer-readable medium storing a set of instructions (for example, code or program code). The memory 204 may include one or more memories, such as a single memory or multiple different memories (of the same type or of different types). For example, the set of instructions, when executed (for example, directly, or after compiling, converting, or interpreting) by the processor 202, may cause the processor to cause the computing device 200 to perform technique 2100 of FIG. 21, technique 2200 of FIG. 22, technique 2300 of FIG. 23 or other techniques as described herein. In some examples, executing instructions may include running the instructions, converting the instructions, compiling the instructions, and/or interpreting the instructions, among other examples.

The peripherals 208 may include one or more peripheral devices such as, for example, sensors, detectors, or other devices configured for obtaining data associated with the computing device 200, a user of the computing device 200, or the environment around the computing device 200. For example, the peripherals 208 may include a geolocation component, such as a global positioning system location unit. In another example, the peripherals may include a temperature sensor for measuring temperatures of components of the computing device 200, such as the processor 202. In some implementations, the computing device 200 may omit the peripherals 208.

The user interface 210 may include one or more input interfaces and/or output interfaces. An input interface may, for example, include a positional input device, such as a mouse, touchpad, touchscreen, or a keyboard, among other examples. An output interface may, for example, be a display, such as a liquid crystal display, a cathode-ray tube, or a light emitting diode display, among other examples.

The power source 212 may be configured to provide power to the computing device 200. For example, the power source 212 may include an interface to an external power distribution system. In another example, the power source 212 may include a battery. In some implementations, the computing device 200 may include or otherwise use multiple power sources.

The network interface 214 may facilitate communication via a network (e.g., the network 108 shown in FIG. 1A). The network interface 214 may include a wired network interface, a wireless network interface, or a combination thereof. The computing device 200 may communicate with other devices via the network interface 214 using one or more network protocols such as, for example, Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), or Z-Wave, among other examples.

Figure 3:
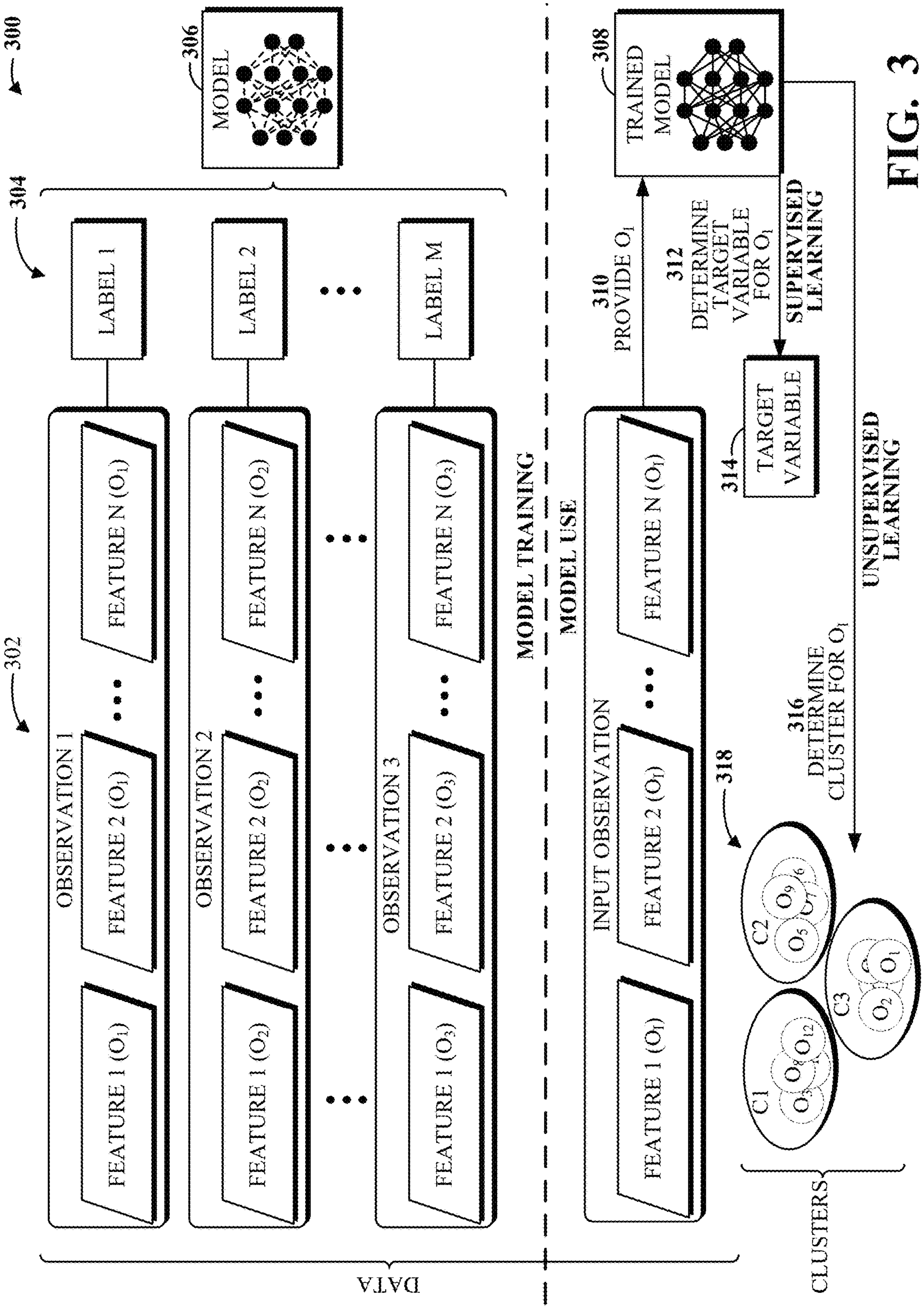
FIG. 3 is a block schematic diagram associated with machine learning.

FIG. 3 is a block schematic diagram associated with ML. Specifically, FIG. 3 is a diagram illustrating an example 300 of training and using an ML model. The ML model may be, be similar to, include, or be included in the ML component 116 shown in FIG. 1A. The ML model training and usage described herein may be performed using an AI system (e.g., the AI system 100 shown in FIG. 1A). The AI system may include or may be included in a computing device, a server, a cloud computing environment, and/or the like. The example 300 includes an observation dataset 302, labels 304, a model 306, a trained model 308, an input observation 310, operations 312 and 316, a target variable 314, and clusters 318 including a first cluster C1, a second cluster C2, and a third cluster C3.

The observation dataset 302 comprises a set of observations, each containing multiple features (FEATURE 1 (O1), FEATURE 2 (O2), etc.). This dataset serves as the foundation for training an ML model. In some embodiments, the observation dataset 302 may be obtained from historical healthcare claims data, including information such as patient demographics, diagnosis codes, procedure codes, and claim outcomes. Some implementations may incorporate data from electronic health records, practice management systems, or payor portals to enrich the observation dataset.

The features may include a set of variables, and a variable may be referred to as a feature. A specific observation may include a set of variable values (or feature values) corresponding to the set of variables. As an example, a feature set for a set of observations may include a first feature of feature 1 data, a second feature of feature 2 data, a third feature of feature 3 data, and so on. As shown, for a first observation, the first feature may have a value of feature 1 data 1, the second feature may have a value of feature 2 data 1, the third feature may have a value of feature 3 data 1, and so on. These features and feature values are provided as examples and may differ in other examples. In some implementations, the AI system may determine variables for a set of observations and/or variable values for a specific observation based on input received from the AI system. For example, the AI system may identify a feature set (e.g., one or more features and/or feature values) by extracting the feature set from structured data, by performing natural language processing to extract the features from unstructured data, by receiving input from an operator, and/or the like.

Labels 304 are associated with each observation in the dataset 302. These labels represent known outcomes or classifications for the training data. In the context of healthcare revenue cycle management, labels may indicate whether a claim was approved, denied, or partially paid. Some implementations may use labels to represent other outcomes, such as the likelihood of claim denial or the expected time to payment. A label may represent a variable having a numeric value, may represent a variable having a numeric value that falls within a range of values or has some discrete possible values, may represent a variable that is selectable from one of multiple options, may represent a variable having a Boolean value, and/or the like.

The target variable may represent a value that an ML model is being trained to predict, and the feature set may represent the variables that are input to a trained ML model to predict a value for the target variable. The set of observations may include target variable values (e.g., labels) so that the ML model can be trained to recognize patterns in the feature set that lead to a target variable value. An ML model that is trained to predict a target variable value may be referred to as a supervised learning model.

In some implementations, the ML model may be trained on a set of observations that do not include a label. This may be referred to as an unsupervised learning model. In this case, the ML model may learn patterns from the set of observations without labeling or supervision, and may provide output that indicates such patterns, such as by using clustering and/or association to identify related groups of items within the set of observations.

The model 306 represents the initial, untrained ML algorithm. This model may take various forms, such as a neural network, decision tree, random forest, or support vector machine. In some embodiments, the model 306 may be a combination of multiple algorithms, forming an ensemble model to improve overall performance. Some implementations may employ different model architectures based on the specific requirements of the healthcare revenue cycle management task at hand.

Through the training process, the model 306 is transformed into the trained model 308. This trained model has learned patterns and relationships from the observation dataset 302 and associated labels 304. In the context of the present disclosure, the trained model 308 may be capable of predicting claim outcomes, identifying potential denials, or detecting anomalies in billing patterns. Some embodiments may produce trained models specialized in other aspects of revenue cycle management, such as optimizing coding practices or predicting patient payment behavior.

The input observation 310 represents new, unseen data that is fed into the trained model 308 for analysis or prediction. In healthcare revenue cycle management, an input observation might be a newly submitted claim or a set of claims awaiting processing. The input observation 310 contains the same types of features as the training data but without known labels or outcomes. Some implementations may allow for real-time input of claim data as it is generated, enabling immediate analysis and decision support.

Operation 312 refers to the process of applying the trained model 308 to the input observation 310 to determine a target variable 314 for the input observation 310. This operation may involve various computational steps, depending on the type of model used. For example, in a neural network, operation 312 would involve forward propagation of the input data through the network layers. In a decision tree model, it would involve traversing the tree based on the input features. Some implementations may incorporate additional pre-processing steps or feature engineering techniques as part of operation 312 to optimize model performance.

The target variable 314 is the output produced by the trained model 308 after processing the input observation 310. In the context of healthcare revenue cycle management, the target variable 314 might represent a predicted probability of claim approval, an estimated payment amount, or a classification of the claim into different risk categories. Some implementations may generate multiple target variables simultaneously, providing a more comprehensive analysis of each claim or set of claims.

Operation 316 represents an unsupervised learning process in which a cluster is determined for the input observation 310. The clusters 318, including first cluster C1, second cluster C2, and third cluster C3, illustrate the model's ability to group similar observations together. In the context of healthcare revenue cycle management, these clusters might represent groups of claims with similar characteristics, denial patterns, or payment behaviors. For example, cluster C1 might contain claims likely to be approved without issue, cluster C2 might represent claims at high risk of denial, and cluster C3 could indicate claims requiring additional documentation. Some implementations may employ more sophisticated clustering techniques, such as hierarchical clustering or density-based clustering, to identify more nuanced patterns in the data.

The ML system depicted in FIG. 3 can be applied to various aspects of healthcare revenue cycle management beyond claim prediction and classification. For instance, it could be used to optimize billing workflows by identifying the most effective times or methods for submitting claims to different payors. The system could also be employed to detect potential fraud or abuse by identifying unusual patterns in claiming behavior that deviate significantly from established norms.

Another potential application of the ML system is in predicting patient payment behavior. By analyzing historical patient data, demographic information, and payment patterns, the system could help healthcare providers anticipate which patients are likely to pay their bills promptly, which might need payment plans, and which may require more aggressive collection efforts. This could lead to more personalized and effective financial counseling and billing strategies.

The ML system of the present disclosure is not limited to supervised learning approaches as depicted in FIG. 3. Some implementations may incorporate unsupervised learning techniques to discover hidden patterns in healthcare revenue cycle data without the need for labeled training data. For example, anomaly detection algorithms could be employed to identify unusual claims or billing practices that may warrant further investigation, even if they don't fit into predefined categories of known issues.

In some embodiments, the ML system may be extended to include reinforcement learning capabilities. This approach could be particularly useful in optimizing long-term revenue cycle strategies. For instance, a reinforcement learning model could learn to balance the trade-offs between aggressive claim submission (which might lead to more denials but faster payments) and more conservative approaches (which might have higher approval rates but slower cash flow). The model could adapt its strategies over time based on the observed outcomes and financial impact of different approaches.

Similar to human learning, RL trains neural networks through trial and error. Specifically, the neural network produces an output, receives feedback regarding this output, and then learns from the feedback. For instance, when finetuning a language model using reinforcement learning from human feedback (RLHF), the language model generates text and receives a score or reward from a human annotator, which reflects the quality of the text. The AI training software then employs RL to finetune the language model to generate outputs with high scores.

Reinforcement learning proves to be an advantageous and promising learning algorithm for neural networks because it allows learning from non-differentiable signals, which are incompatible with supervised learning. This capability enables the AI training software to learn from arbitrary feedback on a neural network's output. In the case of RLHF, the outputs generated by a language model can be scored according to any predefined principle. The AI training software then uses RL to learn from these scores, regardless of their definition.

Problems addressed via RL are typically structured in a consistent format. Specifically, an agent interacts with an environment, maintaining a state within this environment and producing actions that can alter the current state. As the agent interacts with the environment, it can receive both positive and negative rewards for its actions. The agent's objective is to maximize the rewards received, although not every action is associated with a reward. Rewards may have a long horizon, necessitating several correct, consecutive actions to generate any positive reward. In mathematical terms, RL may be described as a Markov decision process (MDP). An MDP includes states, actions, rewards, transitions, and a policy. States and actions have discrete values, while rewards are real numbers. In an MDP, a policy (referred to herein, interchangeably as a "policy model") takes a state as input and outputs a probability distribution over possible actions. Given this output, a decision can be made for the action to be taken from a current state, and the transition is then a function that outputs the next state based upon the prior state and chosen action. Using these components, the agent can interact with the environment in an iterative fashion to generate a trained policy.

The ML training and usage process of example 300 may be managed as a series of orchestrated tasks. An orchestration engine (e.g., the orchestration engine 122 shown in FIG. 1A) may be configured to manage the workflow of preparing the observation dataset 302 and labels 304, triggering the training of the model 306, and deploying the resulting trained model 308 for inference. When the trained model 308 processes an input observation 310, the resulting output, such as the target variable 314 or assignment to clusters 318, may be transmitted as state change data to the orchestration engine. The orchestration engine may record this output by creating a new version of a VOO associated with the input observation 310, thereby preserving a record of the prediction and linking it to the specific model version that produced it.

Figure 4:
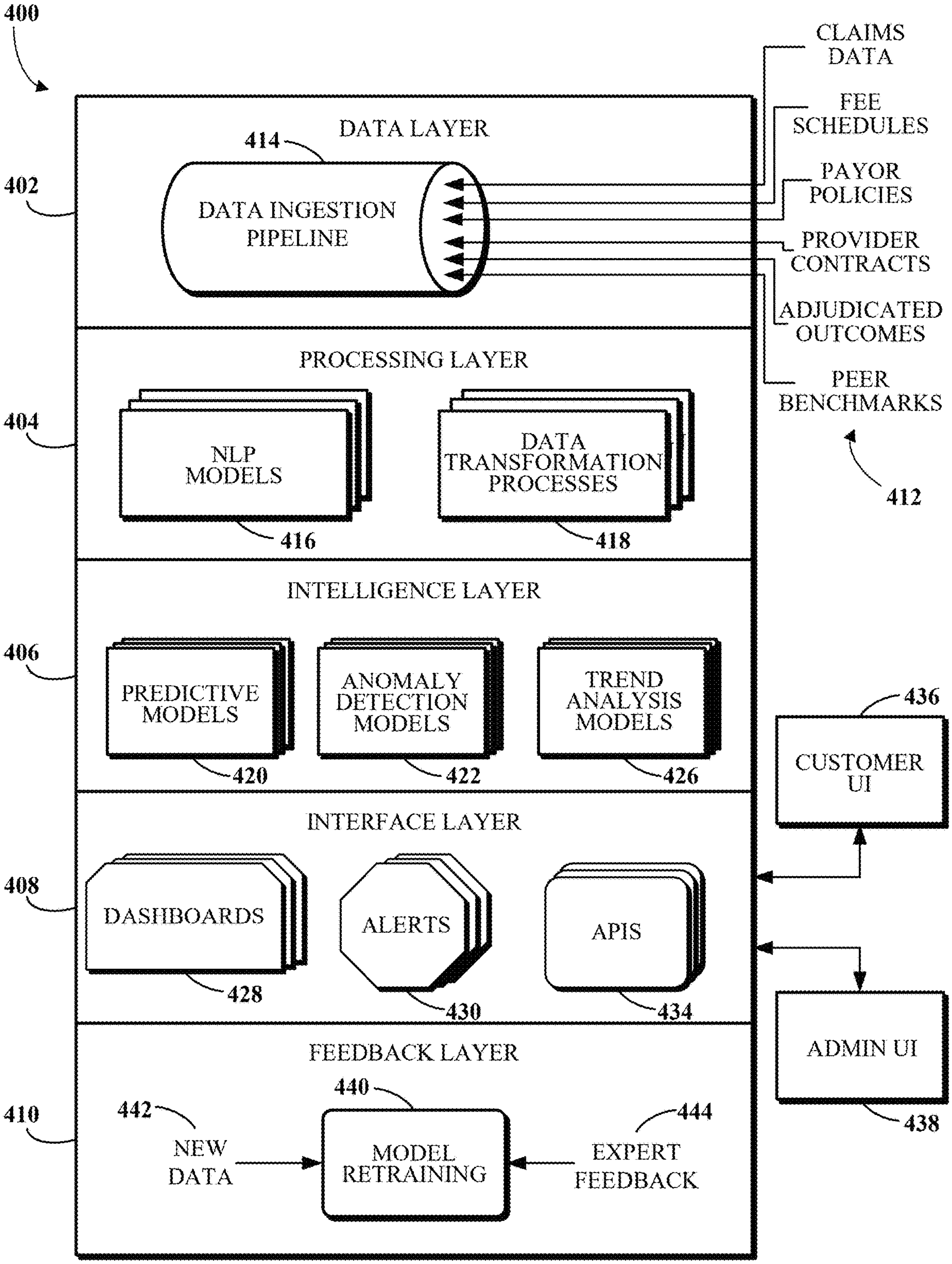
FIG. 4 is a block schematic diagram of an example associated with processing data to provide intelligent informational services.

FIG. 4 illustrates a block schematic diagram of an example 400 associated with processing data to provide intelligent informational services according to aspects of the present disclosure. As shown, the example 400 includes an AI system. The AI system may be, be similar to, include, or be included in, the AI system 100 shown in FIG. 1A. The AI system includes multiple functional layers including a data layer 402, a processing layer 404, an intelligence layer 406, an interface layer 408, and a feedback layer 410.

The data layer 402 may serve as the foundation of the AI system, receiving input data 412 through a data ingestion pipeline 414. The input data 412 may include a wide variety of data associated with one or more transactional workflows such as, for example, healthcare revenue cycle information such as claims data, fee schedules, payor policies, provider contracts, adjudicated outcomes, and peer benchmarks. In some implementations, the input data 412 may also encompass patient demographic information, clinical data from EHRs, and historical billing patterns. In some implementations, the system may incorporate real-time data streams from connected medical devices or wearables to provide a more comprehensive view of patient health and associated billing implications.

The data ingestion pipeline 414 may be responsible for collecting, validating, and standardizing the diverse input data 412. This pipeline may employ various data integration techniques, including API connections, SFTP file transfers, and database replication, to ensure a continuous flow of up-to-date information. In some implementations, the data ingestion pipeline 414 may incorporate blockchain technology to enhance data integrity and traceability, particularly for sensitive healthcare information.

The processing layer 404 may include advanced data profiling capabilities to analyze and understand the structure, content, and quality of incoming data from various sources. Data profiling techniques may involve statistical analysis, pattern recognition, and metadata extraction to identify data types, formats, relationships, and anomalies within the input data 412. In some implementations, the system may employ ML algorithms to automate the data profiling process, enabling the discovery of complex data patterns and interdependencies that may not be apparent through manual inspection.

In some implementations, the data layer 402 and/or the processing layer 404 may be configured to perform a data profiling information. In some implementations, the data profiling operation may involve using an ML-based data profiling tool to analyze first data associated with a first data source and generate first data profile content based on the first data. The first data profile content may identify first data schema content associated with the first data. In some implementations, the ML-based data profiling tool may be used to analyze second data associated with a second data source and generate second data profile content, which may identify second data schema content associated with the second data. In some aspects, the first and second data profile content may further identify data type information associated with their respective data sources. The data profiling operation may employ various data analysis techniques, such as statistical analysis, pattern recognition, and metadata extraction, to identify data types, formats, relationships, and anomalies within the input data Schema matching techniques may be performed by the processing layer 404 to align and map data elements from disparate sources to a unified schema. This process may involve identifying semantic and structural similarities between different data schemas, such as matching column names, data types, and value ranges. In some implementations, the system may use NLP algorithms to interpret and match schema elements based on their descriptions or associated metadata. The schema matching process may be iterative, with the system learning and improving its matching accuracy over time based on user feedback and observed data patterns.

Data standardization and cleaning operations may be performed to ensure consistency and accuracy across the unified dataset. These processes may include tasks such as normalizing data formats, resolving inconsistencies in naming conventions, and harmonizing units of measurement. In some implementations, the system may apply domain-specific rules and transformations, such as standardizing medical codes (e.g., converting between ICD-9 and ICD-10) or normalizing provider identifiers across different systems. ML models may be employed to detect and correct data quality issues, such as identifying and imputing missing values or flagging potential data entry errors.

In some implementations, a data integration process that may be performed at least partially within the processing layer 404 may involve combining and reconciling data from multiple sources into a coherent and unified view. This may include resolving conflicts between overlapping data elements, merging duplicate records, and establishing relationships between entities across different datasets. In some implementations, the system may implement probabilistic matching algorithms to link patient records or claims data across disparate systems, even in the absence of perfect identifier matches.

Advanced entity resolution techniques may be applied as part of the data integration process to identify and link related entities across different data sources. This may involve using fuzzy matching algorithms, phonetic encoding, and ML-based similarity measures to reconcile variations in entity names, addresses, or other identifying information. In some implementations, the system may maintain a master data management (MDM) component to ensure consistent representation of key entities such as patients, providers, and payors across the integrated dataset.

The processing layer 404 may incorporate data lineage tracking capabilities to maintain transparency and auditability throughout the data integration process. This may involve recording the origin, transformations, and dependencies of each data element as it moves through the system. In some implementations, the data lineage information may be used to support data governance initiatives, facilitate troubleshooting of data issues, and enable the system to automatically update or reprocess affected data elements when source data changes.

Temporal aspects of data integration may be addressed within the processing layer 404 to handle time-sensitive information and historical data effectively. This may include strategies for managing data with different update frequencies, reconciling timestamp discrepancies across systems, and maintaining historical snapshots for trend analysis. In some implementations, the system may employ temporal databases or time series data structures to efficiently store and query time-varying data, such as changes in patient insurance coverage or evolving payor policies.

The data integration capabilities of the processing layer 404 may extend to handling semi-structured and unstructured data sources, such as clinical notes, medical images, or PDF documents. In these cases, the system may employ techniques such as optical character recognition (OCR), NLP, or computer vision algorithms to extract relevant information and integrate it with structured data sources. This comprehensive approach to data integration may enable the AI system to leverage a wide range of information sources, providing a more holistic view of the healthcare revenue cycle and supporting more sophisticated analytics and decision-making processes.

The processing layer 404 contains NLP models 416 and data transformation processes 418 that process the ingested data. The NLP models 416 may be designed to extract meaningful information from unstructured text data, such as clinical notes, denial reasons, or payor correspondence. These models may utilize techniques like named entity recognition, sentiment analysis, and topic modeling to convert free-text information into structured, analyzable data. In some implementations, the NLP models 416 may be fine-tuned on domain-specific healthcare vocabularies to improve accuracy in medical terminology extraction.

Data transformation processes 418 in the processing layer 404 may be responsible for cleaning, normalizing, and enriching the data. These processes may include tasks such as standardizing medical codes (e.g., converting between ICD-9 and ICD-10), resolving data inconsistencies, and imputing missing values. In some implementations, the system may incorporate advanced data quality algorithms that use ML to detect and correct anomalies in the data automatically. For example, the system may employ a combination of rule-based and statistical approaches to identify and rectify coding errors, such as mismatched procedure and diagnosis codes or invalid modifier combinations. In some implementations, the data transformation processes may utilize natural language processing techniques to extract structured information from unstructured clinical notes, enhancing the richness of the available data for analysis.

The data transformation process within the processing layer 404 may involve a multi-stage approach to convert raw input data into a standardized, analyzable format. In some implementations, the system may employ a combination of rule-based transformations and ML algorithms to handle the diverse range of data types and formats encountered in healthcare revenue cycle management. The transformation process may begin with data parsing, where incoming data is broken down into its constituent elements based on predefined schemas or learned patterns. This parsing step may be particularly important for handling complex data structures such as ANSI X12 EDI files, which contain multiple nested segments and loops.

Following the parsing stage, the system may apply a series of data cleansing operations to address quality issues and inconsistencies. These operations may include removing duplicate records, standardizing date formats, correcting spelling errors in free-text fields, and resolving conflicting information across different data sources. In some implementations, the system may utilize fuzzy matching algorithms to identify and merge records that likely refer to the same entity but contain slight variations in identifying information. For example, the system may determine that “John Doe” and “Jon Doe” with matching dates of birth and addresses are likely the same patient, and consolidate their records accordingly.

The data transformation process may also involve semantic enrichment, where additional context and meaning are added to the raw data. This may include mapping local codes to standardized terminologies (e.g., converting proprietary service codes to CPT codes), inferring missing information based on available data (e.g., deriving a patient’s age from their date of birth), and linking related data elements across different sources (e.g., associating a claim with relevant clinical documentation). In some implementations, the system may leverage external knowledge bases or ontologies to enhance the semantic richness of the transformed data, enabling more sophisticated analytics and decision support capabilities.

The intelligence layer 406 forms the analytical core of the AI system, comprising predictive models 420, anomaly detection models 422, and trend analysis models 426. Predictive models 420 may be designed to forecast various aspects of the revenue cycle, such as the likelihood of claim denials, expected reimbursement amounts, or patient payment behavior. These models may employ a range of ML techniques, including logistic regression, random forests, or gradient boosting machines, depending on the specific prediction task.

The predictive models 420 may incorporate a variety of ML algorithms and techniques to forecast different aspects of the healthcare revenue cycle. In some implementations, the system may utilize ensemble methods, combining multiple models to improve overall prediction accuracy and robustness. For example, a random forest classifier may be used in conjunction with a gradient boosting machine to predict the likelihood of claim denials, leveraging the strengths of both algorithms to capture complex patterns in the data.

The predictive models 420 may be trained on historical claims data, including features such as patient demographics, diagnosis codes, procedure codes, provider information, and payor details. In some implementations, the system may employ transfer learning techniques to adapt pre-trained models to specific healthcare organizations or specialties, allowing for faster model deployment and improved performance on smaller datasets. The models may also incorporate temporal features, such as seasonality and trends in claim adjudication patterns, to capture time-dependent variations in the revenue cycle.

In some implementations, the predictive models 420 may utilize deep learning architectures, such as RNNs or transformer models, to analyze sequential data in the claims processing workflow. These models may be particularly effective in capturing long-term dependencies and complex interactions between different stages of the revenue cycle. For example, an RNN-based model may be used to predict the expected time to payment for a claim, taking into account the entire history of interactions between the healthcare provider and the payor.

The system may also employ interpretable ML techniques to provide insights into the factors driving the predictions. In some implementations, the predictive models 420 may generate feature importance scores or use techniques like SHAP (SHapley Additive exPlanations) values to explain which input variables have the most significant impact on the predicted outcomes. This interpretability may enable healthcare providers to understand the underlying reasons for predicted claim denials or reimbursement amounts, facilitating targeted interventions and process improvements in their revenue cycle management.

Anomaly detection models 422 in the intelligence layer 406 may be useful for identifying unusual patterns or outliers in the revenue cycle data. These models may use techniques such as isolation forests, autoencoders, or clustering algorithms to flag potential issues like fraudulent claims, coding errors, or sudden changes in payor behavior. In some implementations, the anomaly detection models 422 may incorporate time series analysis to detect temporal anomalies, such as unexpected spikes in denial rates or changes in payment patterns over time.

The anomaly detection models 422 in the intelligence layer 406 may employ a combination of supervised and unsupervised ML techniques to identify unusual patterns or outliers in the healthcare revenue cycle data. These models may analyze various features of claims data, including but not limited to claim amounts, diagnosis codes, procedure codes, provider information, and payor behavior. In some implementations, the system may utilize isolation forests, which work by isolating anomalies in the feature space based on the principle that anomalies are rare and different. This approach may be particularly effective in detecting fraudulent claims or unusual billing patterns that deviate significantly from the norm.

In addition to isolation forests, the anomaly detection models 422 may incorporate autoencoder neural networks to identify anomalies in high-dimensional data. Autoencoders may be trained on normal revenue cycle data to learn a compressed representation of the input features. When presented with new data, the autoencoder may attempt to reconstruct the input from its compressed representation. Data points that result in high reconstruction errors may be flagged as potential anomalies. This technique may be useful for detecting subtle deviations in claim characteristics or payor behavior that might not be apparent through traditional rule-based approaches. Furthermore, the system may employ time series analysis techniques, such as ARIMA models or Prophet, to detect temporal anomalies in the revenue cycle data. These models may help identify unexpected spikes in denial rates, sudden changes in payment patterns, or shifts in payor adjudication practices over time.

Trend analysis models 426 may be responsible for uncovering long-term patterns and relationships in the revenue cycle data. These models may employ techniques like time series decomposition, seasonal trend analysis, or causal inference methods to identify underlying factors affecting financial performance. In some implementations, the system may incorporate advanced forecasting techniques like Prophet or ARIMA models to provide more accurate long-term revenue projections.

The interface layer 408 may serve as the bridge between the AI system's analytical capabilities and its users, providing multiple output interfaces including dashboards 428, alerts 430, and APIs 434. Dashboards 428 may offer visual representations of KPIs, trends, and insights derived from the intelligence layer. These dashboards may be interactive, allowing users to drill down into specific data points or customize views based on their roles and preferences. In some implementations, the dashboards 428 may incorporate augmented reality features for immersive data exploration experiences.

Alerts 430 in the interface layer 408 may provide timely notifications of important events, anomalies, or actionable insights detected by the AI system. These alerts may be delivered through various channels such as email, SMS, or in-app notifications, and can be customized based on user roles and preferences. In some implementations, the system may include a smart alerting system that uses ML to prioritize and contextualize alerts, reducing alert fatigue and ensuring that users receive the most relevant information.

The AI system may organize metrics into a hierarchical structure to facilitate efficient analysis and alert generation. At the core of this structure are individual metrics, which represent specific measurable aspects of the healthcare revenue cycle. These metrics may include various types such as denial rates, claims submission volumes, accounts receivable aging, or reimbursement rates. Each metric may be associated with a particular time frame and aggregation method, forming what may be referred to as a metric subtype. For example, a "14-day rolling average denial rate" or a "60-day standard deviation of rolling rate" may constitute different subtypes of the denial rate metric.

Metrics may be grouped into metric groups, which represent collections of related metrics that provide a comprehensive view of a particular aspect of the revenue cycle. For instance, a denial-related metric group may include metrics such as overall denial rate, denial rate by reason code, and average time to resolve denials. The system may allow for flexible definition of metric groups, enabling healthcare organizations to tailor their analytics to specific operational needs or strategic priorities. Furthermore, the AI system may implement a segmentation approach to provide granular insights into metric performance across different dimensions of the healthcare business. Segments may include categories such as payor, facility, medical group, or rendering provider group. By applying these segments to metrics and metric groups, the system may generate multidimensional analyses that allow users to drill down into specific areas of concern or identify patterns across different operational units.

The AI system may structure data to support alerts through a comprehensive and flexible data model. This model may include several key components designed to capture, organize, and facilitate the generation and management of alerts within the healthcare revenue cycle management context. At the core of the alert data structure may be an Alert table. This table may contain essential information about each alert, including a unique identifier, alert type, alert date, alert name, status, and description. The alert type field may categorize alerts into different classes, such as denials, accounts receivable, or revenue-related issues. The alert date may represent the business-relevant date for the alert, which could differ from the system's creation timestamp.

The Alert table may be associated with a MetricGroup table through a foreign key relationship. Each alert may be linked to a specific metric group, which represents a set of related metrics used to generate the alert. The MetricGroup table may store information about the type of metrics it contains, such as AR (accounts receivable) or denials, and may include a JSON structure that defines the set of segments used to filter and group the metrics. To support flexible segmentation of metrics and alerts, the system may implement a MetricSegment table. This table may define the specific dimensions or filters applied to a metric group, such as payor, facility, medical group, or rendering provider group. Each metric segment may have an order field, allowing for prioritization of segments within a metric group. This structure may enable the system to generate alerts based on multi-dimensional analysis of the revenue cycle data.

The system may utilize separate metric tables for different types of financial data. For example, there may be Metric_AR_Bin and Metric_AR_Agg tables for storing accounts receivable metrics at different levels of granularity. These tables may contain fields for specific AR-related measurements, such as AR amounts for different time bins (0-30 days, 31-60 days, etc.) or aggregated AR totals. Similar tables may exist for other metric types, such as denials or remittances.

To maintain a historical record of metrics and support trend analysis for alerts, the system may implement a MetricLog table. This table may store all versions of metrics over time, allowing the system to track changes and generate alerts based on historical comparisons. A corresponding MetricCurrent table may maintain the latest version of each metric, enabling efficient querying for the most up-to-date information when generating alerts. The alert data structure may include an AlertMetric table to establish the relationship between alerts and the specific metrics that triggered them. This table may serve as a bridge, linking each alert to one or more metrics from the MetricLog or MetricCurrent tables. This structure may allow the system to provide detailed context and supporting data for each generated alert.

To support user interaction and feedback on alerts, the system may implement an AlertUser table. This table may store information about user interactions with alerts, such as whether an alert has been viewed, acknowledged, or acted upon. It may also capture user feedback, such as the perceived relevance or usefulness of the alert, which can be used to improve future alert generation and prioritization. The data model may include an AlertGroup table to support the grouping of related alerts. This feature may be particularly useful for tracking the progression of issues over time or for consolidating multiple alerts related to a single root cause. The AlertGroup table may have a many-to-many relationship with the Alert table, allowing for flexible grouping of alerts based on various criteria.

To enhance the context and actionability of alerts, the system may implement an AlertAction table. This table may store recommended actions or next steps associated with each alert type. By linking alerts to specific actions, the system may provide users with guidance on how to address the issues identified by the alerts, improving the overall efficiency of the revenue cycle management process. The alert data structure may also include support for alert prioritization through an AlertPriority table. This table may define different priority levels and their associated characteristics, such as response time requirements or escalation procedures. By assigning priorities to alerts, the system may help users focus on the most critical issues affecting the revenue cycle.

To facilitate the customization of alert delivery and presentation, the system may implement an AlertProfile table. This table may store user-specific or role-specific preferences for alert notifications, such as delivery channels, frequency, and visualization options. By tailoring the alert experience to individual users or roles, the system may improve the relevance and effectiveness of the alerting mechanism.

In some implementations, the AI system may utilize a single, comprehensive Metric table to capture all the information described in the previous data model. This unified Metric table may incorporate fields to represent various types of metrics, including accounts receivable, denials, remittances, and other financial indicators. The table may include columns for metric type, metric subtype, metric value, metric date, and aggregation method, allowing for flexible storage of different metric categories and subtypes within a single structure.

To support the hierarchical organization and segmentation of metrics, the Metric table may include additional columns for metric group, segment type, and segment value. These fields may allow for the representation of metric groups and multi-dimensional segmentation without the need for separate MetricGroup and MetricSegment tables. The table may also incorporate a version column and a timestamp to maintain historical records and support trend analysis, effectively combining the functionality of the previously described MetricLog and MetricCurrent tables. This approach may simplify data retrieval and reduce the need for complex joins when generating alerts or populating dashboards, potentially improving query performance and system scalability.

APIs 434 may enable seamless integration of the AI system's capabilities with other healthcare IT systems, such as EHRs, practice management software, or third-party analytics tools. These APIs may support both data ingestion and output, allowing for bidirectional information flow. In some implementations, the APIs 434 may incorporate GraphQL for more flexible and efficient data querying, or implement OAuth 2.0 for enhanced security in data exchange.

The interface layer 408 connects to both a customer UI 436 and an administrator UI 438, catering to different user roles within the healthcare organization. The customer UI 436 may be designed for end-users such as billing specialists, revenue cycle managers, or financial analysts, providing intuitive access to insights and functionalities relevant to their daily operations. The administrator UI 438, on the other hand, may offer more advanced configuration options, system monitoring tools, and access to detailed performance metrics.

The AI system may continually learn and improve through the feedback layer 410. This layer contains a model retraining component 440 configured to train and/or retrain one or more ML models. In some implementations, the model retraining component 440 may implement one or more aspects of ML training described above in connection with FIG. 3. The model retraining component 440 may receive new data 442 and expert feedback 444. The new data 442 may include the latest claims data, updated payor policies, or recent adjudication outcomes, allowing the system to adapt to changing patterns in the healthcare landscape. Expert feedback 444 may come from healthcare professionals, billing specialists, or domain experts who can provide valuable insights or corrections to the system's outputs.

The model retraining component 440 may use this input to update and refine the various models in the intelligence layer 406. This may involve techniques such as online learning, transfer learning, or periodic batch retraining to incorporate new information without compromising the stability of existing models. In some implementations, the model retraining component 440 may employ automated ML (AutoML) techniques to continuously optimize model architectures and hyperparameters based on performance metrics and new data.

The AI system of example 400 may be coordinated by an orchestration engine (e.g., the orchestration engine 122 shown in FIG. 1A), which may be a component of the processing layer 404 and/or the intelligence layer 406, or may be implemented independently of the processing layer 404 and the intelligence layer 406. The orchestration engine may be configured to create and manage a VOO for each transactional workflow that enters the system via the data ingestion pipeline 414. The data transformation processes 418 may generate state changes that are recorded in new versions of the VOO. Subsequently, the outputs from the predictive models 420, anomaly detection models 422, or trend analysis models 426 may be received by the orchestration engine, which in turn may create new VOO versions to capture these analytical insights. The alerts 430 provided by the interface layer 408 may be triggered when a VOO enters a state that matches a predefined alert rule.

Figure 5:
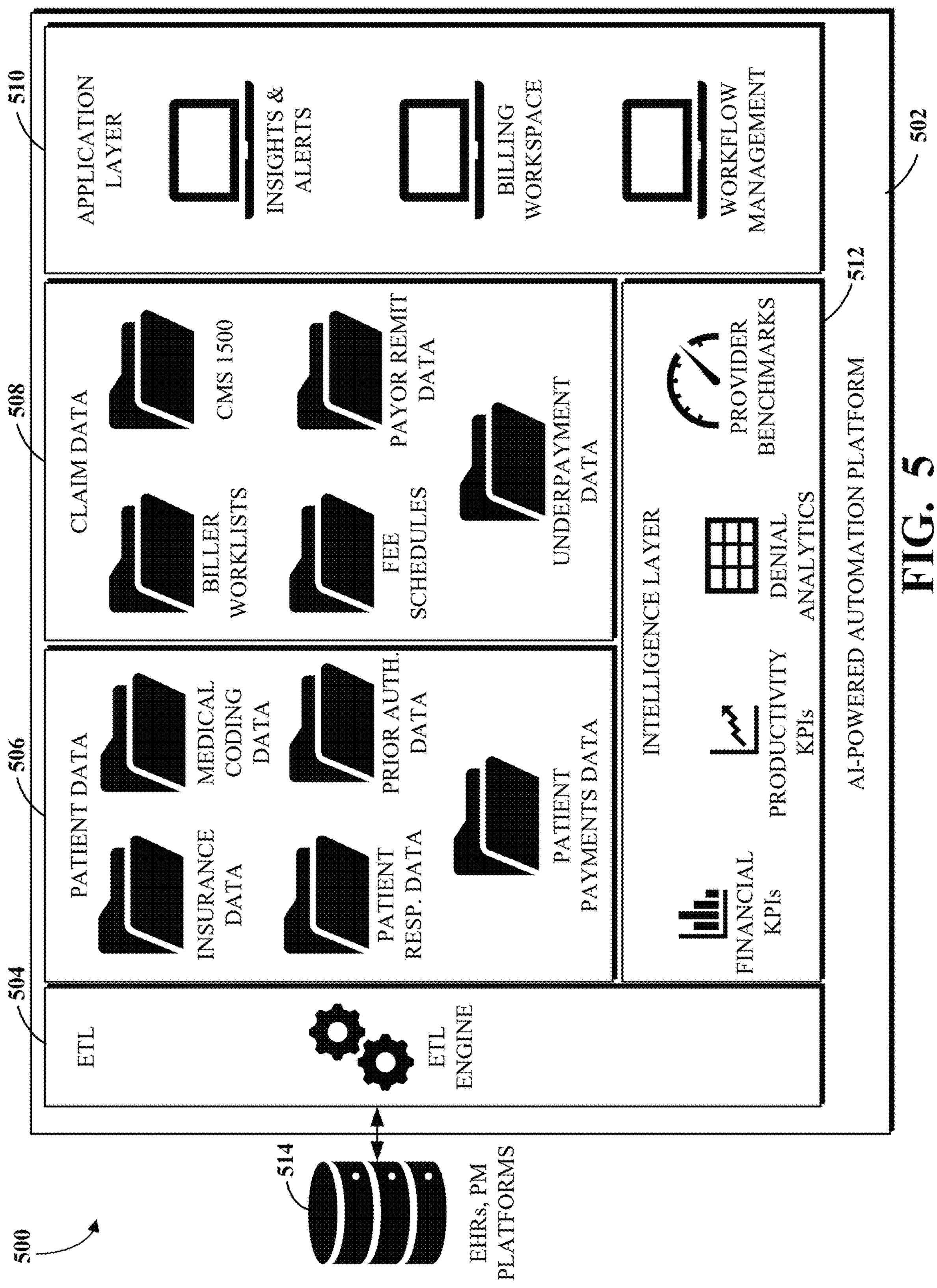
FIG. 5 is a block diagram of another example of an AI system for providing intelligent informational services associated with healthcare workflows.

FIG. 5 illustrates a block diagram of an example of an AI system 500 for providing intelligent workflow management services associated with transactional workflows according to aspects of the present disclosure. The AI system 500 includes multiple interconnected components designed to process, analyze, and optimize healthcare revenue cycle management data. The AI system 500 may be, be similar to, include, or be included in, the AI system 100 shown in FIG. 1A. The AI system 500 includes an AI-powered automation platform 502 that includes a data processing engine 504, a patient data repository 506, a claim data repository 508, an application layer 510, and an intelligence layer 512.

The data processing engine 504 may be configured to ingest, clean, and transform raw data from various sources. The data processing engine 504 may employ advanced ETL (Extract, Transform, Load) processes, utilizing ML algorithms to automate data cleansing and normalization tasks. For instance, the data processing engine 504 may use natural language processing techniques to extract relevant information from unstructured clinical notes or payor correspondence. In some implementations, the data processing engine 504 may incorporate blockchain technology to ensure data integrity and traceability throughout the revenue cycle management process.

The data processing engine 504 may implement a multi-stage data processing pipeline that handles diverse health-care data formats and structures. In some implementations, the data processing engine 504 may utilize adaptive parsing algorithms that automatically detect and process various data formats, including HL7 FHIR messages, X12 EDI transactions, CSV files, and proprietary database formats. The data processing engine 504 may employ ML-based data quality assessment tools to identify and flag potential data inconsistencies, missing values, or formatting errors before processing. In some implementations, the data processing engine 504 may incorporate real-time data validation mechanisms that apply healthcare-specific business rules and constraints to facilitate data accuracy and compliance with industry standards such as HIPAA and ICD-10 coding requirements.

The data processing engine 504 may feature intelligent data transformation capabilities that go beyond traditional ETL operations. In some implementations, the data processing engine 504 may utilize natural language processing models to extract structured information from unstructured clinical documentation, converting free-text physician notes into standardized medical codes or structured data elements. The data processing engine 504 may employ entity resolution algorithms to identify and merge duplicate patient records across different source systems, using probabilistic matching techniques that account for variations in patient identifiers, names, or demographic information. In some implementations, the data processing engine 504 may implement temporal data processing capabilities that can handle time-series healthcare data, such as patient vital signs or treatment progression records, facilitating the system to track changes and trends over time.

In some implementations, the data processing engine 504 may incorporate data enrichment features that enhance the value and utility of processed healthcare data. The data processing engine 504 may integrate with external data sources, such as pharmaceutical databases or medical device registries, to supplement patient records with additional contextual information. The data processing engine 504 may utilize ML models to infer missing data elements based on patterns observed in similar patient cases or historical data trends. In some implementations, the data processing engine 504 may implement data lineage tracking capabilities that maintain detailed records of data transformations and processing steps, facilitating audit trails and supporting compliance with healthcare data governance requirements. The data processing engine 504 may feature configurable data processing workflows that can be customized based on specific healthcare organization requirements or regulatory mandates.

The patient data repository 506 may be configured to store comprehensive information related to patient care and billing. The patient data repository 506 may store various types of data including, for example, medical coding information, insurance detail data, prior authorization records, patient response data, or patient payment history. For example, the medical coding data might include ICD-10 diagnosis codes, CPT procedure codes, and HCPCS codes for medical supplies and equipment.

In some implementations, the patient data repository 506 may utilize data compression techniques or implement a data lake architecture to efficiently store and manage large volumes of diverse patient information. The claim data repository 508 may be configured to store claim-related information. The claim data repository 508 may include data types such as, for example, "CMS 1500" form data, biller worklists, fee schedules, payor remit data, or underpayment information. For instance, the "CMS 1500" data may encompass details like patient demographics, insurance information, diagnoses, and procedures performed. In some implementations, the claim data repository 508 may employ a graph database structure to efficiently represent and query complex relationships between claims, patients, providers, and payors.

The application layer 510 may include functional components for revenue cycle management. The application layer 510 may include modules for insights and alerts, billing workspace, or workflow management. For example, the insights and alerts component may use ML algorithms to detect unusual patterns in claim denials or identify potential coding errors before submission. The billing workspace might offer an intuitive interface for managing claims throughout their lifecycle. The workflow management component may.

The application layer 510 may serve as the primary interface between users and the underlying data processing and intelligence capabilities of the AI system 500. In some implementations, the application layer 510 may provide a comprehensive suite of tools and interfaces that facilitate healthcare professionals to interact with revenue cycle data, configure workflows, or access analytical insights. The application layer 510 may include specialized modules such as dashboard interfaces for real-time monitoring of performance indicators, interactive reporting tools that facilitate users to drill down into specific metrics, or customizable alert systems that notify users of important events or anomalies. In some implementations, the application layer 510 may incorporate role-based access controls that tailor the user experience based on individual responsibilities, such as providing billing specialists with detailed claim management tools while offering executives high-level financial summaries and trend analyses.

The application layer 510 may implement advanced workflow orchestration capabilities that coordinate both automated processes and human interventions throughout the revenue cycle. In some implementations, the application layer 510 may include intelligent task routing systems that automatically assign work items to appropriate team members based on expertise, workload, and priority levels. The application layer 510 may feature configurable business rule engines that facilitate organizations to define custom logic for claim processing, denial management, or payment posting operations. In some implementations, the application layer 510 may provide integration capabilities with external systems such as electronic health records, practice management software, or payor portals, facilitating seamless data exchange and workflow continuity across different platforms.

In some implementations, the application layer 510 may incorporate robotic process automation (RPA) capabilities to automate repetitive tasks within the revenue cycle workflow. The application layer 510 may include intelligent document processing features that can automatically extract information from various document types, such as explanation of benefits statements or prior authorization forms. The application layer 510 may provide advanced analytics and reporting capabilities, including predictive modeling tools that forecast claim outcomes, denial trend analysis, or revenue optimization recommendations. In some implementations, the application layer 510 may feature collaborative tools that facilitate team members to share insights, track progress on complex cases, or maintain detailed audit trails of all actions taken within the system.

The intelligence layer 512 provides analytical capabilities to support decision-making and process optimization. The intelligence layer 512 may offer functionalities such as generating and tracking financial KPIs, productivity KPIs, denial analytics, or provider benchmarks. For instance, the financial KPIs might include metrics like days in accounts receivable, clean claim rate, or collection rate, while productivity KPIs may track metrics such as claims processed per hour or denial resolution time. In some implementations, the intelligence layer 512 may utilize reinforcement learning techniques to continuously optimize revenue cycle strategies based on observed outcomes and financial impact.

The intelligence layer 512 may employ ML algorithms and AI techniques to analyze patterns and trends across the entire revenue cycle ecosystem. In some implementations, the intelligence layer 512 may utilize ensemble methods that combine multiple predictive models to improve accuracy in forecasting claim outcomes, identifying potential denials, and optimizing reimbursement strategies. The intelligence layer 512 may incorporate natural language processing capabilities to analyze unstructured data sources such as denial reason codes, payor correspondence, and clinical documentation to extract actionable insights. In some implementations, the intelligence layer 512 may feature anomaly detection algorithms that continuously monitor revenue cycle performance metrics to identify unusual patterns or deviations that may indicate process inefficiencies, coding errors, or emerging payor policy changes.

The intelligence layer 512 may provide real-time analytics and predictive modeling capabilities that facilitate proactive decision-making throughout the revenue cycle management process. In some implementations, the intelligence layer 512 may generate dynamic risk scores for individual claims based on historical data, payor behavior patterns, and claim characteristics to prioritize review and intervention efforts. The intelligence layer 512 may incorporate time-series analysis to identify seasonal trends, cyclical patterns, and long-term performance trajectories that inform strategic planning and resource allocation decisions. In some implementations, the intelligence layer 512 may feature comparative analytics that benchmark performance against industry standards, peer organizations, or historical baselines to identify opportunities for improvement and optimization.

In some implementations, the intelligence layer 512 may implement adaptive learning mechanisms that continuously refine its analytical models based on new data inputs and observed outcomes. The intelligence layer 512 may utilize federated learning techniques to leverage insights from multiple healthcare organizations while maintaining data privacy and security requirements. The intelligence layer 512 may provide personalized recommendations and insights tailored to specific user roles, organizational contexts, and operational priorities. In some implementations, the intelligence layer 512 may feature scenario modeling capabilities that facilitate users to simulate the potential impact of different strategies, policy changes, or market conditions on revenue cycle performance, facilitating data-driven decision-making and strategic planning.

An orchestration engine (e.g., the orchestration engine 122 shown in FIG. 1A) may be implemented as a component within the workflow management module of the application layer 510 (or independently therefrom), coordinating complex multi-step processes across the entire revenue cycle ecosystem. In some implementations, the orchestration engine may manage the execution of both automated and manual tasks by maintaining versioned orchestration objects that track the complete lifecycle of each claim or transaction as it progresses through various workflow stages. The orchestration engine may interface with other components of the application layer 510 to trigger appropriate actions based on predefined rules or ML-driven decisions, such as routing claims to specific billing specialists, initiating automated document retrieval processes, or escalating exceptions to supervisory queues. In some implementations, the orchestration engine may coordinate with the intelligent task routing systems and configurable business rule engines within the application layer 510 to facilitate that workflow progression criteria are met before advancing transactions to subsequent stages. The orchestration engine may also facilitate seamless integration between the RPA capabilities and human-in-the-loop interventions by managing the handoffs between automated agents and manual review processes, facilitating that all necessary documentation, approvals, and validations are completed before proceeding to the next workflow stage. In some implementations, the orchestration engine may provide real-time visibility into workflow status and performance metrics through the dashboard interfaces and reporting tools of the application layer 510, facilitating healthcare organizations to monitor bottlenecks, track completion rates, and optimize their revenue cycle operations based on comprehensive workflow analytics.

For example, for each transactional workflow, such as a healthcare claim, the orchestration engine may create and maintain a VOO. As a claim is processed by the data processing engine 504 and moves through the modules of the application layer 510, each significant event, status change, or analysis performed by the intelligence layer 512 may be treated as state change data. This data triggers the orchestration engine to create a new version of the VOO, storing the event details as metadata. This provides a unified, versioned history of the claim's entire lifecycle, with data being persisted in the patient data repository 506 and the claim data repository 508.

The AI-powered automation platform 502 may interact with various data sources 514, which may include, for example, EHR systems, practice management software, clearinghouse services, payor portals, or financial management systems. These data sources may provide the raw input that fuels the AI system's analytical capabilities. For example, an EHR system might supply clinical documentation and charge capture data, while a clearinghouse service may provide claim submission and response information. In some implementations, the AI system 500 may incorporate edge computing nodes to process and analyze data from internet-of-things (IoT) medical devices or wearables, providing real-time insights into patient health and potential billing implications.

Figure 6:
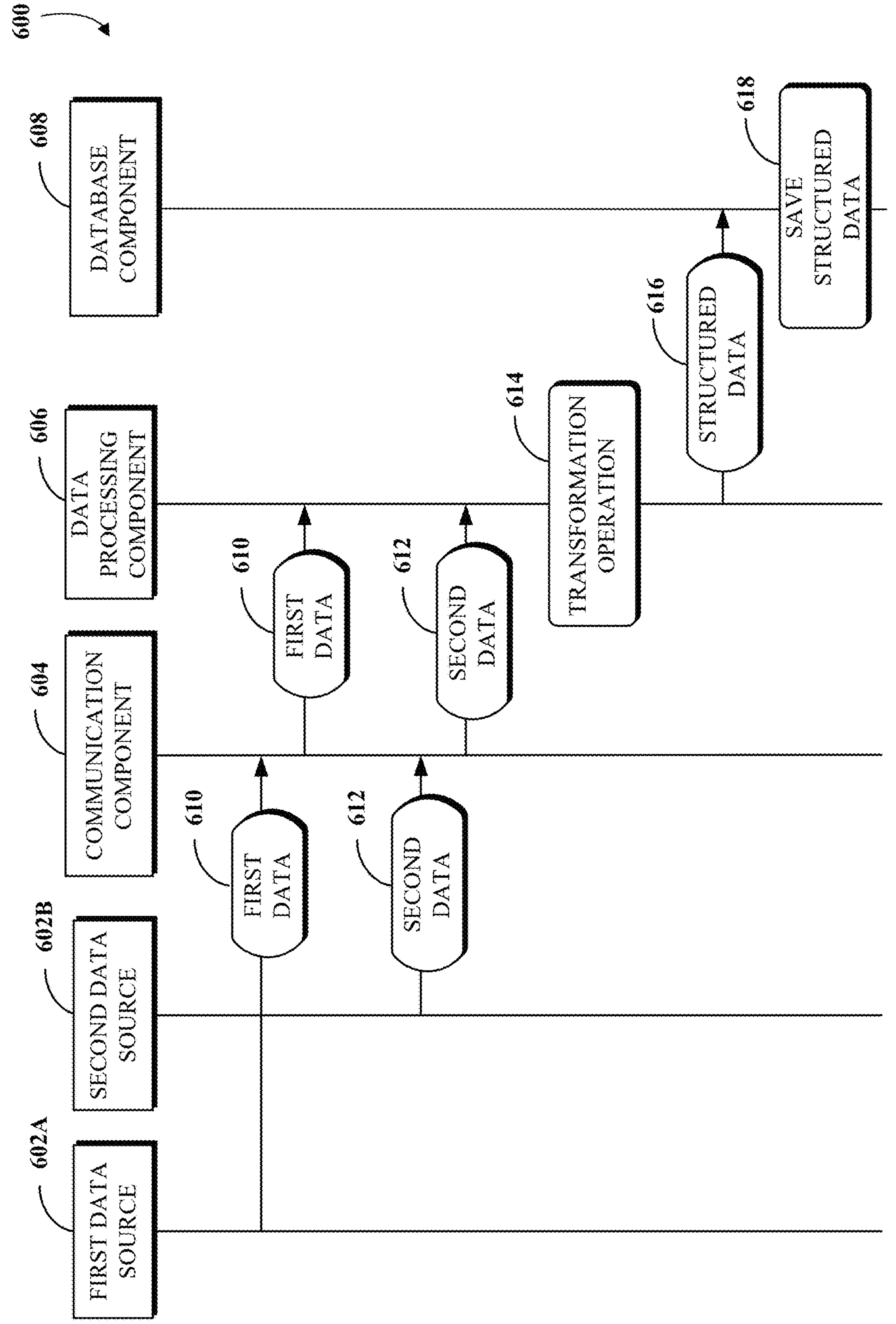
FIG. 6 is a flow diagram associated with processing data from disparate data sources.

FIG. 6 illustrates a flow diagram of an example 600 of a process for processing data from disparate data sources according to aspects of the present disclosure. The example 600 depicts the flow of data through various components of an AI system for healthcare revenue cycle management. The example 600 includes a first data source 602A, a second data source 602B, a communication component 604, a data processing component 606, and a database component 608.

The first data source 602A and the second data source 602B may represent different systems commonly used in healthcare organizations, such as EHR systems, practice management software, clearinghouse services, payor portals, or financial management systems. For example, the first data source 602A may be an Epic EHR system containing clinical documentation and charge capture data, while the second data source 602B may be a Waystar clearinghouse service providing claim submission and response information. In some implementations, the first data source 602A or the second data source 602B may include real-time patient monitoring devices or wearable health trackers, which may facilitate a more comprehensive view of patient health and potential billing implications.

The communication component 604 may be configured to receive and manage the data flow from the first data source 602A and the second data source 602B. The communication component 604 may employ any number of various data integration techniques to ensure efficient and secure data transfer. For instance, the communication component 604 may utilize HL7 FHIR (Fast Healthcare Interoperability Resources) standards for exchanging healthcare information electronically, or implement X12 EDI (Electronic Data Interchange) protocols for standardized business communication. In some implementations, the communication component 604 may incorporate blockchain technology to enhance data integrity and traceability throughout the revenue cycle management process.

The data processing component 606 may be configured to process data received from the data sources 602A and 602B. The data processing component 606 may employ advanced ETL (Extract, Transform, Load) processes, utilizing ML algorithms to automate data cleansing and normalization tasks. For example, the data processing component 606 may use natural language processing techniques to extract relevant information from unstructured clinical notes or payor correspondence. In some implementations, the data processing component 606 may incorporate edge computing capabilities to process and analyze data from IoT medical devices in real-time, providing immediate insights into patient health and potential billing implications.

The database component 608 may be configured to store the processed information. The database component 608 may utilize any number of database technologies to efficiently manage large volumes of healthcare data. For example, the database component 608 may employ a combination of relational and NoSQL databases to accommodate the diverse types of data encountered in revenue cycle management. In some implementations, the database component 608 may incorporate a data lake architecture to store and analyze large volumes of unstructured and semi-structured data, providing greater flexibility for future analytics and ML applications.

The data flow depicted in FIG. 6 demonstrates a systematic approach to processing healthcare information from multiple disparate sources. The process begins with the first data source 602A and second data source 602B simultaneously providing their respective data streams to the communication component 604. The first data 610 flows from the first data source 602A to the communication component 604, while the second data 612 flows from the second data source 602B to the same communication component 604.

The communication component 604 serves as a central aggregation point, receiving and consolidating the incoming data streams from both sources. Once the communication component 604 has collected the first data 610 and second data 612, it forwards this combined information to the data processing component 606 for transformation and standardization.

The data processing component 606 performs a transformation operation 614 on the received data, converting the potentially disparate formats and structures of the first data 610 and second data 612 into a unified format. This transformation operation 614 generates structured data 616 that conforms to standardized schemas and data models suitable for storage and analysis.

The structured data 616 then flows from the data processing component 606 to the database component 608. Upon receiving the structured data 616, the database component 608 executes operation 618, which may involve storing, indexing, and organizing the transformed data within the database infrastructure.

This data flow architecture facilitates the system to integrate information from multiple healthcare IT systems, regardless of their original formats or data structures. The sequential processing through the communication, transformation, and storage components facilitates that data from different sources can be unified and made available for downstream analytics and decision-making processes. The flow demonstrates how raw, heterogeneous healthcare data can be systematically processed into a consistent, structured format that supports comprehensive revenue cycle management operations.

The process of example 600 demonstrates an approach to data integration and transformation in healthcare revenue cycle management. By leveraging AI and ML techniques, the system can efficiently process and normalize data from multiple disparate sources, creating a unified data model that supports advanced analytics and decision-making. This approach may address the technical challenges of fragmented data in healthcare IT systems, enabling healthcare providers to gain a holistic view of their revenue cycle and identify opportunities for optimization.

The data flow of example 600 may be coordinated by an orchestration engine (e.g., the orchestration engine 122 shown in FIG. 1A). The receipt of first data 610 and second data 612 by the communication component 604 may trigger the orchestration engine to create an initial VOO representing the raw, ingested data. The transformation operation 614 performed by the data processing component 606 may be an orchestrated step. The successful generation of the structured data 616 and its subsequent storage in the database component 608 may be recorded by the orchestration engine as a state change, resulting in a new version of the VOO that reflects the data's cleansed and structured state.

In some implementations, the process of example 600 may be extended to incorporate real-time data streaming capabilities, facilitating immediate processing and analysis of incoming data. This could enable the system to provide near-instantaneous alerts and insights, such as flagging potential claim denials before submission or identifying sudden changes in payor behavior that might impact revenue. In some implementations, the process could be enhanced with advanced data governance features, such as automated data quality checks, data lineage tracking, and compliance monitoring to ensure adherence to healthcare data privacy regulations like HIPAA.

Figure 7:
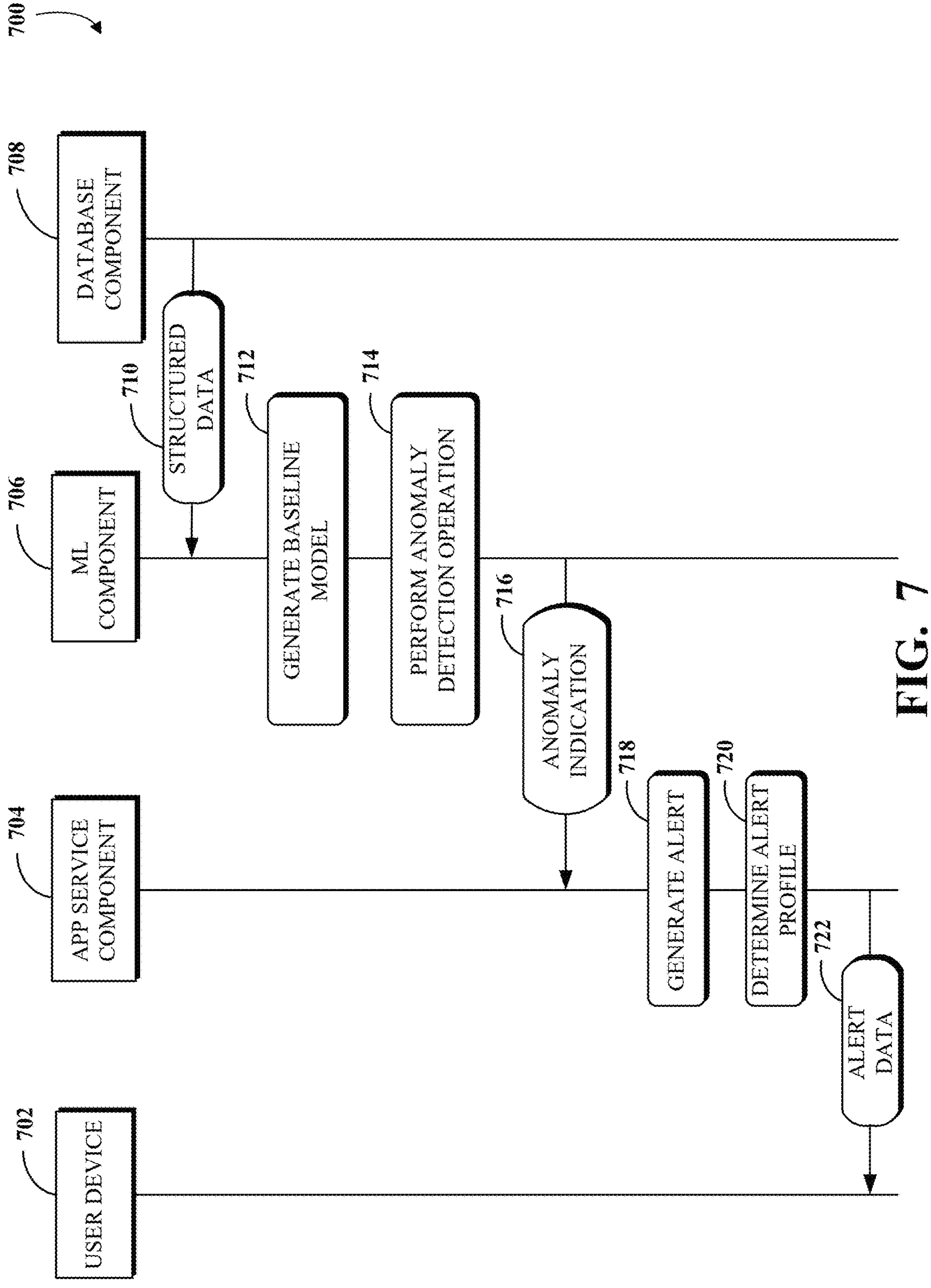
FIG. 7 is a flow diagram associated with providing alerts associated with healthcare workflows.

FIG. 7 illustrates a flow diagram of an example 700 of a process for providing alerts associated with healthcare workflows according to aspects of the present disclosure. The example 700 depicts the flow of data through various components of an AI system for healthcare revenue cycle management. The example 700 includes a user device 702, an application service component (shown as "app service component") 704, an ML component 706, and a database component 708.

The example 700 includes the ML component 706 accessing structured data 710 from the database component 708. The ML component generates a baseline model at operation 712. The baseline model establishes a reference point for normal behavior in the healthcare revenue cycle data. The baseline model may be created using historical claims data, including features such as patient demographics, diagnosis codes, procedure codes, or claim outcomes. In some implementations, the system may employ transfer learning techniques to adapt pre-trained models to specific healthcare organizations or specialties, allowing for faster model deployment and improved performance on smaller datasets.

Following the baseline model generation, the ML component 706 performs an anomaly detection operation 714. This operation includes analyzing incoming data against the baseline model to identify unusual patterns or deviations that may indicate issues in the revenue cycle. The anomaly detection operation 714 may utilize various techniques such as isolation forests, autoencoders, or clustering algorithms to flag potential problems like fraudulent claims, coding errors, or sudden changes in payor behavior. In some implementations, the anomaly detection operation 714 may incorporate time series analysis to detect temporal anomalies, such as unexpected spikes in denial rates or changes in payment patterns over time.

When the anomaly detection operation 714 identifies a deviation from the baseline that satisfies an alert condition, the ML component 706 transmits an anomaly indication 716 to the application service component 704. The anomaly indication 716 indication may serve as a trigger for an alert generation process. The anomaly indication 716 may include details about the nature of the anomaly, its severity, or the specific data points or trends that contributed to its detection. In some implementations, the system may employ explainable AI techniques to provide insights into why a particular anomaly was flagged, enhancing transparency and trust in the AI-driven alerting process.

Based on the anomaly indication 716, the application service component 704 generates an alert at operation 718. This operation involves transforming the technical anomaly detection results into actionable information for end-users. The alert generation process may consider factors such as the type of anomaly, its potential financial impact, or historical patterns to determine the urgency and relevance of the alert. In some embodiments, the application service component 704 may use natural language generation techniques to create human-readable alert descriptions that clearly communicate the issue and its implications.

The application service component 704 then determines an alert profile at operation 720, which may be used to tailor the alert presentation based on user-specific or role-specific preferences. This profiling step facilitates delivering alerts in a manner most relevant and actionable for each user. For example, a billing specialist might receive detailed alerts about specific claims, while a financial executive might see higher-level alerts about overall revenue trends. In some implementations, the alert profile determination operation 720 may incorporate ML to adapt to user behavior over time, improving the relevance and effectiveness of alerts based on how users interact with and respond to them.

The application service component 704 transmits the alert data 722, which is the formatted information, to the user device 702. This alert data may include various elements such as the alert description, relevant metrics, suggested actions, or links to more detailed information. In some implementations, the alert data may be designed to support interactive visualizations or augmented reality displays, helping users to explore the underlying data and context of the alert more intuitively.

The process of example 700 may be integrated with an orchestration engine (e.g., the orchestration engine 122 shown in FIG. 1A) to manage the alert lifecycle. When the ML component 706 performs the anomaly detection operation 714 and generates an anomaly indication 716, this indication may be sent to the orchestration engine. The orchestration engine may then create a new version of the VOO associated with the affected transactional workflow, storing the anomaly details as metadata. The creation of this new VOO version may, in turn, trigger a downstream orchestrated task, which would be the application service component 704 performing operations 718 and 720 to generate and deliver the appropriate alert data 722 to the user device 702.

The process of example 700 demonstrates an approach to AI-driven alerting in healthcare revenue cycle management. By leveraging ML for baseline modeling, anomaly detection, and personalized alert generation, the system can provide timely and actionable insights to healthcare providers. This approach may address the technical challenges of identifying and responding to revenue cycle issues in a complex and dynamic healthcare environment, enabling providers to optimize their financial operations and reduce revenue leakage.

Figure 8:
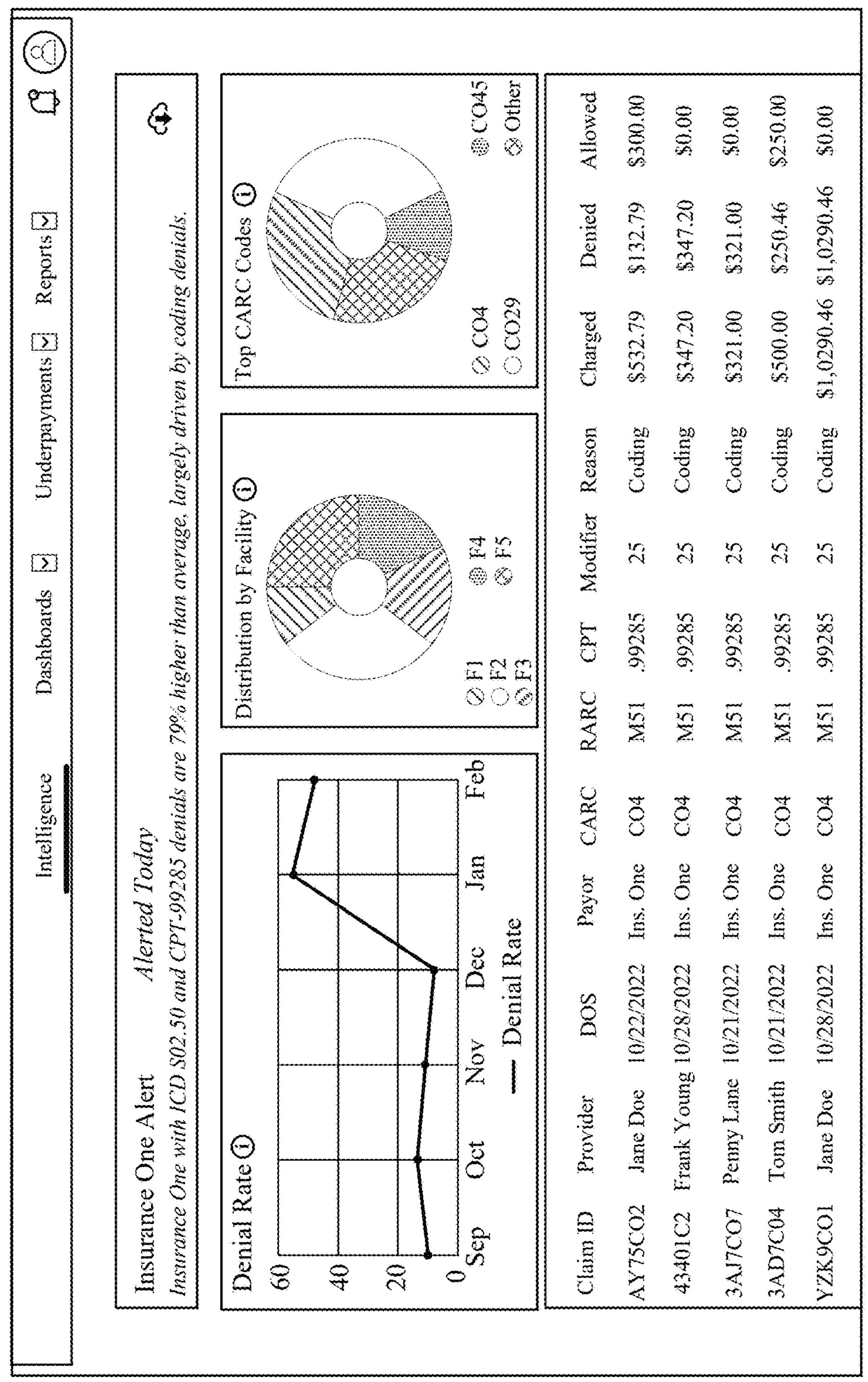
FIG. 8 is a diagram depicting an example of a graphical user interface (GUI) associated with providing alerts associated with healthcare workflows.

FIG. 8 illustrates a GUI 800 for displaying healthcare insurance claim analytics according to aspects of the present disclosure. The GUI 800 presents multiple data visualization components arranged in a dashboard layout, providing users with a comprehensive view of revenue cycle management metrics and insights.

The interface includes a line graph showing denial rate trends over time, with months from September through February plotted on the x-axis and denial rate percentages from 0 to 60 on the y-axis. This visualization may allow users to quickly identify patterns or anomalies in claim denials over the specified time period. In some implementations, the line graph may be interactive, allowing users to hover over data points for more detailed information or select specific time ranges for further analysis.

Adjacent to the line graph are two pie charts—one showing distribution by facility and another displaying top CARC (Claim Adjustment Reason Code) codes. These charts may provide users with a quick overview of how denials are distributed across different healthcare facilities and the most common reasons for claim adjustments. In some implementations, the GUI may offer options to switch between different chart types, such as bar charts or treemaps, to visualize this data in various formats based on user preferences.

The GUI 800 also contains a detailed data table with columns for claim ID, provider name, date of service (DOS), payor, CARC code, RARC (Remittance Advice Remark Code) code, CPT (Current Procedural Terminology) code, modifier, reason, and financial amounts including charged, denied, and allowed values. This table displays multiple claim records with associated information and monetary values, allowing users to drill down into specific claim details. In some implementations, the table may include sorting and filtering capabilities, enabling users to quickly locate and analyze specific subsets of claims based on various criteria.

The interface incorporates navigation elements and interactive components that allow users to access different views of the insurance claim data. These elements may include dropdown menus, tabs, or buttons that enable users to switch between different analytics dashboards or apply various filters to the displayed data. In some implementations, the GUI may incorporate a search functionality that allows users to quickly locate specific claims or providers within the dataset.

The layout of GUI 800 organizes the information in a structured format that enables users to analyze denial rates, claim distributions, and detailed claim information within a single view. This consolidated presentation of data may help healthcare providers quickly identify trends, anomalies, or areas requiring attention in their revenue cycle management processes. In some implementations, the GUI may include customization options that allow users to rearrange or resize different components of the dashboard based on their specific needs or preferences.

The GUI 800 may also incorporate AI-driven insights and recommendations based on the analyzed data. For example, the interface may highlight specific claims or trends that the AI system has identified as requiring immediate attention, or provide suggestions for optimizing billing practices based on historical patterns. In some implementations, the GUI may include a natural language interface that allows users to ask questions about their revenue cycle data and receive AI-generated responses and visualizations.

The data presented in the GUI 800 may be sourced from the latest versions of one or more VOOs stored in a database. For example, each row in the detailed data table may correspond to a specific VOO, with the columns displaying its current attributes. In some implementations, user interactions with the GUI 800 may generate state change data. For example, if a user manually updates a claim's status or adds a note, this action may be transmitted to an orchestration engine (e.g., the orchestration engine 122 shown in FIG. 1A). The orchestration engine may then create a new version of the corresponding VOO to record the user-initiated change, thereby ensuring that the versioned audit trail reflects both automated and manual interventions.

The GUI 800 represents one example configuration for displaying healthcare revenue cycle analytics, and various alternative arrangements and presentations may be implemented based on specific organizational needs or user preferences. In some implementations, the interface may feature different chart types, such as heat maps for temporal analysis, scatter plots for correlation visualization, or hierarchical tree maps for multi-dimensional data exploration. The layout may be configured with alternative arrangements, such as a tabbed interface for different analytical views, a split-screen design for comparative analysis, or a modular dashboard where users can customize widget placement and sizing. In some implementations, the system may support multiple interface themes optimized for different user roles, such as executive summary views with high-level KPIs, operational dashboards with detailed workflow metrics, or clinical interfaces that emphasize patient-centric data visualization. The data presentation may also be adapted for different device form factors, including mobile-optimized layouts for tablet access, large-screen configurations for conference room displays, or voice-activated interfaces for hands-free operation in clinical environments.

Figure 9:
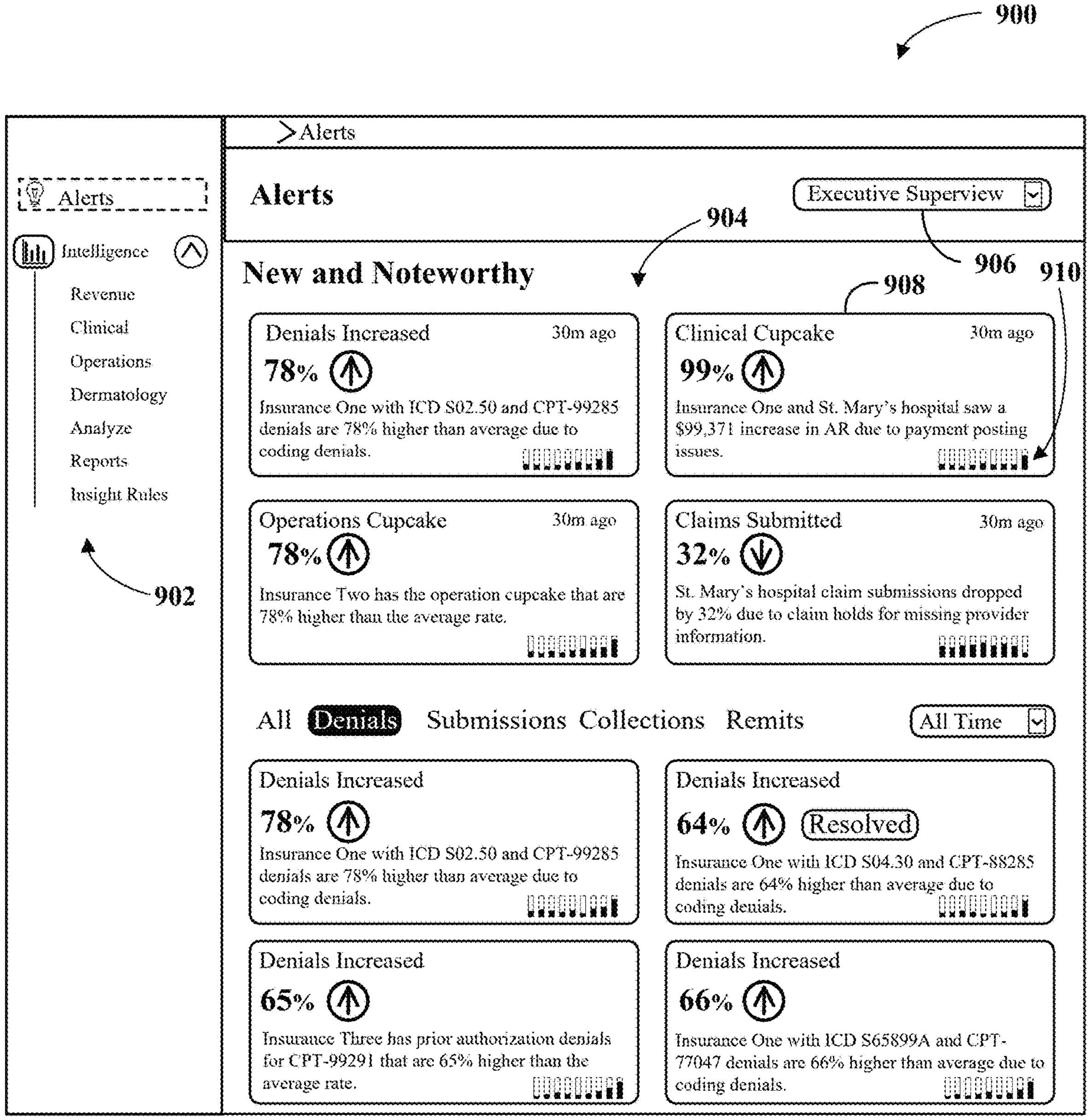
FIG. 9 is a diagram depicting another example of a GUI associated with providing alerts associated with healthcare workflows.

FIG. 9 illustrates a GUI 900 for displaying alerts and analytics according to aspects of the present disclosure. The GUI 900 comprises multiple interconnected components designed to provide users with a comprehensive view of revenue cycle management metrics, insights, and alerts.

The GUI 900 includes a navigation menu 902 positioned on the left side of the interface. The navigation menu 902 contains options for accessing various sections of the application, including Alerts, Intelligence, Revenue, Clinical, Operations, Dermatology, Analyze, Reports, and Insight Rules. In some implementations, the navigation menu 902 may be collapsible to provide more screen space for data visualization. Some embodiments may include additional menu items or allow for customization of the menu based on user preferences or role-specific access rights.

The main content area of the GUI 900 features an alert section 904 titled "Alerts" with a "New and Noteworthy" subsection. This alert section 904 may serve as a central hub for displaying important information and anomalies detected by the AI system. The alerts presented in this section may be generated based on various factors, such as unusual claim denial patterns, unexpected changes in revenue, or potential compliance issues. In some implementations, the alert section 904 may include additional categorization options or allow users to customize the types of alerts displayed based on their specific areas of responsibility.

A view selector 906 is positioned in the upper right corner of the GUI 900, allowing users to switch between different views of the data. The current selection shown is "Executive Superview," which may provide a high-level overview of KPIs and important alerts. Other view options might include detailed operational views, financial summaries, or specialty-specific dashboards. In some embodiments, the view selector 906 may incorporate ML algorithms to suggest the most relevant view based on the user's role, historical usage patterns, or current system status.

The alert section 904 displays alert cards 908, each presenting various metrics and notifications related to healthcare revenue cycle management. These alert cards 908 may be designed to provide quick, at-a-glance information about specific issues or trends. Each of the alert cards 908 typically includes a percentage value, descriptive text, and a sparkline 910 showing historical trends. The information presented on these cards may include metrics such as denial rates, operations metrics, and claims submission data. In some implementations, the alert cards 908 may be interactive, allowing users to drill down into more detailed information or take immediate action directly from the card interface.

The sparkline 910 featured on each of the alert cards 908 provides a compact, line graph-like visualization of the metric's trend over time. This visual representation may allow users to quickly assess whether a particular metric is improving, declining, or remaining stable. In some embodiments, the sparkline 910 may be color-coded to indicate positive or negative trends, or include markers for significant events or threshold crossings. Some implementations might offer the option to expand the sparkline 910 into a full-sized chart for more detailed analysis.

The alert cards 908 contain detailed information about insurance claims, including specific ICD and CPT codes, percentage changes, and the timing of alerts (e.g., "30 m ago"). This level of detail may allow users to quickly understand the nature and context of each alert. In some implementations, the system may use natural language generation techniques to create human-readable alert descriptions that clearly communicate the issue and its implications. Some embodiments might include the ability to customize the information displayed on the alert cards 908 based on user preferences or role-specific requirements.

The interface includes filtering options at the bottom of the alert section 904, allowing users to view alerts by categories such as "Denials," "Submissions," "Collections," and "Remits." These filters may enable users to focus on specific aspects of the revenue cycle that are most relevant to their responsibilities. A time period selector displays "All Time" as the current selection, allowing users to adjust the timeframe for the displayed alerts and metrics. In some implementations, the filtering system may incorporate AI-driven recommendations to suggest the most relevant filters based on the current state of the revenue cycle or the user's historical behavior.

The GUI 900 demonstrates an approach to presenting healthcare revenue cycle data and alerts in an intuitive and actionable format. By leveraging AI and ML techniques, the system may provide timely and relevant information to users, enabling them to quickly identify and address issues in their revenue cycle management processes. This approach may address the technical challenges of managing complex healthcare financial data, allowing healthcare providers to optimize their operations and improve their financial performance.

The alert cards 908 displayed in the GUI 900 may be generated in response to the state of one or more VOOs. An orchestration engine (e.g., the orchestration engine 122 shown in FIG. 1A) may be configured to monitor VOOs, and when a VOO enters a state that satisfies a predefined alert condition (e.g., a claim's status is changed to "denied"), it may trigger the generation of an alert card of the alert cards 908. Furthermore, a user's interaction with an alert card, such as an acknowledgement or the initiation of a resolution task, may be captured as state change data. The orchestration engine may then create a new version of the associated VOO to log the user's action, providing a closed-loop system for tracking the lifecycle of an alert from detection to resolution.

The GUI 900 represents one example configuration for displaying healthcare revenue cycle alerts and analytics, and various alternative arrangements and presentations may be implemented based on specific organizational needs or user preferences. In some implementations, the interface may feature different visualization types, such as heat maps for identifying patterns across multiple dimensions, network diagrams for visualizing relationships between different revenue cycle components, or geographic maps for analyzing performance across different locations or regions. The layout may be configured with alternative arrangements, such as a card-based interface where alert cards can be rearranged by users, a timeline view that shows alerts chronologically, or a priority-based layout that automatically organizes alerts by urgency or financial impact. In some implementations, the system may support multiple interface themes optimized for different user roles, such as executive dashboards with high-level summaries and trend indicators, operational interfaces with detailed workflow status and task assignments, or financial analyst views that emphasize monetary metrics and forecasting capabilities. The alert presentation may also be adapted for different interaction modalities, including touch-optimized layouts for tablet devices, keyboard-driven interfaces for power users, or voice-controlled systems that can announce alerts and accept verbal commands for common actions.

Figure 10A:
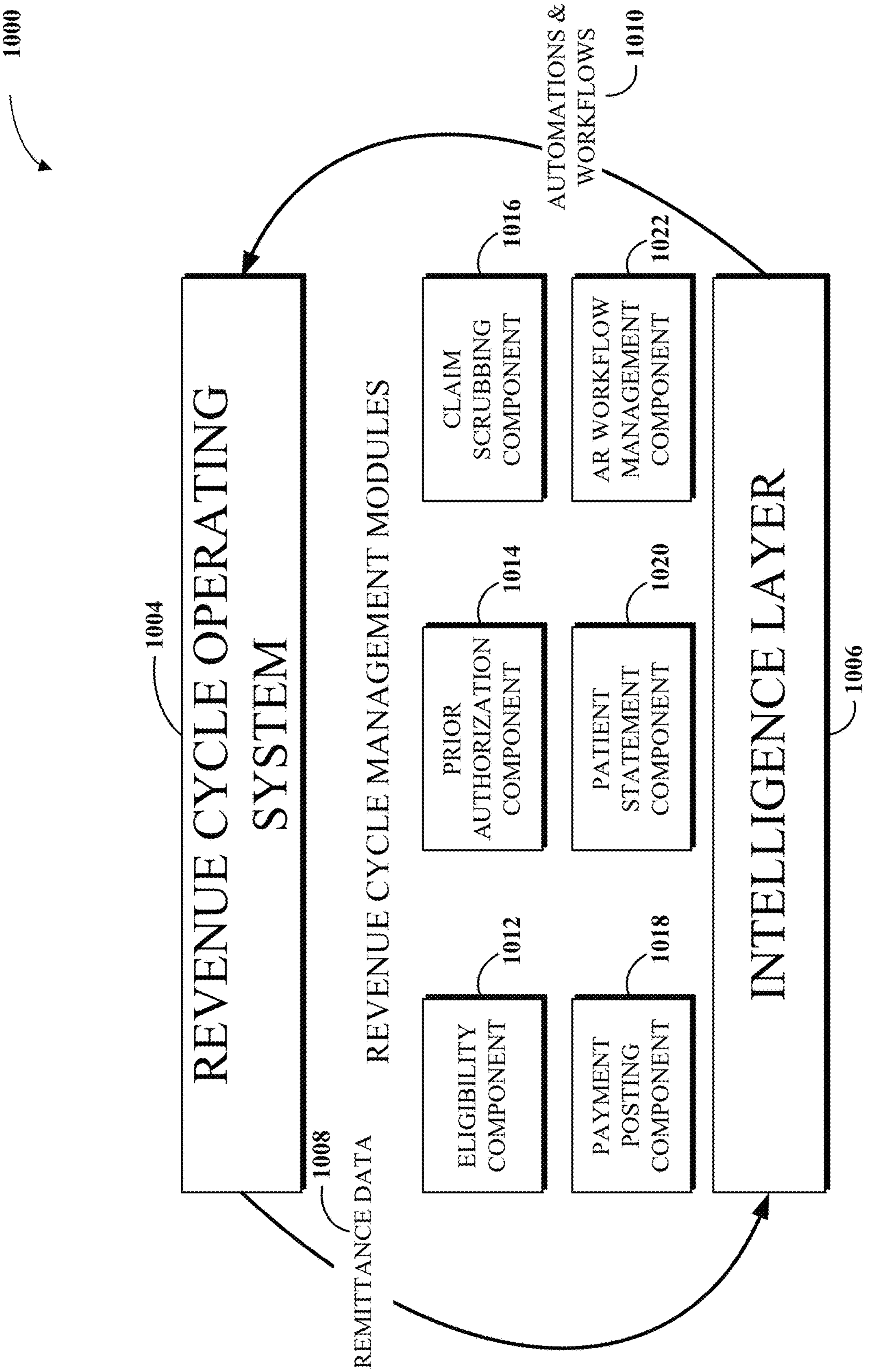
FIG. 10A illustrates a block diagram of an AI system for processing healthcare revenue cycle data.
Figure 10B:
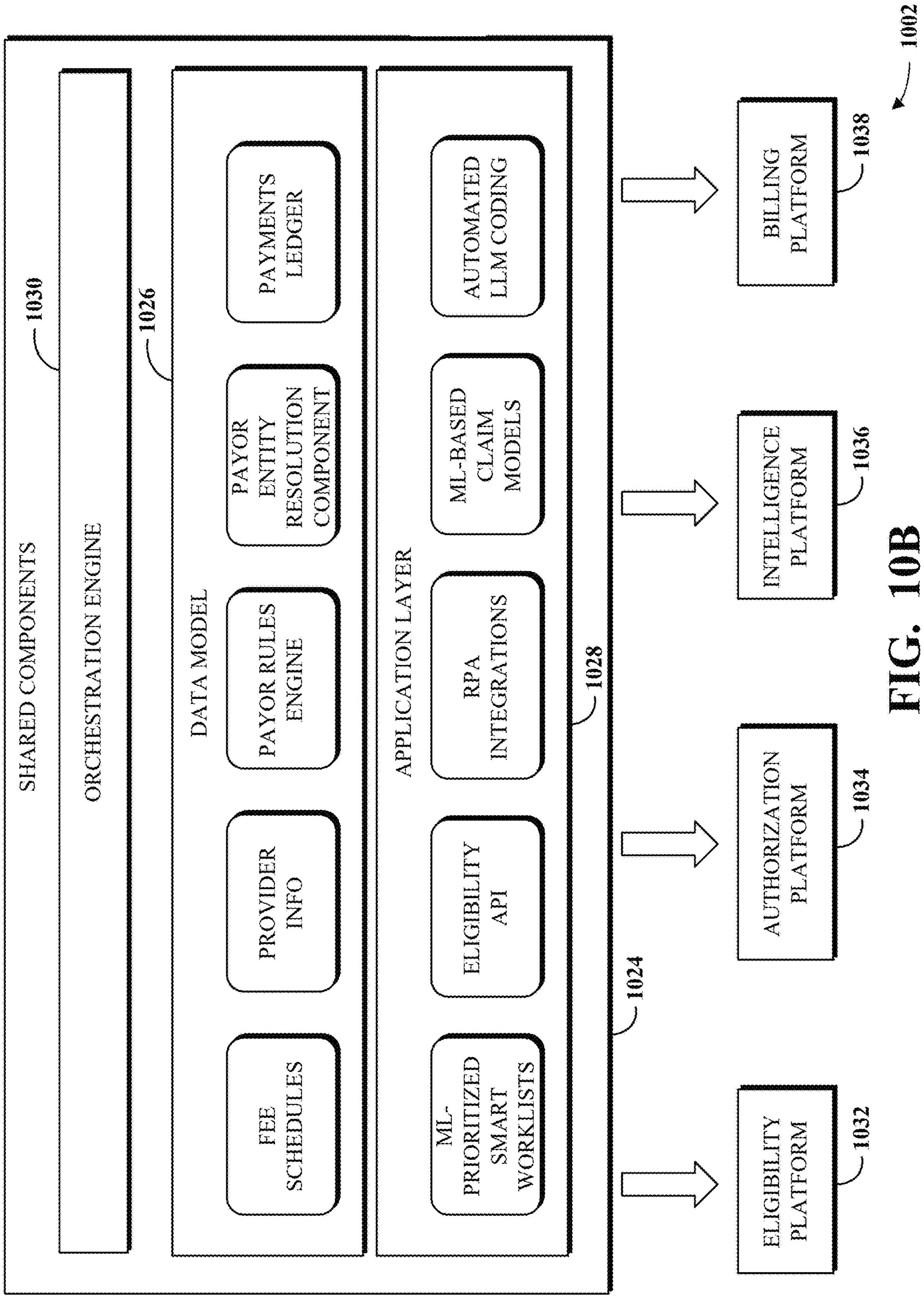
FIG. 10B illustrates a block diagram of a system architecture for processing healthcare revenue cycle data.

FIGS. 10A and 10B illustrate block diagrams of an AI system 1000 and a system architecture 1002 for processing healthcare revenue cycle data according to aspects of the present disclosure.

FIG. 10A depicts the AI system 1000, which includes an example of an operation cycle operating system (in this case, a revenue cycle operating system 1004) that processes remittance data 1008 and interfaces with an intelligence layer 1006. The revenue cycle operating system 1004 may serve as the core platform for managing and optimizing healthcare revenue cycle processes. In some implementations, the revenue cycle operating system 1004 may be implemented as a cloud-based solution, allowing for scalability and accessibility across multiple healthcare provider locations. In some implementations, the system may be deployed on-premises or in a hybrid cloud configuration, depending on the specific needs and regulatory requirements of healthcare providers.

The revenue cycle operating system 1004 contains multiple revenue cycle management modules arranged in a grid layout. These modules include an eligibility component 1012, which may be responsible for verifying patient insurance eligibility and benefits. In some implementations, the eligibility component 1012 may utilize real-time connectivity to payor systems to provide instant eligibility verification. In some implementations, it may employ a batch processing approach for high-volume eligibility checks during off-peak hours.

A prior authorization component 1014 is included for handling pre-authorizations for medical procedures and treatments. This component may incorporate rule-based engines to determine when prior authorizations are required based on procedure codes, payor policies, and patient information. In some implementations, the prior authorization component 1014 may include ML models to predict the likelihood of authorization approval and suggest optimal submission strategies.

The system also includes a claim scrubbing component 1016 for validating claims before submission. This component may employ a combination of rule-based checks and ML algorithms to identify potential errors or omissions in claim data. In some implementations, the claim scrubbing component 1016 may integrate with medical coding databases to ensure up-to-date coding validation. In some implementations, it may incorporate natural language processing capabilities to extract relevant information from clinical notes for claim validation.

A payment posting component 1018 is responsible for processing incoming payments and reconciling them with submitted claims. This component may utilize optical character recognition (OCR) and ML techniques to automate the ingestion and processing of remittance advice documents. In some implementations, the payment posting component 1018 may include advanced matching algorithms to handle complex payment scenarios, such as bundled payments or partial reimbursements.

The revenue cycle operating system 1004 also features a patient statement component 1020 for managing patient billing documents. This component may generate personalized patient statements based on remaining balances after insurance payments. In some implementations, the patient statement component 1020 may incorporate dynamic content generation capabilities to provide tailored explanations of charges and payment options based on patient demographics and payment history.

An AR workflow management component 1022 is included for accounts receivable processing. This component may utilize ML algorithms to prioritize and route accounts for follow-up based on factors such as age, amount, and likelihood of collection. In some implementations, the AR workflow management component 1022 may include predictive analytics capabilities to forecast cash flow and identify accounts at risk of becoming delinquent.

The automations and workflows 1010 connect the various components of the system, enabling data flow between modules. In some implementations, these automations may be implemented using robotic process automation (RPA) techniques to streamline repetitive tasks and reduce manual intervention. In some implementations, the system may employ a microservices architecture to facilitate modular development and deployment of individual workflow components.

The intelligence layer 1006 processes information from the revenue cycle operating system 1004 and provides analytical capabilities. This layer may incorporate various ML models, including supervised learning for predictive analytics, unsupervised learning for anomaly detection, and reinforcement learning for optimizing revenue cycle strategies. In some implementations, the intelligence layer 1006 may utilize federated learning techniques to improve model performance across multiple healthcare organizations while maintaining data privacy.

The remittance data 1008 flows between the revenue cycle operating system 1004 and the intelligence layer 1006, creating a feedback loop for continuous processing and analysis. This data may include detailed information about claim adjudication results, payment amounts, and denial reasons. In some implementations, the system may employ advanced data compression techniques to efficiently store and process large volumes of remittance data. In some implementations, it may utilize streaming data processing frameworks to enable real-time analysis of incoming remittance information.

The automations and workflows 1010 that connect the modules of the revenue cycle operating system 1004 may be managed by an orchestration engine (e.g., the orchestration engine 122 shown in FIG. 1A). In such an implementation, each transaction, such as a claim, managed by the system would have an associated VOO. As the transaction progresses through the different modules, from the eligibility component 1012 to the claim scrubbing component 1016 and the AR workflow management component 1022, each completed stage or action may trigger the orchestration engine to create a new version of the VOO. This process creates a granular, version-controlled record of every step in the transaction's journey through the revenue cycle operating system 1004.

FIG. 10B illustrates a system architecture 1002 for the revenue cycle operating system 1004. The system architecture 1002 includes shared components 1024 that work with various platforms to provide revenue cycle management functionality. The shared components 1024 include a data model 1026, an application layer 1028, and an orchestration engine 1030. The shared components 1024 may serve as foundational data structures and services used across the entire revenue cycle operating system. In some implementations, two or more of the shared components 1024 may be integrated into a single component. For example, the orchestration engine 1030 may be integrated with the application layer 1028.

The data model 1026 includes several elements: fee schedules, provider info, payor rules engine, payor entity resolution component, and payments ledger. In some implementations, the data model 1026 may utilize graph database technologies to represent complex relationships between healthcare entities and financial transactions. In some implementations, it may employ a hybrid data storage approach, combining relational databases for structured data with document stores for semi-structured information.

The data model 1026 may serve as the foundational data architecture that facilitates comprehensive representation and management of healthcare revenue cycle information across multiple dimensions. In some implementations, the data model 1026 may incorporate fee schedules that define reimbursement rates and payment structures for various medical procedures, services, or supplies across different payors and contract types. The provider information component may maintain detailed profiles of healthcare providers, including credentialing data, specialty classifications, network affiliations, and performance metrics. The payor rules engine may encode complex business logic and adjudication criteria specific to individual insurance companies, facilitating automated decision-making and claim processing based on payor-specific policies and requirements. In some implementations, the data model 1026 may utilize semantic modeling techniques to capture relationships between different healthcare entities and facilitate intelligent querying and analysis across disparate data elements.

The payor entity resolution component within the data model 1026 may address the challenge of identifying and reconciling payor information across multiple data sources and formats. This component may employ probabilistic matching algorithms and ML techniques to resolve variations in payor names, identifiers, and organizational structures that may occur across different systems and time periods. In some implementations, the entity resolution component may maintain a master payor registry that standardizes payor identifications and facilitates consistent reporting and analysis. The payments ledger may provide a comprehensive audit trail of all financial transactions within the revenue cycle, tracking payments, adjustments, refunds, or write-offs with detailed attribution to specific claims, patients, or payors. In some implementations, the payments ledger may incorporate blockchain technology to facilitate immutable transaction records and enhance data integrity for compliance and auditing purposes.

In some implementations, the data model 1026 may feature temporal versioning capabilities that preserve historical snapshots of data elements as they change over time, facilitating trend analysis and regulatory compliance reporting. The data model 1026 may also incorporate data lineage tracking to maintain visibility into the source and transformation history of each data element, facilitating data governance and quality assurance processes. Advanced indexing and partitioning strategies may be employed to optimize query performance across large datasets, while data compression and archival policies may manage storage costs and system performance. In some implementations, the data model 1026 may support real-time data synchronization with external systems through change data capture mechanisms, facilitating the revenue cycle operating system maintaining current and accurate information for decision-making and workflow automation.

The application layer 1028 includes multiple components that leverage the data model 1026 to deliver specific revenue cycle management functionalities. These components include ML-prioritized smart worklists, which may use ML algorithms to optimize task prioritization and assignment based on factors such as claim complexity, dollar amount, and likelihood of successful resolution. In some implementations, these worklists may incorporate natural language processing capabilities to analyze and categorize free-text notes associated with claims or denials.

An eligibility API is included in the application layer 1028, providing programmatic access to insurance eligibility verification services. This API may support both real-time and batch eligibility checks, allowing for flexible integration with various healthcare IT systems. In some implementations, the eligibility API may incorporate caching mechanisms to improve performance for frequently queried patient-payor combinations. In some implementations, the API may be called as part of an automated check responsively performed according to an event such as the receipt of input that triggers the check, a detection of an anomaly that triggers the check, or a prediction of an event that triggers the check, among other examples.

The application layer 1028 also features RPA integrations, which may automate repetitive tasks across different systems and interfaces involved in the revenue cycle. These integrations may include screen scraping capabilities for interacting with legacy systems that lack modern APIs. In some implementations, the RPA integrations may utilize computer vision techniques to navigate complex user interfaces and extract relevant information.

ML-based claim models are included in the application layer 1028, providing predictive capabilities for various aspects of the claims lifecycle. These models may predict the likelihood of claim denials, expected reimbursement amounts, or optimal timing for claim submission. In some implementations, these models may employ ensemble learning techniques, combining multiple algorithms to improve overall prediction accuracy and robustness.

The application layer 1028 also includes automated LLM coding, which may utilize large language models to assist with medical coding tasks. This component may analyze clinical documentation to suggest appropriate diagnosis and procedure codes. In some implementations, the automated LLM coding may incorporate domain-specific pre-training on medical literature and coding guidelines to enhance its performance in the healthcare context.

The orchestration engine 1030 may serve as a coordination hub that manages complex, multi-step workflows across the revenue cycle operating system. In some implementations, the orchestration engine 1030 may maintain a comprehensive view of all active workflows, tracking their current states, dependencies, and progression criteria. The orchestration engine 1030 may implement scheduling algorithms to optimize resource allocation and task sequencing, facilitating efficient workflow progression while respecting priority levels and deadline constraints. The orchestration engine 1030 may provide fault tolerance capabilities, automatically handling failures or exceptions by implementing retry mechanisms, alternative execution paths, or escalation procedures when workflows encounter unexpected conditions.

The orchestration engine 1030 may utilize event-driven architecture to respond dynamically to changes in workflow conditions or external system states. In some implementations, the orchestration engine 1030 may monitor multiple data streams and trigger appropriate actions based on predefined rules or ML-based decision models. The orchestration engine 1030 may support both synchronous and asynchronous workflow execution patterns, facilitating real-time processing of urgent tasks while managing longer-running background processes. The orchestration engine 1030 may implement workflow templates and reusable components, facilitating healthcare organizations to standardize their processes while maintaining flexibility to customize workflows for specific use cases or regulatory requirements.

In some implementations, the orchestration engine 1030 may provide comprehensive audit trails and performance analytics for all managed workflows. The orchestration engine 1030 may track execution times, resource utilization, success rates, or bottlenecks across different workflow types, facilitating continuous optimization of operational processes. The orchestration engine 1030 may support workflow versioning and rollback capabilities, facilitating organizations to safely deploy new workflow configurations while maintaining the ability to revert to previous versions if issues arise. The orchestration engine 1030 may integrate with external systems through standardized APIs and may support various workflow definition languages, making it adaptable to different organizational needs and existing technology stacks.

The shared components 1024 operate to provide platform components such as, for example, an eligibility platform 1032, an authorization platform 1034, an intelligence platform 1036, and a billing platform 1038. This modular architecture may allow for flexible deployment and scaling of individual platform components based on specific organizational needs. In some implementations, each platform may be containerized to facilitate easy deployment and management across different computing environments.

Figure 11:
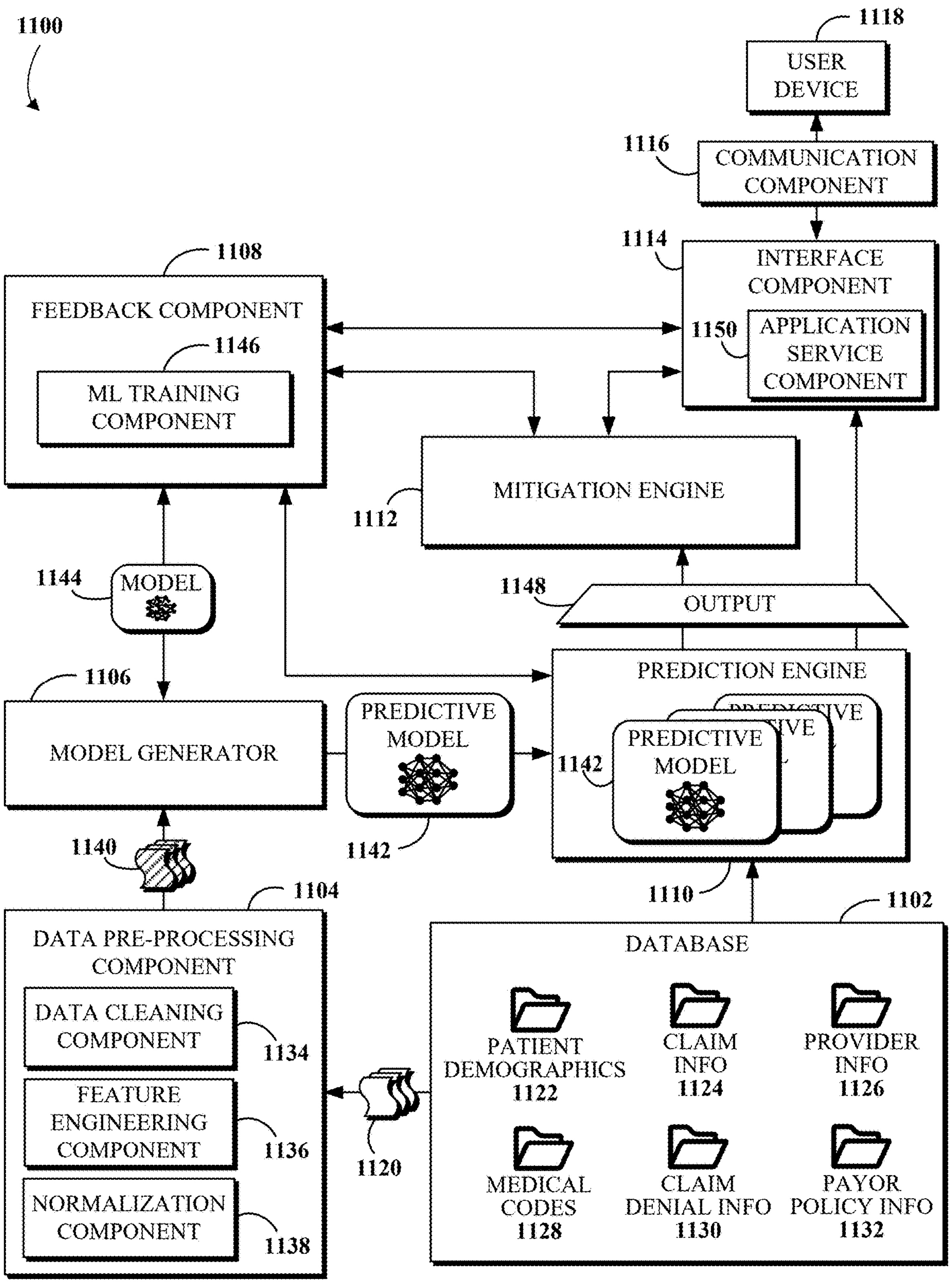
FIG. 11 illustrates a block diagram of an AI system for processing healthcare claims data.

FIG. 11 illustrates a block diagram of an AI system 1100 for processing healthcare claims data according to aspects of the present disclosure. The AI system 1100 comprises multiple interconnected components designed to process, analyze, and optimize healthcare revenue cycle management data. In some implementations, the AI system 1100 may be, be similar to, include, or be included in, the AI system 100 shown in FIG. 1A.

The AI system 1100 includes a database 1102 that stores various types of healthcare-related information. The database 1102 may be, be similar to, include, or be included in the database component 114 shown in FIG. 1A. The database 1102 may contain patient demographics 1122, claim information 1124, provider information 1126, medical codes 1128, claim denial information 1130, and payor policy information 1132. In some implementations, the database 1102 may utilize advanced database technologies to efficiently manage large volumes of healthcare data. For example, the database 1102 might employ a combination of relational and NoSQL databases to accommodate the diverse types of data encountered in revenue cycle management. In some implementations, the database 1102 could incorporate a data lake architecture to store and analyze large volumes of unstructured and semi-structured data, providing greater flexibility for future analytics and ML applications.

A data preprocessing component 1104, included in the AI system 1100, may be configured to receive input data 1120 (e.g., from the database 1102) and process it through any number of subcomponents. These subcomponents may include a data cleaning component 1134, a feature engineering component 1136, and a normalization component 1138, among other examples. In some implementations, two or more of the data cleaning component 1134, the feature engineering component 1136, and the normalization component 1138 may be integrated into a single component. In some implementations, the data preprocessing component 1104 may employ advanced ETL (Extract, Transform, Load) processes, utilizing ML algorithms to automate data cleansing and normalization tasks.

The data cleaning component 1134 may be configured to identify and correct various data quality issues that commonly occur in healthcare revenue cycle datasets. In some implementations, the data cleaning component 1134 may employ ML algorithms to automatically detect anomalies, inconsistencies, and errors within the input data 1120. The data cleaning component 1134 may address issues such as duplicate records, missing values, formatting inconsistencies, or invalid data entries that could compromise the accuracy of downstream analytics and decision-making processes. For example, the data cleaning component 1134 may standardize patient identifiers across different healthcare systems, correct misspelled provider names, or validate medical code formats against established coding standards such as ICD-10 or CPT. In some implementations, the data cleaning component 1134 may utilize pattern recognition techniques to identify and flag suspicious data patterns that may indicate data entry errors or system malfunctions.

The data cleaning component 1134 may implement sophisticated validation rules and business logic specific to healthcare revenue cycle management. In some implementations, the data cleaning component 1134 may cross-reference claim data against known payor policies to identify potential discrepancies or conflicts that could lead to claim denials. The data cleaning component 1134 may perform temporal validation to ensure that dates of service, claim submission dates, or payment dates follow logical sequences and fall within acceptable timeframes. The data cleaning component 1134 may employ fuzzy matching algorithms to reconcile variations in entity names, addresses, or other identifying information across different data sources. In some implementations, the data cleaning component 1134 may maintain data quality metrics and generate reports that provide visibility into the types and frequencies of data issues encountered, facilitating healthcare organizations to identify and address systemic data quality problems at their source.

In some implementations, the data cleaning component 1134 may incorporate feedback mechanisms that learn from user corrections and system outcomes to continuously improve its data cleaning capabilities. The data cleaning component 1134 may utilize ML models trained on historical data cleaning decisions to automate routine corrections while flagging more complex issues for human review. The data cleaning component 1134 may implement configurable rules engines that allow healthcare organizations to customize data cleaning procedures based on their specific requirements, regulatory constraints, or operational preferences. In some implementations, the data cleaning component 1134 may provide real-time data cleaning capabilities, processing incoming data streams and applying corrections immediately upon ingestion to ensure that clean, validated data is available for immediate use by other system components.

The feature engineering component 1136 may employ NLP techniques to extract relevant information from unstructured clinical notes and payor correspondence. In some implementations, the AI system may utilize a combination of named entity recognition (NER) and relation extraction models to identify and categorize elements within the text. For example, a bidirectional long short-term memory (BiLSTM) network with a conditional random field (CRF) layer may be used to recognize and label entities such as medical conditions, procedures, medications, and dates within clinical notes. This NER model may be pre-trained on large corpora of medical text and fine-tuned on domain-specific datasets to improve accuracy in identifying healthcare-specific entities.

To extract relationships between identified entities, the feature engineering component 1136 may employ attention-based transformer models, such as BERT (Bidirectional Encoder Representations from Transformers) or its biomedical variant BioBERT. These models may be used to classify the semantic relationships between entities, such as "medication treats condition" or "procedure performed on date." In some cases, the feature engineering component 1136 may incorporate a graph convolutional network (GCN) to capture complex, multi-hop relationships within the clinical narrative. The extracted structured information may then be mapped to standardized medical codes (e.g., ICD-10, CPT) using a combination of rule-based systems and ML classifiers, facilitating integration with other structured data in the revenue cycle management process.

The feature engineering component 1136 may employ techniques to create relevant features for healthcare revenue cycle prediction tasks. In some implementations, the system may utilize domain-specific knowledge to generate complex features that capture nuanced relationships within the healthcare data. For example, the feature engineering component 1136 may create temporal features that track the progression of a patient's treatment over time, combining information from multiple encounters and procedures. These temporal features may include the time between related procedures, the sequence of diagnoses, or the frequency of certain types of claims for a given patient. In some implementations, the system may generate features that capture the interactions between different medical codes, such as the co-occurrence of specific diagnosis and procedure codes, which may be indicative of certain billing patterns or potential areas for denial.

In some implementations, the feature engineering component 1136 may incorporate domain-specific knowledge to create relevant features for healthcare revenue cycle prediction tasks. The feature engineering component 1136 may incorporate domain-specific knowledge to create relevant features for healthcare revenue cycle prediction tasks by leveraging expert insights and industry-specific patterns. In some implementations, the feature engineering component 1136 may utilize a knowledge graph that encapsulates relationships between various healthcare concepts, such as diagnoses, procedures, medications, and billing codes. This knowledge graph may be constructed using medical ontologies, clinical guidelines, and historical billing data to capture complex interactions that influence revenue cycle outcomes.

For example, the feature engineering component 1136 may generate features that reflect the complexity of a patient's case based on the combination of diagnoses and procedures. The feature engineering component 1136 may assign higher complexity scores to cases involving multiple chronic conditions or intricate surgical procedures, as these may be associated with increased likelihood of claim denials or longer processing times. In some implementations, the feature engineering component 1136 may create features that capture the alignment between diagnoses and procedures, flagging potential mismatches that could lead to claim rejections. For instance, the feature engineering component 1136 may generate a "diagnosis-procedure coherence" feature that quantifies how well the documented diagnoses support the billed procedures based on established medical guidelines and historical billing patterns.

In some cases, the feature engineering component 1136 may incorporate temporal aspects of patient care into the generated features. The feature engineering component 1136 may create sequence-based features that capture the progression of treatments over time, such as the order and timing of diagnostic tests, procedures, and follow-up visits. These temporal features may help predict the likelihood of claim denials based on the adherence to expected care pathways or the presence of gaps in documentation. Furthermore, the feature engineering component 1136 may generate features that reflect the historical performance of specific provider-payor combinations, such as average claim processing times or denial rates for particular types of procedures. These provider-payor interaction features may help the AI system account for variations in billing practices and payor policies that can impact revenue cycle outcomes.

The feature engineering component 1136 may also leverage domain-specific knowledge to create features that capture regulatory and compliance aspects of healthcare billing. The feature engineering component 1136 may generate features that reflect the adherence to specific documentation requirements for different types of claims, such as the presence of required modifiers or the completeness of supporting clinical notes. In some implementations, the feature engineering component 1136 may create composite features that combine multiple regulatory factors to produce a "compliance score" for each claim, helping to predict the likelihood of audits or denials based on documentation quality. In some implementations, the feature engineering component 1136 may incorporate external data sources, such as updates to billing guidelines or changes in payor policies, to generate dynamic features that reflect the current regulatory landscape and its potential impact on claim outcomes.

The data preprocessing component 1104 outputs preprocessed data 1140 to a model generator 1106. This model generator 1106 may be configured to create a predictive model 1142 based on the preprocessed data. In some implementations, the model generator 1106 may employ any number of various ML techniques to create the predictive model 1142, such as logistic regression, random forests, gradient boosting machines, neural networks, or support vector machines. The choice of model may depend on factors such as the specific prediction task, the nature of the available data, or the desired balance between model interpretability and predictive performance, among other examples.

The normalization component 1138 may implement any number of techniques to facilitate consistency across diverse data sources and facilitate accurate analysis. In some cases, the system may employ adaptive normalization strategies that adjust based on the specific characteristics of each data source. For instance, when dealing with laboratory results from different facilities, the normalization component 1138 may use a combination of statistical methods and ML algorithms to align different reference ranges and units of measurement. This may involve techniques such as z-score normalization or quantile normalization, with the specific approach selected based on the distribution of the data. Furthermore, the normalization component 1138 may incorporate external reference data, such as standardized medical ontologies or regional healthcare benchmarks, to facilitate that normalized values are meaningful and comparable across different healthcare contexts.

In some implementations, the data preprocessing component 1104 may include a data augmentation module that enhances the quality and quantity of training data for ML models. This module may employ techniques such as synthetic data generation or data perturbation to create additional training examples that improve model robustness and generalization. For instance, the AI system may use GANs to create synthetic medical claims that mimic the characteristics of real claims, helping to balance datasets for rare conditions or uncommon billing scenarios. In some implementations, the data augmentation module may apply controlled noise or variations to existing data points, simulating different scenarios such as data entry errors or variations in coding practices. This augmented dataset may help train models that are more resilient to real-world data inconsistencies and variations in healthcare billing practices.

In some implementations, the AI system may employ pre-processing techniques to facilitate the identification and prediction of anomalies across data from disparate sources. The feature engineering component 1136 may utilize cross-source feature extraction, where features are derived from multiple data sources simultaneously. For example, the AI system may combine patient demographic information from an EHR system with claims data from a practice management system to create composite features that capture the relationship between patient characteristics and claim outcomes. This cross-source feature engineering may facilitate the AI system to identify complex patterns that would not be apparent when analyzing each data source in isolation.

The AI system may implement a dynamic feature selection process that adapts to changing patterns in healthcare data over time. This process may involve continuously evaluating the relevance and predictive power of features across different data sources. For instance, the AI system may use techniques such as mutual information analysis or recursive feature elimination to periodically reassess which features are most informative for anomaly detection and prediction. This dynamic approach may help the AI system to maintain high performance even as healthcare regulations, billing practices, and payor policies evolve.

Feedback and retraining mechanisms may play a role in enhancing the AI system's ability to identify and predict anomalies across disparate data sources. The AI system may incorporate a multi-level feedback loop that captures input from various stakeholders in the revenue cycle management process. For example, billing specialists may provide feedback on false positive anomalies, while financial analysts may offer insights on newly emerging patterns. This diverse feedback may be used to fine-tune the anomaly detection models and adjust feature importance weights. In some implementations, the AI system may employ transfer learning techniques to leverage knowledge gained from one healthcare provider or specialty to improve anomaly detection in others, potentially accelerating the learning process for new clients or expanding to new medical domains.

In some implementations, the model generator 1106 may select the appropriate ML model based on the specific prediction task and the characteristics of the available data. For example, when predicting the likelihood of claim denials, the AI system may employ a logistic regression model due to its interpretability and ability to provide clear insights into the factors contributing to denials. This approach may be particularly useful when healthcare providers need to understand and explain the reasons behind predicted denials to their staff or patients. In some implementations, for more complex tasks such as predicting expected reimbursement amounts, the system may utilize gradient boosting machines or random forests, which can capture non-linear relationships and interactions between various features in the claims data.

The model selection process may also consider the volume and diversity of available data. In cases where the healthcare organization has a large dataset with many features, the system may opt for deep learning models such as neural networks, which can automatically learn hierarchical representations from the data. These models may be especially effective for tasks like predicting optimal claim submission timing, where complex temporal patterns in historical data may influence outcomes. On the other hand, for smaller datasets or when rapid model development is required, the system may choose simpler models like support vector machines, which can perform well with limited training data and provide faster training times. In some cases, the model generator 1106 may employ AutoMIL techniques to systematically evaluate multiple model types and select the best performing one based on predefined performance metrics such as accuracy, precision, or area under the ROC curve.

The generation of the training data set may involve aggregating historical claims data from multiple healthcare providers across various specialties and geographical regions. This comprehensive dataset may include a wide range of information such as patient demographics, diagnosis codes, procedure codes, claim amounts, payor information, and claim outcomes (e.g., approved, denied, partially paid). The AI system may also incorporate data from EHRs, practice management systems, clearinghouses, and payor portals to enrich the training dataset with additional context and metadata.

In some implementations, the training data set may be augmented with synthetic data generated using techniques such as GANs or variational autoencoders (VAEs). These synthetic data points may help balance the dataset for rare conditions or uncommon billing scenarios, improving the model's ability to generalize across a wide range of cases. For example, the AI system may generate synthetic claims for rare procedures or complex combinations of diagnoses that are not well-represented in the original dataset, facilitating that the model can handle these scenarios effectively.

The retraining data set may be updated with new claims data as it becomes available, allowing the model to adapt to changing patterns in healthcare billing and payor behavior. This dynamic retraining process may involve a sliding window approach, where the most recent data is given more weight in the training process. For instance, the AI system may prioritize claims data from the past 6-12 months while still retaining some historical context from older data. In some implementations, the retraining data set may incorporate feedback from human billers and revenue cycle managers, capturing information about successful appeals, coding corrections, and other manual interventions that lead to positive claim outcomes.

In some cases, the AI system may employ active learning techniques to identify the most informative samples for retraining. This approach may involve selecting claims that the current model is uncertain about or that represent edge cases in the data distribution. For example, if the model consistently misclassifies certain types of claims or struggles with specific payor-provider combinations, these cases may be prioritized in the retraining data set. The AI system may also leverage the network effect of its user base, identifying trends and patterns across multiple healthcare providers to enhance the retraining process and improve the model's performance across diverse scenarios.

A prediction engine 1110 may utilize the predictive model 1142 generated by the model generator 1106. This prediction engine 1110 may include (or access) any number of instances of the predictive model 1142 to facilitate generation of a prediction output 1148. In some implementations, the prediction engine 1110 may use ensemble methods, combining predictions from multiple models to improve overall accuracy and robustness. In some implementations, the prediction engine 1110 may employ online learning techniques to update the predictive models based on new data, facilitating relevant predictions in the face of changing healthcare regulations and payor policies.

The prediction engine 1110 may generate predictions using a multi-stage process that incorporates various data sources and ML techniques. In some implementations, the prediction engine 1110 may first analyze historical claim data to identify patterns and trends associated with successful and denied claims. This analysis may include examining factors such as diagnosis codes, procedure codes, patient demographics, provider information, and payor-specific policies. The prediction engine 1110 (and/or the feature engineering component 1136) may use these insights to create feature vectors for each new claim, representing the relevant characteristics that influence the likelihood of approval or denial.

In some cases, the prediction engine 1110 may employ a hierarchical approach to generate predictions. For example, the prediction engine 1110 may first use a high-level model to categorize claims into broad risk categories (e.g., low, medium, high risk of denial). Subsequently, specialized models tailored to each risk category may be applied to generate more precise predictions. This approach may facilitate the system to capture both general trends and nuanced patterns specific to different types of claims or payors.

The prediction engine 1110 may incorporate real-time data feeds to enhance its predictive capabilities. For instance, the prediction engine 1110 may monitor payor websites and policy updates to detect changes in reimbursement rules or documentation requirements. This information may be used to dynamically adjust prediction models, helping the system to remain responsive to evolving healthcare regulations and payor behaviors. In some implementations, the prediction engine 1110 may use natural language processing techniques to analyze payor correspondence and automatically extract new rules or policy changes that could affect claim outcomes.

To improve prediction accuracy, the system may leverage network effects by analyzing claim data across multiple healthcare providers. For example, if a particular payor begins denying claims for a specific procedure code more frequently, the system may detect this trend across its network of users and adjust its predictions accordingly for all affected providers. This approach may facilitate the prediction engine to identify and respond to industry-wide trends more quickly than traditional, siloed systems. In some implementations, the prediction engine may incorporate feedback loops that track the actual outcomes of submitted claims and use this information to continuously refine and improve its predictive models over time.

The AI system may leverage aspects of the ML process illustrated in FIG. 3 to aggregate and unify data from multiple sources for predictive modeling in healthcare revenue cycle management. The observation dataset 302 may represent the comprehensive collection of historical claims data, patient demographics, diagnosis codes, procedure codes, and other relevant information gathered from various healthcare providers, electronic health records, practice management systems, and payor portals. This diverse dataset may serve as the foundation for training the predictive models used in revenue cycle management.

In some implementations, the system may apply preprocessing techniques to transform the raw data in the observation dataset 302 into a unified format suitable for ML. This process may involve data cleaning, normalization, and feature engineering steps similar to those performed by the data preprocessing component 1104. The resulting preprocessed data may then be used to train a model 306, which could represent various ML algorithms such as logistic regression, random forests, or neural networks, depending on the specific prediction task and data characteristics. The trained model 308 may then be employed by the prediction engine 1110 to generate predictions for new input observations 310, which in this context may represent incoming claims or other revenue cycle events requiring analysis.

The system may also incorporate feedback loops and continuous learning mechanisms to refine and improve its predictive capabilities over time. For example, the target variable 314 generated by the trained model for each input observation may be compared to actual outcomes, such as claim approvals or denials. This feedback may be used to update the model through techniques like online learning or periodic retraining, facilitating that the predictive models remain accurate and relevant in the face of changing healthcare regulations and payor behaviors. In some implementations, the AI system may employ unsupervised learning techniques, as represented by the clustering operation 316 in FIG. 3, to identify patterns or groupings in the data that may not be immediately apparent, potentially uncovering new insights into factors affecting revenue cycle outcomes.

The AI system 1100 includes a feedback component 1108 that includes an ML training component 1146. The feedback component 1108 works with a trained model 1144 and interacts with both the model generator 1106 and a mitigation engine 1112 to improve system performance. In some implementations, the feedback component 1108 may employ reinforcement learning techniques to optimize the system's decision-making processes over time. In some implementations, the ML training component 1146 may use transfer learning approaches to adapt pre-trained models to specific healthcare organizations or specialties, allowing for faster model deployment and improved performance on smaller datasets.

The ML training component 1146 may employ a multi-faceted approach to continuously improve the system's predictions. In some implementations, the ML training component 1146 may utilize a combination of supervised and unsupervised learning techniques to refine the predictive models based on new data and outcomes. For example, as new claims are processed and their outcomes become known, the ML training component 1146 may update the model parameters to reflect the latest patterns and trends in claim approvals and denials. This ongoing training process may facilitate the system to adapt to changes in payor policies, healthcare regulations, and provider practices over time.

In some cases, the ML training component 1146 may implement a federated learning approach to leverage data from multiple healthcare providers while maintaining data privacy and security. This technique may facilitate the system to learn from a broader dataset without directly sharing sensitive patient or claim information between organizations. For instance, the ML training component 1146 may distribute model updates to individual healthcare providers, who then train the model on their local data and return only the updated model parameters. The system may then aggregate these updates to improve the global model, potentially capturing nuanced patterns that may not be apparent in any single provider's data alone.

The ML training component 1146 may incorporate active learning strategies to efficiently improve model performance in areas of uncertainty. In this approach, the system may identify claims or scenarios where the predictive model has low confidence and prioritize these cases for human review. For example, if the system encounters a new combination of procedure codes and diagnoses that it hasn't seen before, it may flag this claim for manual review by a billing specialist. The outcome of this review may then be used to update the model, improving its ability to handle similar cases in the future. This human-in-the-loop process may be particularly valuable for adapting to new medical procedures, emerging healthcare technologies, or changes in coding practices that may not be well-represented in historical data.

The mitigation engine 1112 processes the output from the prediction engine 1110. In some implementations, the mitigation engine 1112 may be responsible for generating recommendations or automating actions based on the predictions. For example, the mitigation engine 1112 might suggest preemptive measures to reduce the likelihood of claim denials or automate the process of addressing certain types of denials. In some implementations, the mitigation engine 1112 may employ rule-based systems in conjunction with ML models to facilitate that automated actions comply with healthcare regulations and organizational policies.

The mitigation engine 1112 may facilitate various actions to address potential claim denials and optimize the revenue cycle process. In some implementations, the mitigation engine 1112 may generate smart worklists that prioritize claims based on, for example, their likelihood of denial, expected reimbursement amount, or time sensitivity. These worklists may be dynamically updated as new information becomes available, helping facilitate focus, by billing staff, on their efforts on the most critical and high-value claims. For example, the system may assign higher priority to claims approaching timely filing deadlines or those with a high predicted probability of denial but also a high potential reimbursement value.

In some cases, the mitigation engine 1112 may provide detailed suggestions on how to prepare or fix claims to increase their chances of approval. These suggestions may include, for example, recommendations for additional documentation, coding modifications, or clarifications needed to support the claim. For instance, if the system detects that a particular combination of diagnosis and procedure codes frequently leads to denials for a specific payor, the mitigation engine 1112 may suggest alternative coding options or additional supporting documentation to include with the claim submission. The mitigation engine 1112 may leverage natural language processing capabilities to automatically generate appeal letters or documentation requests, tailoring the content based on the specific reasons for potential denial and the payor's known preferences.

The mitigation engine 1112 may facilitate rule changes and policy updates within the healthcare organization's billing processes. By analyzing patterns in successful and denied claims across multiple providers and payors, the mitigation engine 1112 may identify opportunities to update internal billing guidelines or create new rules to prevent common denial reasons. For example, if the system detects that a particular payor has recently changed its policy regarding pre-authorization requirements for certain procedures, the mitigation engine 1112 may suggest updating the organization's claim submission rules to automatically flag claims that require pre-authorization before submission. In some implementations, the mitigation engine may provide insights into the effectiveness of current billing practices, helping revenue cycle managers make data-driven decisions about process improvements and resource allocation.

The AI system 1100 interfaces with users through a user device 1118 connected via a communication component 1116. An interface component 1114 manages user interactions, while an application service component 1150 coordinates the various system operations and data flows between components. In some implementations, the interface component 1114 may provide customizable dashboards for different user roles, such as billing specialists, revenue cycle managers, or financial analysts. In some implementations, the application service component 1150 may implement a microservices architecture, allowing for greater flexibility and scalability in deploying and updating individual components of the AI system 1100.

The AI system 1100 demonstrates an approach to leveraging ML for healthcare revenue cycle management. For instance, in some implementations, the system obtains a first set of data (e.g., patient demographics 1122, claim information 1124) from the database 1102. The model generator 1106 may create an ML model based on this data, which is trained to become a predictive model 1142. This predictive model may bused by the prediction engine 1110 to determine predicted metrics associated with the revenue cycle, such as the likelihood of claim denials or expected reimbursement amounts.

In some implementations, the data preprocessing component 1104 performs various preprocessing operations on the structured data. These operations may include data cleaning (via component 1134), feature engineering (via component 1136), and normalization (via component 1138). The feature engineering component 1136 may identify a set of features associated with the first set of data, which could include claim amounts, medical codes, payor types, provider types, patient demographics, or statistics associated with historical metrics.

The system's ability to handle different types of ML models is evident in the flexibility of the model generator 1106 and prediction engine 1110. These components may work with various model types, including logistic regression, random forests, gradient boosting machines, neural networks, or support vector machines, depending on the specific requirements of the prediction task.

The feedback component 1108 and ML training component 1146 may implement techniques such as using weighted loss functions for imbalanced data, performing resampling operations on minority classes, and retraining the predictive model based on feedback information to continuously improve the system's performance.

In some implementations, the prediction output 1148 generated by the prediction engine 1110 may be used to create user interface elements for presentation on the user device 1118, or to trigger mitigation operations via the mitigation engine 1112. These mitigation operations could include recommendation systems or robotic process automation to address potential issues in the revenue cycle proactively.

The AI system 1100 may be fully integrated with an orchestration engine (e.g., the orchestration engine 122 shown in FIG. 1A) to manage the entire data processing and prediction workflow. The orchestration engine may create a VOO when input data 1120 is obtained from the database 1102. The operations of the data preprocessing component 1504 may generate state changes that are recorded as new versions of the VOO. The prediction output 1148 from the prediction engine 1110 may be received by the orchestration engine, which would create a new VOO version containing the prediction as metadata. Based on this new state, the orchestration engine may then invoke the mitigation engine 1112 to perform a mitigation operation, with the results of that operation being recorded in a subsequent version of the VOO, providing a complete end-to-end audit trail.

By integrating these various components and functionalities, the AI system 1100 provides a comprehensive solution for healthcare revenue cycle management, leveraging ML to improve prediction accuracy, streamline workflows, and ultimately optimize financial performance for healthcare providers.

Figure 12:
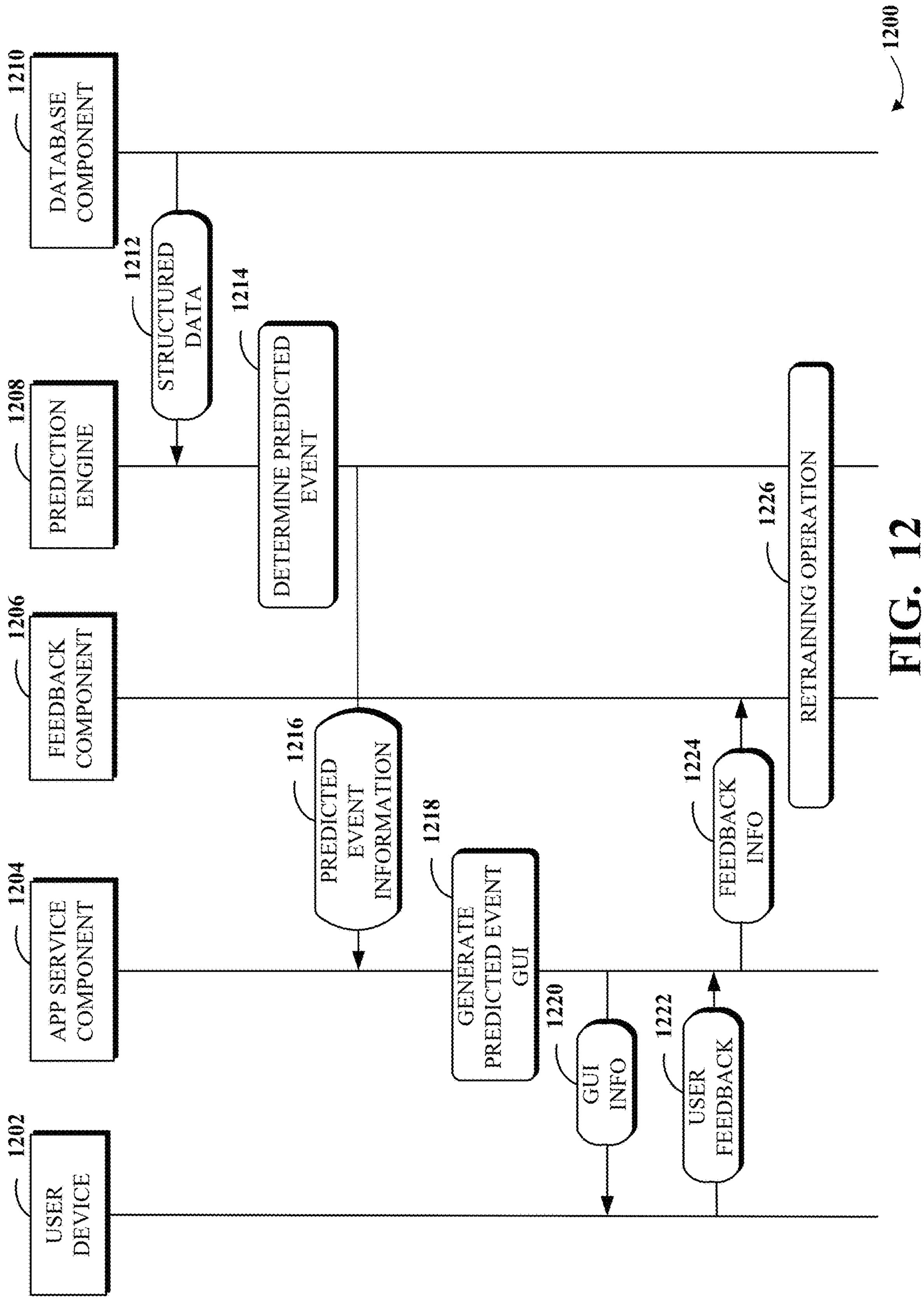
FIG. 12 is a flow diagram of an example of a process for handling predicted events and user feedback.

FIG. 12 is a flow diagram of an example 1200 of a process for handling predicted events and user feedback according to aspects of the present disclosure. The example 1200 depicts the flow of data through various components of an AI system for healthcare revenue cycle management. The example 1200 includes a user device 1202, an application service component (shown as "app service component") 1204, a feedback component 1206, a prediction engine 1208, and a database component 1210.

In some implementations, the user device 1202 may be, be similar to, include, or be included in the user device 1118 shown in FIG. 11, the user device 702 shown in FIG. 7, and/or the user device 104A or the user device 104B shown in FIGS. 1A and 1C. In some implementations, the application service component 1204 may be, be similar to, include, or be included in the application service component 1150 shown in FIG. 11, the application layer 1028 shown in FIG. 10B, the application service component 704 shown in FIG. 7, the application layer 510 shown in FIG. 5, the interface layer 408 shown in FIG. 4, the application service component 130 shown in FIGS. 1C and 1D, and/or the interface component 118 shown in FIGS. 1A and 1C. In some implementations, the feedback component 1206 may be, be similar to, include, or be included in the feedback component 1108 shown in FIG. 11, the feedback layer 410 shown in FIG. 4, and/or the feedback component 120 shown in FIGS. 1A and 1C. In some implementations, the prediction engine 1208 may be, be similar to, include, or be included in the prediction engine 1110 shown in FIG. 11, the intelligence layer 1006 shown in FIG. 10A, the ML component 706 shown in FIG. 7, the intelligence layer 512 shown in FIG. 5, the intelligence layer 406 shown in FIG. 4, the trained model 308 shown in FIG. 3, and/or the ML component 116 shown in FIGS. 1A, 1C, and 1D. In some implementations, the database component 1210 may be, be similar to, include, or be included in the database 1102 shown in FIG. 11, the data model 1026 shown in FIG. 10B, the database component 708 shown in FIG. 7, the database component 608 shown in FIG. 6, patient data repository 506 and/or the claim data repository 508 shown in FIG. 5, the data layer 402 shown in FIG. 4, the database 114A shown in FIGS. 1B, 1C, and 1D, and/or the database component 114 shown in FIGS. 1A, 1B, and 1C.

As shown, the prediction engine 1208 may access structured data 1212 from the database component 1210. The structured data 1212 may represent harmonized and normalized versions of input data from various data sources such as healthcare IT systems. The structured data 1212 may include various types of information relevant to healthcare revenue cycle management, such as patient demographics, insurance details, diagnosis and procedure codes, claim statuses, or payment information. In some implementations, the structured data 1212 may incorporate derived features or calculated metrics that provide additional insights into revenue cycle performance, such as predicted likelihood of claim denials or estimated time to payment. For instance, the system might generate a "complexity score" for each claim based on factors like the number of procedure codes, the rarity of the diagnosis, and the historical denial rate for similar claims.

The process involves an operation 1214 performed by the prediction engine 1208 to determine a predicted event based on the structured data 1212. This operation may involve applying one or more ML models to the input data to forecast various aspects of the revenue cycle. In some implementations, the operation 1214 might include multiple stages of prediction, such as first classifying claims into risk categories and then applying specialized models to each category for more precise predictions. For example, the system might first categorize claims as low, medium, or high risk for denial, and then use category-specific models to predict the exact probability of denial and the expected reimbursement amount. In some implementations, the operation 1214 could employ a single end-to-end deep learning model that takes in all available data and simultaneously predicts multiple outcomes, such as denial probability, expected payment amount, and optimal submission timing.

Based on determining the predicted event, the prediction engine 1208 provides predicted event information 1216 to the application service component 1204. The application service component 1204 receives the predicted event information 1216 and performs operation 1218 to generate a predicted event GUI. This operation may involve transforming the technical prediction results into user-friendly visualizations and actionable insights. In some implementations, operation 1218 might include generating interactive dashboards that allow users to explore the predictions from different angles and drill down into specific details. For instance, a high-level overview might show aggregate predictions for denial rates and expected revenue, with the ability to click through to view predictions for individual claims or providers. In some implementations, operation 1218 could generate natural language summaries of the predictions, using advanced language models to explain the key insights and recommended actions in plain English. The application service component 1204 provides GUI information (shown as "GUI info") 1220 to the user device 1202. The GUI information 1220 may be configured to cause the user device 1202 to present the GUI on a display of the user device 1202.

The user device 1202 can provide user feedback 1222 in response to the displayed predictions and insights. This feedback may include actions taken based on the predictions, corrections to inaccurate predictions, or general comments on the system's performance. In some implementations, the user feedback 1222 might be captured through explicit mechanisms like rating scales or feedback forms integrated into the user interface. For example, users might be prompted to rate the accuracy and usefulness of predictions after taking action on a claim. In some implementations, the system may employ implicit feedback mechanisms, such as tracking which predictions users act upon and which they ignore, to infer the perceived value and accuracy of different types of predictions.

The feedback component 1206 processes the user feedback 1222 into feedback information 1224, which is provided to the feedback component 1206 to facilitate improvement of the AI system's performance. This processing may involve aggregating feedback from multiple users, identifying patterns or trends in the feedback, and translating user actions into meaningful signals for model improvement. In some implementations, the feedback component 1206 might employ natural language processing techniques to extract insights from free-text feedback comments. For instance, the feedback component 1206 may identify common themes or sentiments expressed by users about different aspects of the system's predictions. In some implementations, the feedback component 1206 may use reinforcement learning techniques to continuously optimize the system's decision-making processes based on the outcomes of actions taken in response to its predictions.

The example 1200 concludes with operation 1226, where the feedback component 1206 uses the processed feedback information to update and improve the AI system by performing a retraining operation. This operation may involve retraining ML models, adjusting prediction thresholds, or refining the rules used for generating insights and recommendations. In some implementations, operation 1226 might include an automated model retraining pipeline that periodically updates the prediction models using the latest feedback and outcomes data. For example, the system could retrain its claim denial prediction model weekly, incorporating the latest feedback and actual claim outcomes to improve its accuracy. In some implementations, operation 1226 could involve a more nuanced approach, where different components of the system are updated at different frequencies or in response to specific triggers, such as detecting a significant shift in prediction accuracy for a particular type of claim.

The process of example 1200 may be managed by an orchestration engine (e.g., the orchestration engine 122 shown in FIG. 1A). The determination of a predicted event at operation 1214 may be treated as a state change that the orchestration engine captures by creating a new version of the VOO for the relevant transaction. The GUI information 1220 would then be generated based on the data contained in this latest VOO version. User feedback 1222 received from the user device 1202 may be processed as further state change data, which the orchestration engine may use to create another version of the VOO. This feedback-inscribed VOO version may then trigger the retraining operation 1226 as a subsequent, orchestrated step.

By implementing this comprehensive process for handling predicted events and user feedback, the AI system can continuously improve its performance and provide increasingly accurate and valuable insights for healthcare revenue cycle management. The iterative nature of the process, combined with the integration of advanced ML techniques and user feedback mechanisms, enables the system to adapt to the dynamic healthcare landscape and deliver personalized, actionable intelligence to its users.

Figure 13:
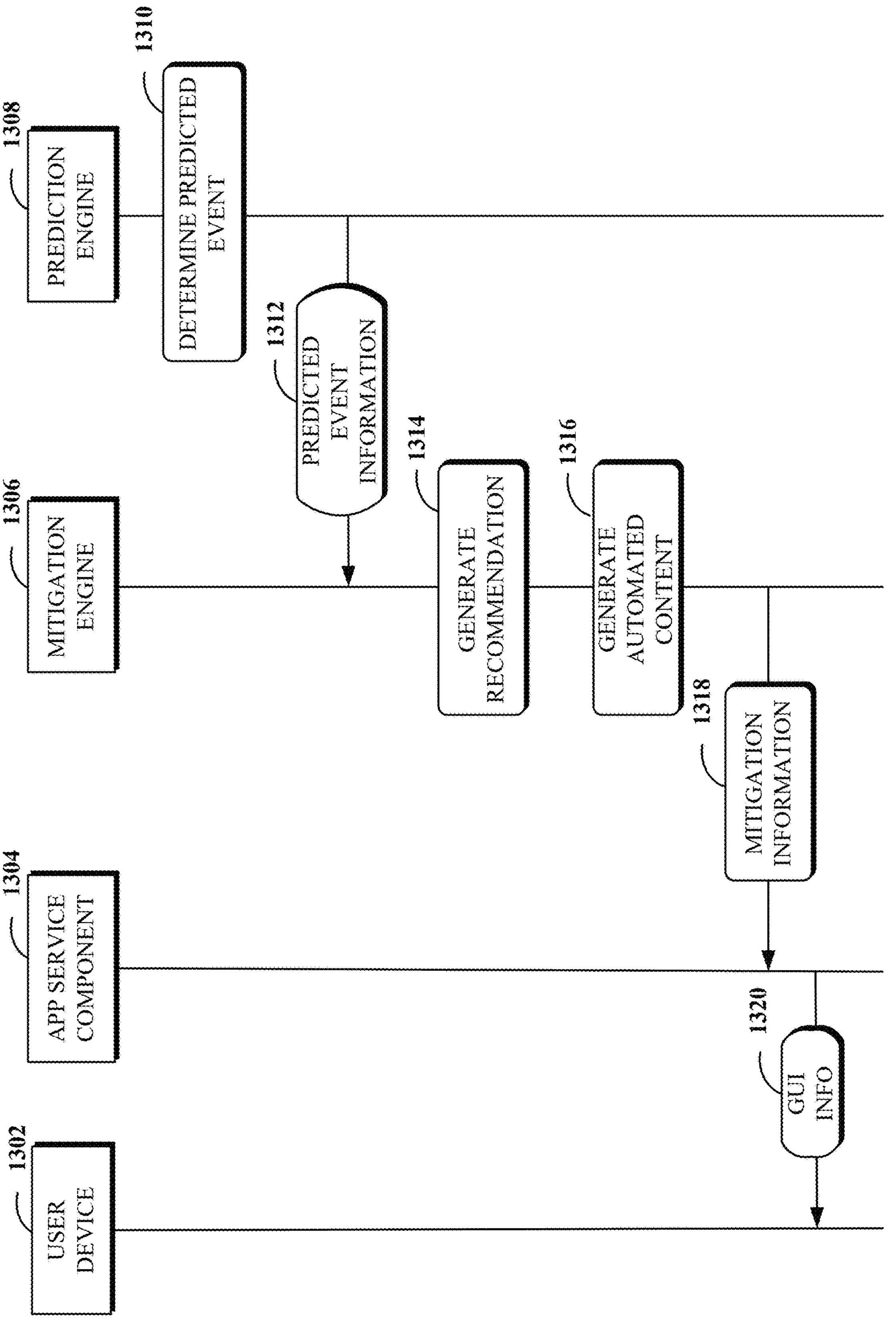
FIG. 13 is a flow diagram of an example of a process for generating and providing mitigation information.

FIG. 13 is a flow diagram of an example 1300 of a process for generating and providing mitigation information according to aspects of the present disclosure. The example 1300 depicts the flow of data through various components of an AI system for healthcare revenue cycle management. The example 1300 includes a user device 1302, an application service component 1304, a mitigation engine 1306, and a prediction engine 1308. One or more aspects associated with the example 1300 may be implemented using one or more computing devices such as, for example, the computing device 200 shown in FIG. 2.

In some implementations, the user device 1302 may be, be similar to, include, or be included in the user device 1202 shown in FIG. 12, the user device 1118 shown in FIG. 11, the user device 702 shown in FIG. 7, and/or the user device 104A or the user device 104B shown in FIGS. 1A and 1C. In some implementations, the application service component 1304 may be, be similar to, include, or be included in the application service component 1204 shown in FIG. 12, the application service component 1150 shown in FIG. 11, the application layer 1028 shown in FIG. 10B, the application service component 704 shown in FIG. 7, the application layer 510 shown in FIG. 5, the interface layer 408 shown in FIG. 4, the application service component 130 shown in FIGS. 1C and 1D, and/or the interface component 118 shown in FIGS. 1A and 1C. In some implementations, the mitigation engine 1306 may be, be similar to, include, or be included in the mitigation engine 1112 shown in FIG. 11, the application layer 1028 or the orchestration engine 1030 shown in FIG. 10B, the revenue cycle management modules (e.g., the eligibility component 1012, the prior authorization component 1014, the claim scrubbing component 1016, the payment posting component 1018, the patient statement component 1020, or the AR workflow management component 1022) shown in FIG. 10A, the ML component 706 shown in FIG. 7, the application layer 510 and/or the intelligence layer 512 shown in FIG. 5, the interface layer 406 shown in FIG. 4, the ML component 706 shown in FIG. 7, the trained model 308 shown in FIG. 3, and/or the ML component 116 shown in FIGS. 1A, 1C, and 1D. In some implementations, the prediction engine 1308 may be, be similar to, include, or be included in the prediction engine 1208 shown in FIG. 12, the prediction engine 1110 shown in FIG. 11, the intelligence layer 1006 shown in FIG. 10A, the ML component 706 shown in FIG. 7, the intelligence layer 512 shown in FIG. 5, the intelligence layer 406 shown in FIG. 4, the trained model 308 shown in FIG. 3, and/or the ML component 116 shown in FIGS. 1A, 1C, and 1D.

The process involves an operation 1310 performed by the prediction engine 1308 to generate a predicted event. This operation may involve applying one or more ML models to input data to forecast various aspects of the revenue cycle. In some implementations, the operation 1310 might include multiple stages of prediction, such as first classifying claims into risk categories and then applying specialized models to each category for more precise predictions. For example, the system might first categorize claims as low, medium, or high risk for denial, and then use category-specific models to predict the exact probability of denial and the expected reimbursement amount. In some implementations, the operation 1310 could employ a single end-to-end deep learning model that takes in all available data and simultaneously predicts multiple outcomes, such as denial probability, expected payment amount, and optimal submission timing.

Based on determining the predicted event, the prediction engine 1208 provides predicted event information 1216 to the mitigation engine 1306. The predicted event information 1312 generated by the prediction engine 1308 serves as input for subsequent mitigation operations. This information may include various types of predictions relevant to healthcare revenue cycle management, such as the likelihood of claim denials, expected reimbursement amounts, or potential bottlenecks in the billing process. In some implementations, the predicted event information 1312 may include confidence scores or uncertainty estimates associated with each prediction, helping downstream components to make more informed decisions. For example, the system might provide a range of possible outcomes for a claim, along with the probability of each outcome, rather than a single point estimate. In some implementations, the predicted event information 1312 could include explanations or interpretations of the predictions, using techniques like SHAP (SHapley Additive exPlanations) values to identify the key factors influencing each prediction.

At an operation 1314, the mitigation engine 1306 generates a recommendation based on the predicted event information 1312. This operation may involve analyzing the predictions and determining the most appropriate course of action to mitigate potential issues or optimize revenue cycle performance. In some implementations, operation 1314 may employ a decision tree or rule-based system to map different types of predictions to specific recommendations. For example, if the predicted probability of claim denial exceeds a certain threshold, the mitigation engine 1306 may recommend additional documentation or pre-submission review. In some implementations, operation 1314 may use an ML model trained on historical data to learn the most effective mitigation strategies for different scenarios, allowing the system to adapt its recommendations over time based on observed outcomes.

At an operation 1316, the mitigation engine 1306 generates automated content based on the recommendation produced by operation 1314. This operation may include creating various types of content to support the implementation of the recommended mitigation strategies. In some implementations, the operation 1316 may use natural language generation techniques to produce human-readable explanations of the recommendations, tailored to different user roles within the healthcare organization. For example, the mitigation engine 1306 may generate a detailed technical explanation for billing specialists, along with a high-level summary for executives. In some implementations, operation 1316 could produce automated scripts or workflows for robotic process automation systems, facilitating the direct implementation of certain mitigation actions without manual intervention.

The mitigation engine 1306 may provide, to the application service component 1304, mitigation information 1318 produced based on the operations 1314 and/or 1316. This mitigation information 1318 may include a combination of recommendations, supporting data, and automated content designed to address potential revenue cycle issues identified by the prediction engine. In some implementations, the mitigation information 1318 may be structured as a prioritized action plan, with specific steps and timelines for addressing each identified issue.

In some implementations, the mitigation information 1318 may be presented as an interactive dashboard that allows users to explore different mitigation scenarios and their potential impacts on revenue cycle performance. For example, the application service component 1304 may provide GUI information 1320 to the user device 1302 to cause the user device to present, on a display thereof, a GUI that includes the mitigation information 1318 and/or information generated based on the mitigation information 1318.

For example, the application service component 1304 may create various visual elements, such as charts, graphs, or interactive widgets, to effectively communicate the mitigation strategies and their potential impacts. In some implementations, the GUI info 1320 might be customized based on user roles or preferences, presenting different levels of detail or focusing on specific aspects of the mitigation plan depending on the intended audience. For example, a CFO might see a high-level overview of potential revenue impacts, while a billing specialist would receive detailed instructions for implementing specific mitigation actions. In some implementations, the GUI info 1320 may incorporate augmented reality elements, allowing users to interact with virtual representations of revenue cycle data in their physical environment.

The process of example 1300 may be coordinated by an orchestration engine (e.g., the orchestration engine 122 shown in FIG. 1A) utilizing a VOO. The generation of a predicted event at operation 1310 would trigger the orchestration engine to create a new version of the VOO, storing the predicted event information 1312 as metadata. Based on this new VOO state, the orchestration engine may then invoke the mitigation engine 1306 to perform operations 1314 and 1316. The resulting mitigation information 1318 would be recorded by the orchestration engine in a subsequent version of the VOO, ensuring that the recommended and automated mitigation actions are historically linked to the prediction that prompted them.

By implementing this comprehensive process for generating and providing mitigation information, the AI system can help healthcare providers proactively address potential revenue cycle issues and optimize their financial performance. The combination of advanced prediction capabilities, intelligent recommendation generation, and user-friendly presentation of mitigation strategies enables healthcare organizations to make data-driven decisions and implement effective solutions to complex revenue cycle challenges.

Figure 14A:
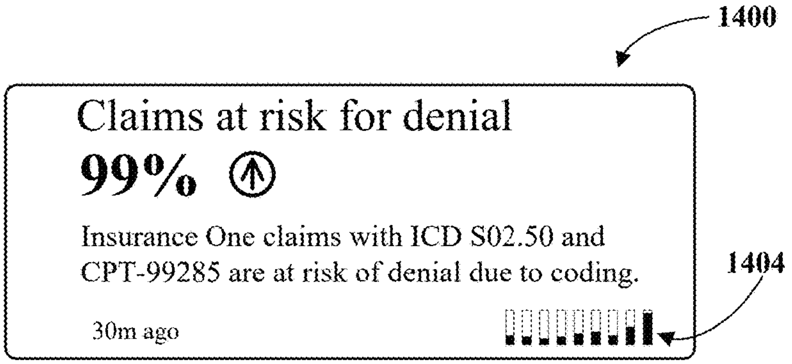
FIGS. 14A and 14B illustrate interfaces of a healthcare claims processing system.
Figure 14B:
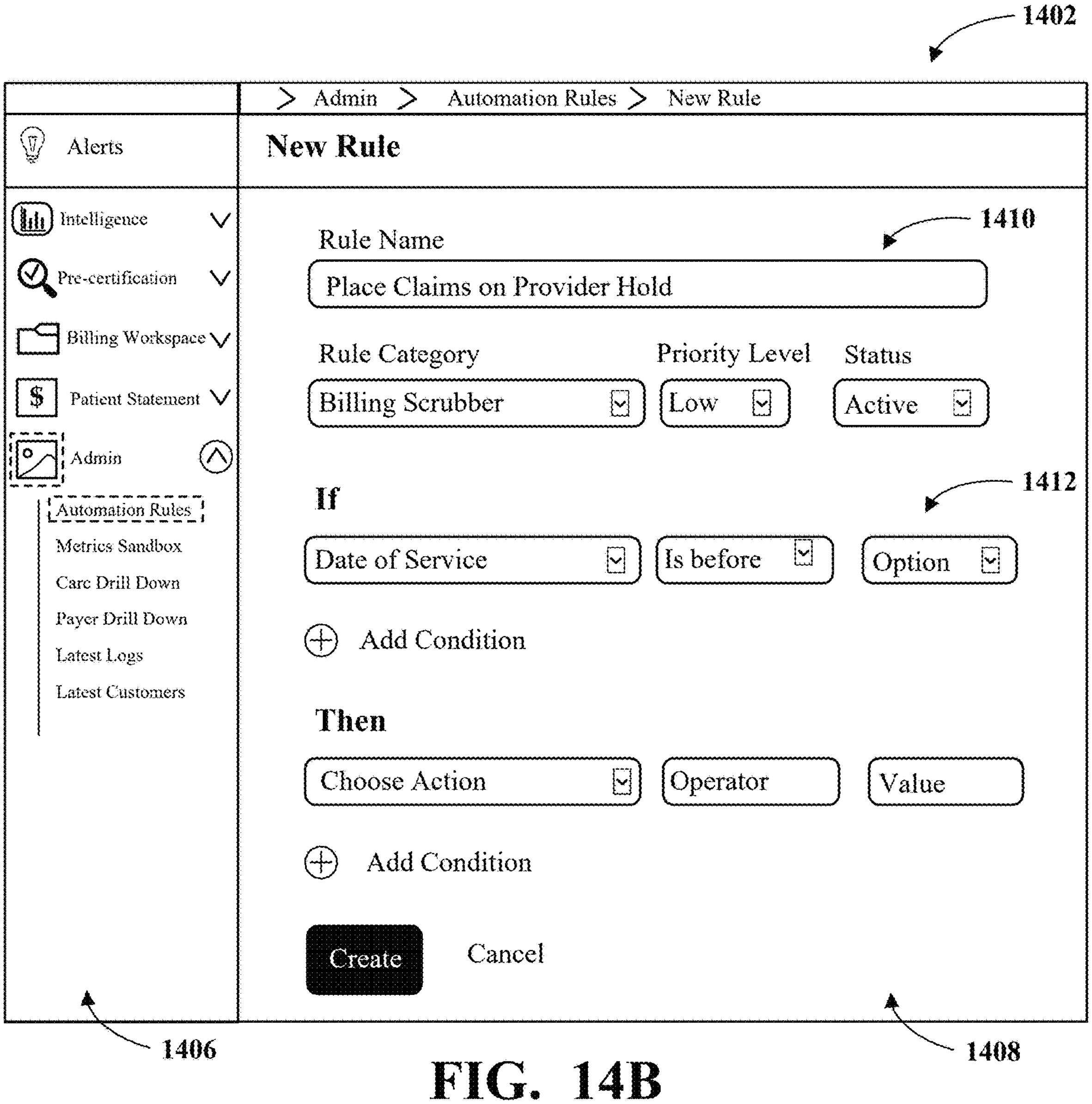

FIGS. 14A and 14B illustrate interfaces of a healthcare claims processing system according to aspects of the present disclosure. FIG. 14A shows a predictive denial interface 1400 that displays claim denial risk information. The interface includes a sparkline 1404 that provides a visual representation of claim denial trends over time. In some implementations, the sparkline 1404 may be interactive, allowing users to hover over data points for more detailed information or select specific time ranges for further analysis. In some implementations, the sparkline 1404 may be color-coded to indicate positive or negative trends, or include markers for significant events or threshold crossings.

FIG. 14B shows a mitigation interface 1402 for configuring automated rules to handle claims. The interface includes a navigation menu 1406 on the left side displaying options like Alerts, Intelligence, Pre-certification, Billing Workspace, Patient Statement, and Admin sections. In some implementations, the navigation menu 1406 may be collapsible to provide more screen space for data visualization. Some implementations may include additional menu items or allow for customization of the menu based on user preferences or role-specific access rights.

The content panel 1408 on the right displays the rule configuration options. Within the content panel 1408, a rule input interface 1410 allows users to specify rule parameters including rule name, category, priority level, and status. In some implementations, the rule input interface 1410 may incorporate ML algorithms to suggest optimal rule parameters based on historical data and system performance. In some implementations, the interface may include a template library of pre-configured rules that users can customize for their specific needs.

Below the rule input interface 1410, a condition interface 1412 enables users to set conditions and actions for the rule using dropdown menus and input fields. In some implementations, the condition interface 1412 may utilize natural language processing to allow users to input conditions in plain language, which the system then translates into formal rule logic. Some implementations may include a visual rule builder that allows users to construct complex conditions through a drag-and-drop interface.

The predictive denial interface 1400 and mitigation interface 1402 work together to enable monitoring of claim denial risks and configuration of automated mitigation rules. In some implementations, the system may employ ML models to analyze patterns in historical claim data and predict the likelihood of denials for new claims. These predictions may be used to populate the sparkline 1404 and inform the rule creation process in the mitigation interface 1402.

The interfaces may be designed to provide quick, at-a-glance information about specific issues or trends in healthcare revenue cycle management. In some implementations, the system may use natural language generation techniques to create human-readable descriptions of detected anomalies or trends, clearly communicating the issue and its implications to users. Some implementations may incorporate augmented reality features to provide immersive data exploration experiences for healthcare finance professionals.

The system may implement a feedback mechanism to continuously improve its performance based on user interactions and outcomes. In some implementations, the interfaces may include options for users to provide explicit feedback on the accuracy and usefulness of predictions or generated rules. This feedback may be used to refine the underlying ML models and improve the system's accuracy over time.

The predictive denial interface 1400 and mitigation interface 1402 represent example configurations for displaying healthcare revenue cycle analytics and rule management, and various alternative arrangements and presentations may be implemented based on specific organizational needs or user preferences. In some implementations, the interfaces may feature different visualization types, such as heat maps for identifying patterns across multiple dimensions, network diagrams for visualizing relationships between different revenue cycle components, or geographic maps for analyzing performance across different locations or regions. The layout may be configured with alternative arrangements, such as a tabbed interface for different analytical views, a split-screen design for comparative analysis, or a modular dashboard where users can customize widget placement and sizing. In some implementations, the system may support multiple interface themes optimized for different user roles, such as executive dashboards with high-level summaries and trend indicators, operational interfaces with detailed workflow status and task assignments, or financial analyst views that emphasize monetary metrics and forecasting capabilities. The interface presentation may also be adapted for different interaction modalities, including touch-optimized layouts for tablet devices, keyboard-driven interfaces for power users, or voice-controlled systems that can announce alerts and accept verbal commands for common actions.

The information displayed in the predictive denial interface 1400 may be derived from analytics performed on a collection of VOOs. The mitigation interface 1402 may be used to define rules that are consumed and executed by an orchestration engine (e.g., the orchestration engine 122 shown in FIG. 1A). When a user establishes a rule using the condition interface 1412, that rule may be applied by the orchestration engine to evaluate the state and attributes of VOOs. When a VOO satisfies a rule's condition, the orchestration engine may be configured to automatically trigger the specified action, such as updating an attribute or invoking an agent, and record this action by creating a new version of the VOO.

By leveraging AI and ML techniques throughout the claims processing workflow, the system may address the technical challenges of identifying and responding to revenue cycle issues in a complex and dynamic healthcare environment. The combination of predictive analytics and automated rule configuration may enable healthcare providers to proactively address potential claim denials, optimize their financial operations, and reduce revenue leakage. This approach may allow for more efficient allocation of resources, as billing staff can focus on high-risk claims identified by the system rather than manually reviewing all claims.

Figure 15:
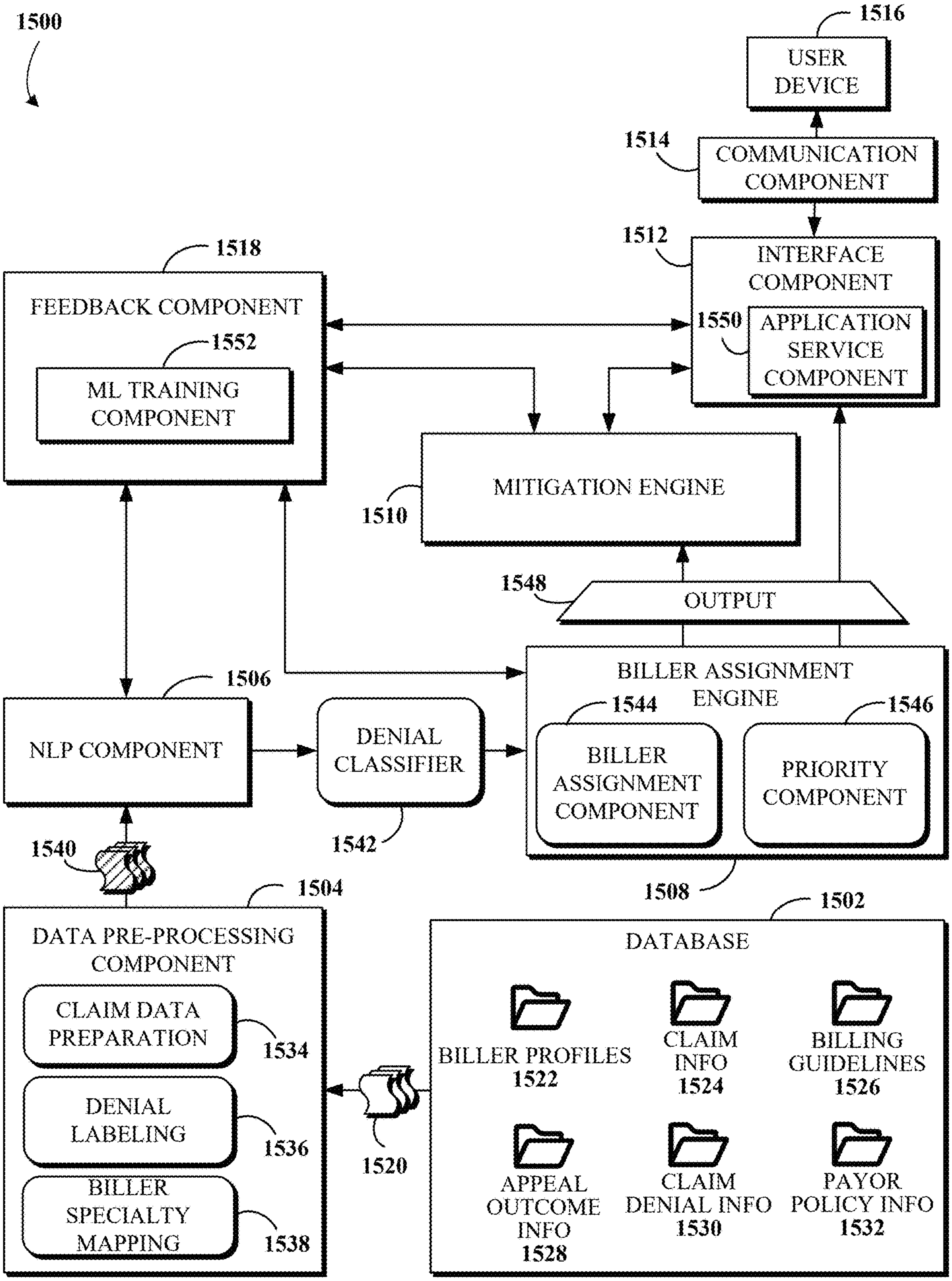
FIG. 15 illustrates a block diagram of an AI system for processing and managing medical billing information.

FIG. 15 illustrates a block diagram of an AI system 1500 for processing and managing medical billing information according to aspects of the present disclosure. The AI system 1500 includes multiple interconnected components designed to process, analyze, and optimize healthcare revenue cycle management data. The AI system 1500 includes a database 1502, a data pre-processing component 1504, an NLP component 1506, a biller assignment engine 1508, a mitigation engine 1510, an interface component 1512, a communication component 1514, a user device 1516, and a feedback component 1518. One or more aspects associated with the example 1300 may be implemented using one or more computing devices such as, for example, the computing device 200 shown in FIG. 2.

In some implementations, the database 1502 may be, be similar to, include, or be included in the database component 1210 shown in FIG. 12, the database 1102 shown in FIG. 11, the data model 1026 shown in FIG. 10B, the database component 708 shown in FIG. 7, the database component 608 shown in FIG. 6, patient data repository 506 and/or the claim data repository 508 shown in FIG. 5, the data layer 402 shown in FIG. 4, the database 114A shown in FIGS. 1B, 1C, and 1D, and/or the database component 114 shown in FIGS. 1A, 1B, and 1C. In some implementations, the data pre-processing component 1504 may be, be similar to, include, or be included in the data pre-processing component 1104 shown in FIG. 11, the data model 1026 shown in FIG. 10B, the data processing component 606 shown in FIG. 6, the data processing engine 504 shown in FIG. 5, the data layer 402 and/or the processing layer 404 shown in FIG. 4, and/or the data processing component 112 shown in FIGS. 1A, 1B, and 1C. In some implementations, the NLP component 1506 may be, be similar to, include, or be included in the data processing component 606 shown in FIG. 6, the data processing engine 504 shown in FIG. 5, the data layer 402 and/or the processing layer 404 shown in FIG. 4, and/or the data processing component 112 shown in FIGS. 1A, 1, and 1C.

In some implementations, the biller assignment engine 1508 may be, be similar to, include, or be included in the mitigation engine 1306 shown in FIG. 13, the mitigation engine 1112 shown in FIG. 11, the application layer 1028 shown in FIG. 10B, the revenue cycle management modules (e.g., the eligibility component 1012, the prior authorization component 1014, the claim scrubbing component 1016, the payment posting component 1018, the patient statement component 1020, or the AR workflow management component 1022) shown in FIG. 10A, the ML component 706 shown in FIG. 7, the application layer 510 and/or the intelligence layer 512 shown in FIG. 5, the interface layer 406 shown in FIG. 4, the ML component 706 shown in FIG. 7, the trained model 308 shown in FIG. 3, and/or the ML component 116 shown in FIGS. 1A, 1C, and 1D. In some implementations, the mitigation engine 1510 may be, be similar to, include, or be included in the mitigation engine 1306 shown in FIG. 13, the mitigation engine 1112 shown in FIG. 11, the application layer 1028 or the orchestration engine 1030 shown in FIG. 10B, the revenue cycle management modules (e.g., the eligibility component 1012, the prior authorization component 1014, the claim scrubbing component 1016, the payment posting component 1018, the patient statement component 1020, or the AR workflow management component 1022) shown in FIG. 10A, the ML component 706 shown in FIG. 7, the application layer 510 and/or the intelligence layer 512 shown in FIG. 5, the interface layer 406 shown in FIG. 4, the ML component 706 shown in FIG. 7, the trained model 308 shown in FIG. 3, and/or the ML component 116 shown in FIGS. 1A, 1C, and 1D.

In some implementations, the interface component 1512 may be, be similar to, include, or be included in the application service component 1304 shown in FIG. 13, the application service component 1204 shown in FIG. 12, the application service component 1150 shown in FIG. 11, the application layer 1028 shown in FIG. 10B, the application service component 704 shown in FIG. 7, the application layer 510 shown in FIG. 5, the interface layer 408 shown in FIG. 4, the application service component 130 shown in FIGS. 1C and 1D, and/or the interface component 118 shown in FIGS. 1A and 1C. In some implementations, the communication component 1514 may be, be similar to, include, or be included in the communication component 1116 shown in FIG. 11, the communication component 604 shown in FIG. 6, and/or the communication component 110 shown in FIGS. 1A, 1, and 1C. In some implementations, the user device 1516 may be, be similar to, include, or be included in the user device 1302 shown in FIG. 13, the user device 1202 shown in FIG. 12, the user device 1118 shown in FIG. 11, the user device 702 shown in FIG. 7, and/or the user device 104A or the user device 104B shown in FIGS. 1A and 1C. In some implementations, the feedback component 1518 may be, be similar to, include, or be included in the feedback component 1206 shown in FIG. 12, the feedback component 1108 shown in FIG. 11, the feedback layer 410 shown in FIG. 4, and/or the feedback component 120 shown in FIGS. 1A and 1C.

As shown, the data pre-processing component 1504 may access input data 1520 from the database 1502. The database 1502 may include biller profiles 1522, claim information 1524, billing guidelines 1526, appeal outcome information 1528, claim denial information 1530, and payor policy information 1532, among other examples. In some implementations, the database 1502 may utilize database technologies to efficiently manage large volumes of healthcare data. For example, the database 1502 might employ a combination of relational and NoSQL databases to accommodate the diverse types of data encountered in revenue cycle management. In some implementations, the database 1502 could incorporate a data lake architecture to store and analyze large volumes of unstructured and semi-structured data, providing greater flexibility for future analytics and ML applications.

The input data 1520 may encompass a wide range of healthcare and financial information. This may include, but is not limited to, electronic health records, claims data, remittance advice, and payor policies. In some implementations, the system may incorporate real-time data streams from connected medical devices or wearables to provide a more comprehensive view of patient health and associated billing implications. In some implementations, it might integrate data from external sources such as public health databases or economic indicators to provide additional context for revenue cycle management decisions.

The data pre-processing component 1504 may process the input data 1520 using any number of various subcomponents. These subcomponents may include a claim data preparation component 1534, a denial labeling component 1536, and a biller specialty mapping component 1538. In some implementations, the data pre-processing component 1504 may employ ETL (Extract, Transform, Load) processes, utilizing ML algorithms to automate data cleansing and normalization tasks. For instance, the claim data preparation component 1534 might use natural language processing techniques to extract relevant information from unstructured clinical notes or payor correspondence. In some implementations, the denial labeling component 1536 may incorporate domain-specific knowledge to create standardized categories for claim denials, improving the consistency and interpretability of the data.

The data pre-processing component 1504 may perform a variety of operations to prepare the raw input data for further analysis and processing. In some implementations, the claim data preparation component 1534 may utilize advanced text parsing algorithms to extract structured information from unstructured claim documents, such as scanned CMS-1500 forms or electronic remittance advice (ERA) files. The claim data preparation component 1534 may employ optical character recognition (OCR) techniques to digitize paper-based claims and convert them into machine-readable formats. In some implementations, the claim data preparation component 1534 may implement data validation rules to identify and flag potential errors or inconsistencies in the claim data, such as mismatched diagnosis and procedure codes, invalid patient identifiers, or missing required fields.

The denial labeling component 1536 may leverage ML algorithms to automatically categorize claim denials based on their underlying causes. In some implementations, the denial labeling component 1536 component may analyze denial reason codes, RARCs, or free-text explanations provided by payors to assign standardized labels to each denied claim. The denial labeling component 1536 may utilize a combination of supervised and unsupervised learning techniques to identify patterns and clusters in denial data, facilitating the discovery of new denial categories that may not be apparent through manual analysis. In some implementations, the biller specialty mapping component 1538 may use natural language processing and entity recognition techniques to extract information about healthcare providers' specialties and areas of expertise from various data sources, including provider directories, credentialing databases, or historical billing records. This information may be used to create a comprehensive mapping of biller specialties, facilitating more efficient assignment of claims to appropriate billing specialists based on their expertise and experience with specific types of claims or payors.

The data pre-processing component 1504 outputs pre-processed data 1540 to the NLP component 1506. This NLP component 1506 may be responsible for analyzing and interpreting human language within healthcare workflows. In some implementations, the NLP component 1506 may employ techniques such as named entity recognition, sentiment analysis, or topic modeling to extract meaningful insights from textual data like claim codes, denial messages, or clinical documentation. For example, the NLP component 1506 might analyze denial reason descriptions to identify common themes or patterns that could inform process improvements. In some implementations, the NLP component 1506 may interpret and categorize free-text notes from healthcare providers, linking them to specific claims or diagnoses.

The NLP component 1506 may include multiple specialized NLP models, each designed to handle specific aspects of healthcare revenue cycle management. In some implementations, the component may utilize a combination of rule-based and ML-based models to process and analyze textual data from various sources. These models may work in parallel or in sequence, depending on the complexity of the task and the nature of the input data. For example, one model may focus on extracting structured information from semi-structured documents like claim forms, while another may specialize in analyzing free-text clinical notes for relevant billing information.

The NLP component 1506 may employ advanced deep learning architectures, such as transformer models or bidirectional long short-term memory (BiLSTM) networks, to capture complex linguistic patterns and contextual information in healthcare-related text. These models may be pre-trained on large corpora of medical literature and healthcare documentation, then fine-tuned on domain-specific datasets to improve their performance on revenue cycle management tasks. In some cases, the NLP component may utilize transfer learning techniques to adapt high-performing general-purpose language models to the specialized vocabulary and syntax commonly found in medical billing and coding documents.

To enhance its capabilities, the NLP component 1506 may incorporate domain-specific knowledge bases and ontologies, such as the Unified Medical Language System (UMLS) or SNOMED CT. These resources may help the NLP models accurately interpret medical terminology, recognize relationships between different concepts, and map free-text descriptions to standardized codes and categories. In some implementations, the NLP component 1506 may include modules for handling multilingual input, allowing it to process claims and documentation in various languages and standardize the output for consistent analysis across the AI system 1500. The NLP component 1506 may feature adaptive learning mechanisms that help it to improve its performance based on feedback from human experts and the outcomes of processed claims.

The NLP component 1506 may employ a multi-stage approach to determine reasons for claim denials. In some implementations, the NLP component 1506 may first utilize a named entity recognition model to identify key elements within denial messages, such as procedure codes, diagnosis codes, dates of service, and specific medical terms. This extracted information may then be passed through a classification model that categorizes the denial into predefined categories such as "lack of medical necessity," "incorrect coding," or "missing documentation." The classification model may be trained on a large dataset of historical denials and their associated reasons, allowing it to recognize patterns and nuances in denial language across different payors and claim types.

In some cases, the NLP component 1506 may incorporate a semantic parsing module to analyze the syntactic structure of denial messages and extract causal relationships. This module may identify phrases indicating causality, such as "due to," "because of," or "resulting from," and link them to specific elements of the claim. For example, it may determine that a denial is due to a mismatch between the procedure code and the patient's diagnosis, or because a required pre-authorization was not obtained. In some implementations, the NLP component 1506 may utilize a sentiment analysis model to gauge the severity or finality of the denial, distinguishing between outright rejections and requests for additional information. This nuanced understanding of denial reasons may enable the AI system 1500 to generate more targeted and effective strategies for appealing or preventing future denials.

The AI system 1500 includes a denial classifier 1542 that processes the output from the NLP component 1506. In some implementations, this denial classifier 1542 may employ various ML techniques to categorize claim denials based on their underlying causes or characteristics. For example, denial classifier 1542 may use a combination of supervised and unsupervised learning approaches to identify patterns in denial data that may not be immediately apparent to human analysts. The denial classifier 1542 may employ ensemble methods, combining multiple models to improve overall classification accuracy and robustness. In some implementations, the denial classifier 1542 may utilize deep learning architectures to capture complex relationships between different features of denied claims.

The denial classifier 1542 may employ a hierarchical classification approach to categorize claim denials with increasing levels of granularity. At the highest level, the denial classifier 1542 may distinguish between technical denials and clinical denials. Technical denials may include issues such as missing information, incorrect patient demographics, or invalid insurance information. Clinical denials, on the other hand, may involve more complex issues related to medical necessity, level of care, or coding accuracy.

Within each of these broad categories, the denial classifier 1542 may further categorize denials into more specific subcategories. For example, technical denials may be classified into subcategories such as "incomplete claim form," "missing prior authorization," or "invalid provider credentials." Clinical denials may be subcategorized into "lack of medical necessity," "experimental or investigational treatment," or "non-covered service." This multi-level classification approach may allow healthcare providers to identify patterns and trends in denial reasons at various levels of detail, facilitating targeted interventions and process improvements.

The denial classifier 1542 may incorporate temporal and contextual information to enhance its classification accuracy. For instance, the denial classifier 1542 may consider the timing of the claim submission relative to the date of service, the patient's insurance coverage period, or the effective dates of specific payor policies. This temporal awareness may help distinguish between denials due to timely filing issues and those related to retroactive policy changes. In some implementations, the denial classifier 1542 may take into account the context of the claim, such as the patient's medical history, concurrent treatments, or the specific healthcare setting (e.g., inpatient, outpatient, emergency). By considering these contextual factors, the denial classifier 1542 may more accurately categorize denials that stem from complex clinical scenarios or unique patient circumstances.

In some implementations, the denial classifier 1542 may utilize a multi-modal approach, combining textual analysis of denial reasons with structured data analysis. For example, the denial classifier 1542 may analyze the denial reason code in conjunction with the associated claim data, such as diagnosis codes, procedure codes, or billed amounts. This multi-modal analysis may help the classifier to detect subtle patterns and relationships between claim characteristics and denial reasons. For instance, the denial classifier 1542 may identify that a particular combination of diagnosis and procedure codes frequently results in denials for lack of medical necessity from a specific payor, even when the individual codes themselves do not typically trigger such denials. This level of insight may allow healthcare providers to proactively address potential denial risks and optimize their coding and documentation practices.

The denial classifier 1542 may provide classification information to the biller assignment engine 1508, which may be responsible for allocating work to billing specialists based on various factors. The biller assignment engine 1508 includes a biller assignment component 1544 and a priority component 1546, which work together to generate output 1548. In some implementations, the biller assignment component 1544 may use ML algorithms to match the skills and expertise of individual billers with the specific requirements of each claim or denial. For example, the biller assignment component 1544 may consider factors such as a biller's historical performance with certain types of claims or payors when making assignments. The priority component 1546 may employ predictive analytics to assess the urgency and potential value of different claims, to facilitate addressing high-priority items promptly.

The biller assignment engine 1508 may implement a process for assigning billers to specific claims or denials. In some implementations, the biller assignment engine 1508 may utilize a multi-factor scoring system that considers various aspects of both the claim and the biller's expertise. For each claim, the biller assignment engine 1508 may generate a complexity score based on factors such as the denial reason, the payor involved, the specialty area of the claim, and the potential financial impact. Similarly, each biller may have a profile that includes their areas of expertise, historical performance metrics, current workload, and specific payor knowledge. The biller assignment component 1544 may use a matching algorithm to align the complexity score of the claim with the most suitable biller profile, aiming to optimize the likelihood of successful resolution.

In some implementations, the biller assignment engine 1508 may leverage a comprehensive historical analysis of each biller's performance to refine the assignment process. The biller assignment engine 1508 may track and analyze various metrics for each biller, such as their success rate in overturning denials, average time to resolution, and efficiency in handling specific types of claims or payors. This historical data may be used to create a dynamic expertise profile for each biller, which may be continuously updated based on their ongoing performance. The biller assignment component 1544 may utilize ML algorithms to identify patterns in the biller's success rates across different claim types, denial reasons, and payors. For example, the biller assignment engine 1508 may recognize that a particular biller has a high success rate in resolving denials related to medical necessity for orthopedic procedures, or that another biller is particularly efficient in handling claims from a specific insurance provider. The priority component 1546 may factor in these expertise profiles when determining the urgency and potential value of assignments, potentially prioritizing high-value or time-sensitive claims for billers with the most relevant expertise. In some implementations, the biller assignment engine 1508 may consider the biller's current workload and recent performance trends to ensure a balanced distribution of work and to avoid overburdening high-performing billers. By refining these assignments based on real-time performance data, the biller assignment engine 1508 may optimize the overall efficiency and success rate of the billing team, potentially leading to improved revenue recovery and reduced denial rates.

For example, if a claim is denied due to a complex medical necessity issue in cardiology, the biller assignment engine 1508 may assign it to a biller with a strong track record in appealing similar denials and specific expertise in cardiovascular billing codes. The priority component 1546 may further refine this assignment by considering time-sensitive factors. For instance, claims approaching timely filing deadlines or those with high dollar amounts may be given higher priority in the assignment queue. The biller assignment engine 1508 may incorporate load balancing features to ensure an equitable distribution of work among billers, preventing bottlenecks and maintaining overall team efficiency. In some cases, the biller assignment engine 1508 may employ ML techniques to refine its assignment algorithms based on the outcomes of previous assignments, adapting to changing patterns in denial types, payor behaviors, and individual biller performance over time.

The biller assignment engine 1508 may provide an output 1548 to the mitigation engine 1510. The mitigation engine 1510 may be configured to process information from multiple components to generate strategies for addressing revenue cycle issues. In some implementations, the mitigation engine 1510 may employ a combination of rule-based systems and ML models to generate recommendations for addressing potential claim denials or optimizing billing workflows. For example, the mitigation engine 1510 might suggest preemptive measures to reduce the likelihood of claim denials based on historical patterns and current payor policies. In some implementations, the mitigation engine

1510 may automate the process of addressing certain types of denials by generating appeal letters or correcting common coding errors.

The mitigation engine 1510 may implement a smart worklist system to optimize the workflow for addressing claim denials and other revenue cycle issues. This system may dynamically prioritize and organize tasks based on various factors such as the likelihood of successful appeal, potential financial impact, or approaching deadlines. For instance, the smart worklist may place high-priority denials related to medical necessity at the top of the list, especially if they are from payors known to have strict appeal deadlines. The system may also group similar denials together, allowing billers to efficiently address multiple related issues in a single session.

In some implementations, the mitigation engine 1510 may incorporate a status tracking mechanism to monitor the progress of denial processing and appeal efforts. This tracking system may provide real-time updates on the status of each claim, including information such as the current stage in the appeal process, any additional documentation required, or the expected resolution date. For example, the mitigation engine 1510 may automatically flag claims that have been in a particular status for an extended period, prompting supervisors to investigate potential bottlenecks or issues. This granular tracking may help healthcare providers maintain a clear overview of their entire denial management process and identify areas for improvement.

The mitigation engine 1510 may leverage ML algorithms to generate customized appeal strategies for different types of denials. By analyzing historical data on successful appeals, the mitigation engine 1510 may identify effective arguments, supporting documentation, and appeal formats for specific payors and denial reasons. For instance, when addressing a denial for lack of medical necessity from a particular insurance company, the mitigation engine 1510 may suggest including specific clinical guidelines or peer-reviewed studies that have previously led to successful appeals. This data-driven approach may significantly increase the likelihood of overturning denials and recovering lost revenue.

In some implementations, the mitigation engine 1510 may implement a predictive analytics component to forecast potential denials before they occur. This proactive approach may help healthcare providers address issues preemptively, reducing the overall denial rate. For example, the mitigation engine 1510 may analyze patterns in historical denials and identify claims with similar characteristics that are at high risk of being denied. The mitigation engine 1510 may then generate alerts or recommendations for additional documentation or coding review before the claim is submitted. In some cases, the mitigation engine 1510 may even suggest alternative coding or billing strategies that have a higher likelihood of approval based on the specific payor's policies and historical claim adjudication patterns.

One or more components of the system may interface with users through the interface component 1512, which may communicate through the communication component 1514 configured to facilitate communications with the user device 1516. The interface component 1512 may be configured to manage user interactions, facilitating the presentation of insights and functionalities through intuitive dashboards, reports, and interactive visualizations. In some implementations, the interface component 1512 may provide customizable dashboards for different user roles, such as billing specialists, revenue cycle managers, or financial analysts. In some implementations, the interface component 1512 may incorporate augmented reality features to provide immersive data exploration experiences for healthcare finance professionals.

The application service component 1550 may coordinate the various system operations and data flows between components. In some implementations, the application service component 1550 could implement a microservices architecture, allowing for greater flexibility and scalability in deploying and updating individual components of the AI system 1500. In some implementations, the application service component 1550 may incorporate an event-driven architecture to enable real-time responsiveness to changes in the healthcare revenue cycle landscape, such as immediate updates to prediction models when new payor policies are detected.

The feedback component 1518 includes an ML training component 1552. The feedback component 1518 plays a role in the continuous improvement of the system's performance. In some implementations, the feedback component 1518 may employ reinforcement learning techniques to optimize the system's decision-making processes over time. For example, the feedback component 1518 might track the outcomes of biller assignments or mitigation strategies and use this information to refine the models used by the biller assignment engine 1508 and mitigation engine 1510. In some implementations, the ML training component 1552 may use transfer learning approaches to adapt pre-trained models to specific healthcare organizations or specialties, allowing for faster model deployment and improved performance on smaller datasets.

The ML training component 1552 may employ reinforcement learning techniques to improve the biller assignment and prioritization processes within the AI system 1500. In some implementations, the reinforcement learning model may be structured as an MDP, where the state represents the current status of all claims and billers, actions correspond to assignment decisions, and rewards are based on successful claim resolutions and efficient resource utilization. The ML training component 1552 may use algorithms such as Q-learning or Deep Q-Networks (DQN) to learn optimal assignment strategies over time.

In the context of biller assignment, the reinforcement learning model may learn to match billers with claims in a way that maximizes the overall success rate of claim resolutions. The state space may include features such as claim characteristics, biller expertise profiles, current workload, and historical performance data. Actions may involve assigning a specific claim to a particular biller or adjusting the priority of a claim in the worklist. The reward function may be designed to balance multiple objectives, such as maximizing the number of successfully resolved claims, minimizing the time to resolution, and maintaining an equitable workload distribution among billers.

The priority component 1546 may utilize reinforcement learning to dynamically adjust the prioritization of claims in the worklist. In this scenario, the state space may include information about claim deadlines, potential financial impact, likelihood of successful appeal, and current system workload. Actions may involve reordering claims in the worklist or allocating additional resources to high-priority items. The reward function may be structured to incentivize the system to address high-value and time-sensitive claims promptly while also considering the overall efficiency of the revenue cycle management process.

As the system interacts with the environment and receives feedback on the outcomes of its decisions, it may update its policy to improve future assignments and prioritizations. For example, if the system observes that certain types of claims are consistently resolved more quickly when assigned to billers with specific expertise profiles, it may adjust its policy to favor such assignments in the future. Similarly, if the system learns that prioritizing certain types of denials leads to higher success rates in appeals, it may adapt its prioritization strategy accordingly. This adaptive approach may help the AI system 1500 to optimize its performance over time, potentially leading to improved revenue recovery rates and more efficient utilization of billing resources.

By leveraging these various components and functionalities, the AI system 1500 provides a comprehensive solution for healthcare revenue cycle management. The system's ability to process and analyze large volumes of complex healthcare data, combined with its ML capabilities, enables it to identify patterns, predict outcomes, and generate actionable insights that may not be apparent through traditional analysis methods. This approach may address the technical challenges of managing complex healthcare financial data, allowing healthcare providers to optimize their operations, reduce claim denials, and ultimately improve their financial performance.

The AI system 1500 may be coordinated by an orchestration engine (e.g., the orchestration engine 122 shown in FIG. 1A). The engine may create a VOO for each claim processed. The outputs from the NLP component 1506 and the denial classifier 1542 may be treated as state change data that updates the VOO with analytical insights. Based on this state, the orchestration engine may use the output 1548 from the biller assignment engine 1508 to further update the VOO with the assigned biller's identity. Subsequently, the orchestration engine may invoke the mitigation engine 1510 to perform actions based on the VOO's current state, with each action being recorded in a new VOO version. This creates a fully versioned history of the denial management process, from initial analysis to assignment and mitigation.

Figure 16:
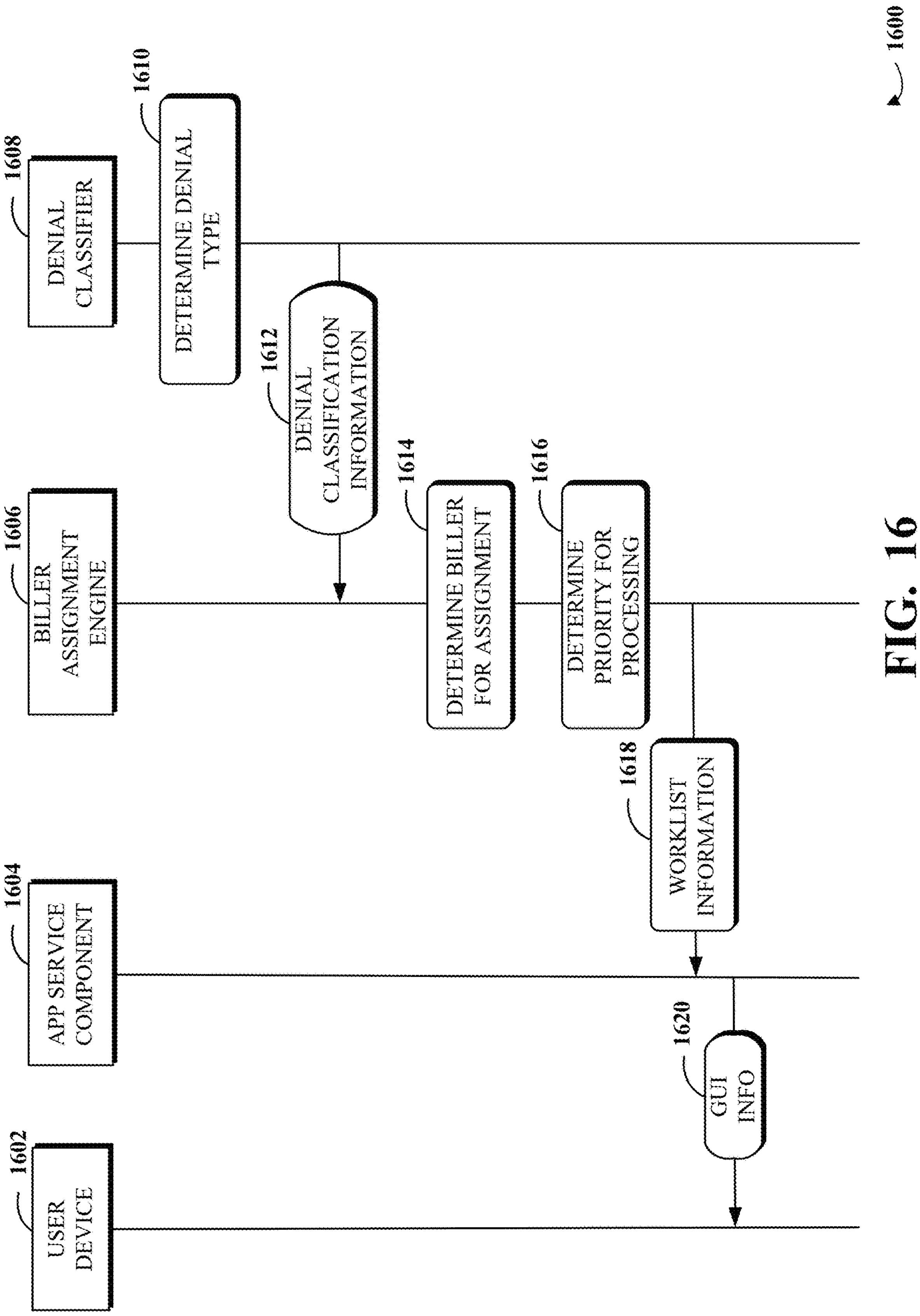
FIG. 16 is a flow diagram of an example of a process for assigning and tracking medical billing claims.

FIG. 16 is a flow diagram of an example 1600 of a process for assigning and tracking medical billing claims according to aspects of the present disclosure. The example 1600 depicts the flow of data through various components of an AI system for healthcare revenue cycle management. The example 1600 includes a user device 1602, an application service component 1604, a biller assignment engine, and a denial classifier 1608. One or more aspects associated with the example 1300 may be implemented using one or more computing devices such as, for example, the computing device 200 shown in FIG. 2.

In some implementations, the user device 1602 may be, be similar to, include, or be included in the user device 1516 shown in FIG. 15, the user device 1302 shown in FIG. 13, the user device 1202 shown in FIG. 12, the user device 1118 shown in FIG. 11, the user device 702 shown in FIG. 7, and/or the user device 104A or the user device 104B shown in FIGS. 1A and 1C. In some implementations, the application service component 1604 may be, be similar to, include, or be included in the application service component 1550 shown in FIG. 15, the application service component 1304 shown in FIG. 13, the application service component 1204 shown in FIG. 12, the application service component 1150 shown in FIG. 11, the application layer 1028 shown in FIG. 10B, the application service component 704 shown in FIG. 7, the application layer 510 shown in FIG. 5, the interface layer 408 shown in FIG. 4, the application service component 130 shown in FIGS. 1C and 1D, and/or the interface component 118 shown in FIGS. 1A and 1C.

In some implementations, the biller assignment engine 1606 may be, be similar to, include, or be included in the biller assignment engine 1508 shown in FIG. 15, the mitigation engine 1510, the mitigation engine 1306 shown in FIG. 13, the mitigation engine 1112 shown in FIG. 11, the application layer 1028 shown in FIG. 10B, the revenue cycle management modules (e.g., the eligibility component 1012, the prior authorization component 1014, the claim scrubbing component 1016, the payment posting component 1018, the patient statement component 1020, or the AR workflow management component 1022) shown in FIG. 10A, the ML component 706 shown in FIG. 7, the application layer 510 and/or the intelligence layer 512 shown in FIG. 5, the interface layer 406 shown in FIG. 4, the ML component 706 shown in FIG. 7, the trained model 308 shown in FIG. 3, and/or the ML component 116 shown in FIGS. 1A, 1C, and 1D. In some implementations, the denial classifier 1608 may be, be similar to, include, or be included in the denial classifier 1542 shown in FIG. 15, the prediction engine 1308 shown in FIG. 13, the prediction engine 1208 shown in FIG. 12, the prediction engine 1110 shown in FIG. 11, the intelligence layer 1006 shown in FIG. 10A, the ML component 706 shown in FIG. 7, the intelligence layer 512 shown in FIG. 5, the intelligence layer 406 shown in FIG. 4, the trained model 308 shown in FIG. 3, and/or the ML component 116 shown in FIGS. 1A, 1C, and 1D.

The process of example 1600 includes an operation 1610 performed by the denial classifier 1608 to determine a denial type. The operation 1610 may involve applying one or more ML models to input data to categorize various aspects of claim denials. In some implementations, the operation 1610 might include multiple stages of classification, such as first categorizing denials into broad categories and then applying specialized models to each category for more precise classification. For example, the system might first categorize denials as technical or clinical, and then use category-specific models to determine the exact reason for denial, such as missing information, coding errors, or lack of medical necessity.

The denial classifier 1608 may provide denial classification information 1612 indicative of the denial type to the biller assignment engine 1606. The denial classification information 1612 may serve as input for subsequent assignment operations. The denial classification information 1612 may include various types of classifications relevant to healthcare revenue cycle management, such as the type of denial, the complexity of the denial, or the estimated effort required to resolve the denial. In some implementations, the denial classification information 1612 may include confidence scores or uncertainty estimates associated with each classification, allowing downstream components to make more informed decisions. For example, the denial classifier 1608 may provide a range of possible classifications for a denial, along with the probability of each classification, rather than a single definitive categorization.

An operation 1614 may be performed by the biller assignment engine 1606 to determine a biller for assignment. The operation 1614 represents the process of assigning billers based on the denial classification information 1612. The operation 1614 may involve analyzing the classifications and determining an appropriate biller to handle each denied claim. In some implementations, the operation 1614 may employ a decision tree or rule-based system to map different types of denials to specific billers based on their expertise and workload. For example, if a denial is classified as a complex medical necessity issue, the biller assignment engine 1606 may assign it to a biller with extensive experience in that area. In some implementations, operation 1614 may use an ML model trained on historical data to learn the most effective biller assignments for different scenarios, helping the biller assignment engine 1606 to adapt its assignments over time based on observed outcomes.

The biller assignment engine 1606 may perform an operation 1616 to determine a priority for processing of tasks. The operation 1616 involves generating worklist information 1618 based on the biller assignments. The operation 1616 may include creating prioritized task lists for each biller, incorporating factors such as claim value, urgency, or complexity. In some implementations, the operation 1616 may use natural language generation techniques to produce human-readable descriptions of each task, tailored to the assigned biller's preferences or expertise level. For example, the biller assignment engine 1606 may generate detailed instructions for newer billers, while providing more concise summaries for experienced staff. In some implementations, operation 1616 may be used to produce automated scripts or workflows for robotic process automation systems, facilitating the direct implementation of certain billing tasks without manual intervention.

The worklist information 1618 may include a combination of task descriptions, supporting data, and prioritization details designed to optimize the workflow of billing staff. In some implementations, the worklist information 1618 may be structured as a prioritized action plan, with specific steps and timelines for addressing each assigned claim. In some implementations, the worklist information 1618 may be presented as an interactive dashboard that allows billers to explore different task scenarios and their potential impacts on revenue cycle performance.

The application service component 1604 may generate GUI info 1620 based on the worklist information 1618. The application service component 1604 may transform the worklist information 1618 into a format suitable for presentation on the user device 1602. This step may involve creating various visual elements, such as charts, graphs, or interactive widgets, to effectively communicate the assigned tasks and their priorities. In some implementations, the GUI info 1620 may be customized based on user roles or preferences, presenting different levels of detail or focusing on specific aspects of the worklist depending on the intended user. For example, a billing team supervisor might see a high-level overview of team assignments and performance metrics, while individual billers would receive detailed task lists and relevant claim information. In some implementations, the GUI info 1620 may incorporate augmented reality elements, allowing users to interact with virtual representations of assigned claims in their physical environment.

In some implementations, a tracking operation may be organized by an orchestration engine (e.g., the orchestration engine 122 shown in FIG. 1A) to monitor and record the progress of assigned billing tasks throughout their lifecycle within the AI system. The orchestration engine may implement a versioned tracking system that creates immutable records of each significant action taken on assigned claims. In some implementations, the tracking operation may include capturing real-time status updates as billers interact with their assigned claims, including when tasks are started, paused, completed, or require escalation. The tracking operation may include maintaining detailed logs of user actions, time spent on specific tasks, and outcomes achieved for each assigned claim.

In some implementations, the tracking operation may include collecting performance metrics for individual billers and teams, such as task completion rates, average resolution times, and success rates for different types of denials. The tracking operation include analyzing patterns in biller performance to identify areas where additional training or support may be beneficial. The tracking operation may include tracking the effectiveness of different assignment strategies by correlating biller assignments with claim resolution outcomes. The tracking operation may include providing feedback to other components of the system, such as the biller assignment engine 1606, to improve future task assignments based on observed performance data. In some implementations, the tracking operation may include generating alerts when tasks approach deadlines, when billers encounter difficulties with specific claim types, or when unusual patterns in task completion are detected. The tracking operation may include maintaining audit trails for compliance purposes, recording actions taken on claims and the rationale behind assignment decisions.

In some implementations, the tracking operation may include interfacing with external systems to gather additional context about claim status changes, such as updates from payor portals or clearinghouse responses. The tracking operation may correlate this external information with internal task progress to provide a comprehensive view of claim lifecycle management. The tracking operation may support predictive analytics by identifying trends that may indicate potential bottlenecks or resource allocation issues before they impact overall system performance.

The orchestration engine may interface with the biller assignment engine 1606 to receive assignment data and track the progression of assigned tasks through various workflow stages. In some implementations, the orchestration engine may monitor assignment decisions made by the biller assignment engine 1606 and create versioned records (e.g., as part of a VOO) that capture the rationale behind each assignment, including factors such as biller expertise, workload distribution, and priority levels. The orchestration engine may provide feedback to the biller assignment engine 1606 regarding assignment outcomes, facilitating the engine to refine its assignment algorithms based on observed performance patterns and success rates.

The orchestration engine may interface with the denial classifier 1608 to track the evolution of denial classifications throughout the resolution process. In some implementations, the orchestration engine may monitor when denial classifications are updated or refined as additional information becomes available during the billing process. The orchestration engine may maintain a versioned history (e.g., using a VOO) of classification changes, facilitating analysis of classification accuracy and the identification of patterns that may indicate areas for improvement in the denial classification models.

In some implementations, the orchestration engine may interface with the application service component 1604 to track user interactions and system responses. The orchestration engine may monitor when GUI information is generated and presented to users, capturing data about user engagement patterns and response times. The orchestration engine may track user actions taken through the application service component 1604, such as task acknowledgments, status updates, or requests for additional information, creating a comprehensive audit trail of user interactions with assigned claims.

The orchestration engine may interface with external data sources and systems to gather contextual information that enhances the tracking operation. In some implementations, the orchestration engine may connect with payor portals, clearinghouse systems, or electronic health record systems to obtain real-time updates about claim status changes, payment processing, or documentation requirements. The orchestration engine may correlate this external information with internal tracking data to provide a holistic view of claim progression and identify potential issues or opportunities for process optimization.

In some implementations, the orchestration engine may interface with ML components to support predictive analytics and performance optimization. The orchestration engine may provide historical tracking data to ML models that analyze patterns in task completion, identify factors that contribute to successful claim resolution, and predict potential bottlenecks or resource allocation issues. The orchestration engine may receive recommendations from these ML components regarding workflow adjustments, resource allocation, or process improvements that may enhance overall system performance.

The orchestration engine may interface with notification and alerting systems to facilitate timely communication about tracking events and status changes. In some implementations, the orchestration engine may trigger automated notifications when specific tracking milestones are reached, such as task completion, deadline approaches, or exception conditions. The orchestration engine may customize notification content and delivery methods based on user roles, preferences, and the urgency of the tracked events.

In some implementations, the orchestration engine may interface with reporting and analytics components to generate comprehensive tracking reports and performance dashboards. The orchestration engine may aggregate tracking data across multiple claims, billers, and time periods to provide insights into system performance, resource utilization, and process efficiency. The orchestration engine may support the generation of customizable reports that facilitate different stakeholders to monitor tracking metrics relevant to their specific roles and responsibilities within the healthcare revenue cycle management process.

By implementing this comprehensive process for assigning and tracking medical billing claims, the AI system can facilitate healthcare providers optimizing their revenue cycle management workflows. The combination of advanced classification capabilities, intelligent biller assignment, and user-friendly presentation of worklists facilitates healthcare organizations to make data-driven decisions and implement effective solutions to complex billing challenges. This approach may address the technical challenges of managing large volumes of denied claims, facilitating healthcare providers to improve their claim resolution rates, reduce the time to payment, and ultimately enhance their financial performance.

By implementing this comprehensive process for assigning and tracking medical billing claims, the AI system can help healthcare providers optimize their revenue cycle management workflows. The combination of advanced classification capabilities, intelligent biller assignment, and user-friendly presentation of worklists enables healthcare organizations to make data-driven decisions and implement effective solutions to complex billing challenges. This approach may address the technical challenges of managing large volumes of denied claims, allowing healthcare providers to improve their claim resolution rates, reduce the time to payment, and ultimately enhance their financial performance.

Figure 17:
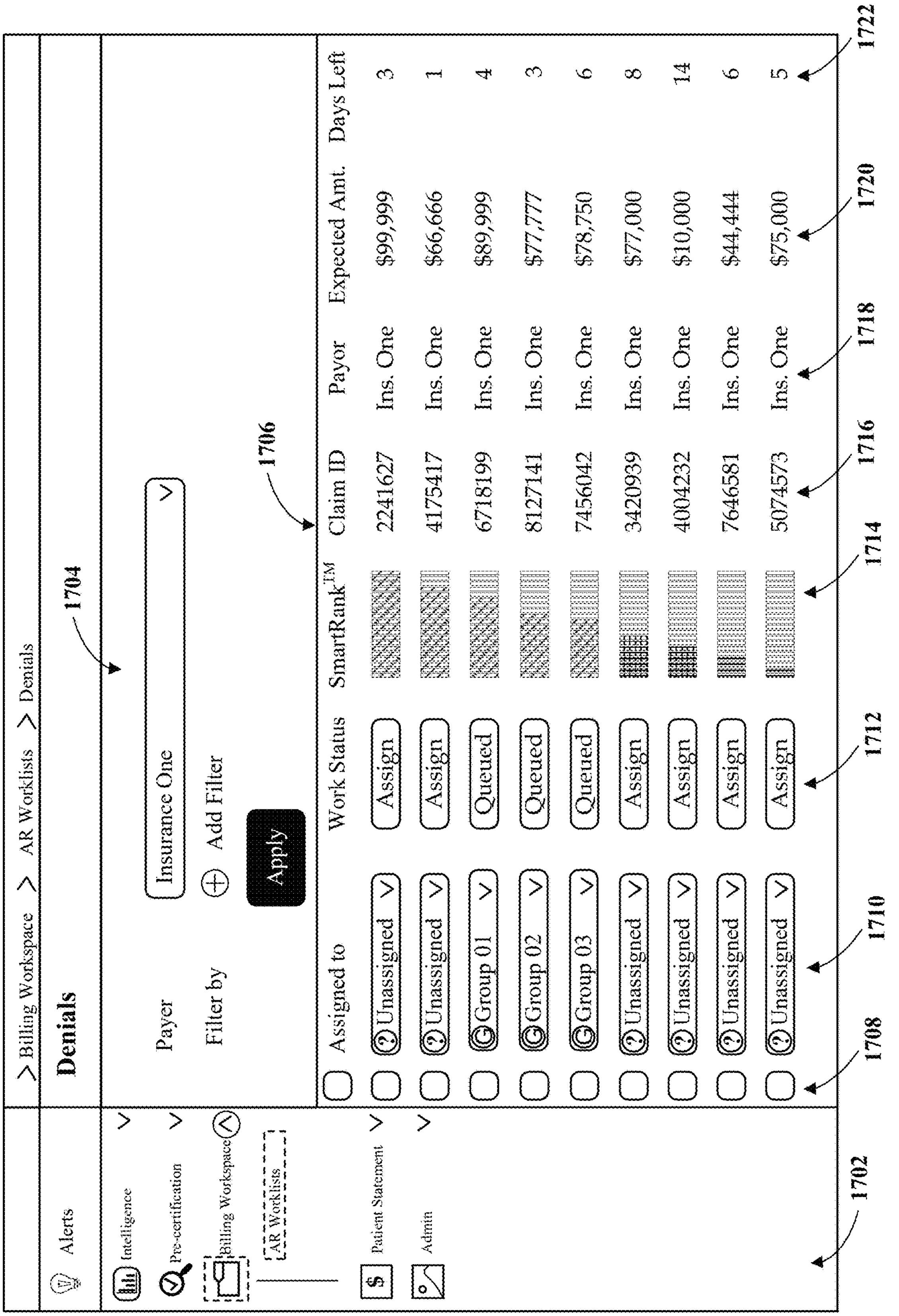
FIG. 17 illustrates a GUI for displaying and managing claim worklists.

FIG. 17 illustrates a GUI 1700 for displaying and managing claim worklists according to aspects of the present disclosure. The GUI 1700 may be presented on a user device, such as a desktop computer, laptop, tablet, or smartphone, to provide healthcare revenue cycle management professionals with a comprehensive view of pending claims and associated tasks.

The GUI 1700 includes a navigation menu 1702 positioned on the left side of the interface. This navigation menu 1702 may contain options for accessing various sections of the application, such as dashboards, reports, analytics, and settings. In some implementations, the navigation menu 1702 may be collapsible to provide more screen space for data visualization. In some implementations, the navigation menu 1702 might incorporate a search functionality to quickly locate specific features or sections within the application.

A prediction type selection interface 1704 is displayed at the top of the GUI 1700, allowing users to filter and view different types of claims. This interface may include drop-down menus, radio buttons, or toggles to select various prediction categories, such as high-risk denials, potential underpayments, or claims approaching timely filing deadlines. In some implementations, the prediction type selection interface 1704 may utilize ML algorithms to suggest relevant prediction types based on the user's role, historical usage patterns, or current system status.

The central component of the GUI 1700 is the worklist representation 1706, which displays claim information in a tabular format with multiple columns. The worklist representation 1706 may be a representation of a worklist and may be dynamically generated based on the selected prediction type and other filtering criteria. In some implementations, the worklist representation 1706 may incorporate scrolling or pagination to handle large volumes of claims efficiently. In some implementations, the system may employ virtual scrolling techniques to render only the visible portion of the worklist representation 1706, improving performance for users with limited hardware resources.

A checkbox column 1708 is included in the worklist representation 1706, allowing for claim selection. This feature may enable bulk actions on selected claims, such as assigning multiple claims to a specific biller or generating batch appeal letters. In some implementations, the checkbox column 1708 may incorporate smart selection capabilities, such as automatically selecting all claims that meet certain criteria or suggesting optimal groupings of claims for efficient processing.

The assignment column 1710 shows the assignment status of each claim, indicating whether a claim has been assigned to a specific biller or team for processing. This column may use color-coding or icons to quickly convey assignment status. In some implementations, the assignment column 1710 may incorporate drag-and-drop functionality, allowing managers to easily reassign claims between team members. In some implementations, the system may employ an AI-driven assignment recommendation engine to suggest optimal claim assignments based on biller expertise and workload.

A status column 1712 indicates the current state of each claim, such as "Assigned," "In Progress," or "Pending Review." This column may use a standardized set of status labels to ensure consistency across the organization. In some implementations, the status column 1712 may incorporate automated status updates based on actions taken within the system or integrations with external payor portals. The system may also employ ML algorithms to predict the likelihood of status changes and flag claims that may require immediate attention.

The worklist representation 1706 includes a ranking indicator column 1714, which provides a visual representation of claim priority or ranking. This may be displayed as a numerical score, color-coded indicator, or custom icon set. In some implementations, a ranking indicator may be dynamically calculated based on multiple factors such as claim value, age, likelihood of denial, and potential impact on cash flow. The system may utilize advanced ML models to continuously refine and improve the ranking algorithm based on historical outcomes and user feedback.

A claim identifier column 1716 displays unique claim identification numbers for each entry in the worklist representation 1706. These identifiers may be hyperlinked to provide quick access to detailed claim information. In some implementations, the claim identifier column 1716 may incorporate intelligent search and filtering capabilities, allowing users to quickly locate specific claims or groups of related claims. The system may also employ natural language processing techniques to enable users to search for claims using conversational queries.

The payor column 1718 shows the insurance provider associated with each claim. This information may be useful for understanding the context of each claim and applying payor-specific processing rules. In some implementations, the payor column 1718 may incorporate tooltips or expandable sections to provide quick access to payor contact information, policy details, or historical performance metrics. The system may also utilize ML algorithms to identify patterns in payor behavior and flag claims that may require special handling based on historical trends.

An amount column 1720 presents the expected reimbursement amount for each claim. This financial information may be helpful for prioritizing work and assessing the potential impact of claim resolutions. In some implementations, the amount column 1720 may incorporate predictive analytics to display not just the billed amount, but also the expected payout based on historical data and payor behavior. The system may employ sophisticated ML models to continuously refine these predictions, taking into account factors such as contract terms, denial patterns, and recent policy changes.

The timing column 1722 shows the number of days left for processing each claim, which may be useful for managing timely filing deadlines and prioritizing urgent cases. This column may use color-coding or visual indicators to highlight claims approaching deadlines. In some implementations, the timing column 1722 may incorporate predictive analytics to estimate the expected time to resolution for each claim based on historical data and current workload. The system may also employ reinforcement learning techniques to optimize workflow recommendations, balancing the urgency of approaching deadlines with the likelihood of successful resolution.

The worklist representation 1706 may be a view generated by an orchestration engine (e.g., the orchestration engine 122 shown in FIG. 1A) by querying for VOOs that meet specific criteria (e.g., status is "pending," ranking indicator is above a threshold). User interactions with the GUI 1700 may be managed as orchestrated events. For example, when a user selects a claim using the checkbox column 1708 and assigns it to a biller, this action may be sent as state change data to the orchestration engine. The orchestration engine would then create a new version of the VOO for that claim to reflect the updated assignment and status, ensuring the underlying versioned record is synchronized with the actions taken in the user interface.

The GUI 1700 represents one example configuration for displaying healthcare revenue cycle analytics and claim management, and various alternative arrangements and presentations may be implemented based on specific organizational needs or user preferences. In some implementations, the interface may feature different visualization types, such as heat maps for identifying patterns across multiple dimensions, network diagrams for visualizing relationships between different revenue cycle components, or geographic maps for analyzing performance across different locations or regions. The layout may be configured with alternative arrangements, such as a card-based interface where claim cards can be rearranged by users, a timeline view that shows claims chronologically, or a priority-based layout that automatically organizes claims by urgency or financial impact. In some implementations, the system may support multiple interface themes optimized for different user roles, such as executive dashboards with high-level summaries and trend indicators, operational interfaces with detailed workflow status and task assignments, or financial analyst views that emphasize monetary metrics and forecasting capabilities. The claim presentation may also be adapted for different interaction modalities, including touch-optimized layouts for tablet devices, keyboard-driven interfaces for power users, or voice-controlled systems that can announce claim details and accept verbal commands for common actions.

By presenting this comprehensive set of information in a structured and intuitive format, the GUI 1700 may enable healthcare revenue cycle management professionals to efficiently prioritize, assign, and manage claims. The integration of ML and predictive analytics throughout the interface may allow for data-driven decision-making and proactive issue resolution, potentially leading to improved financial performance and reduced revenue leakage for healthcare providers.

Figure 18:
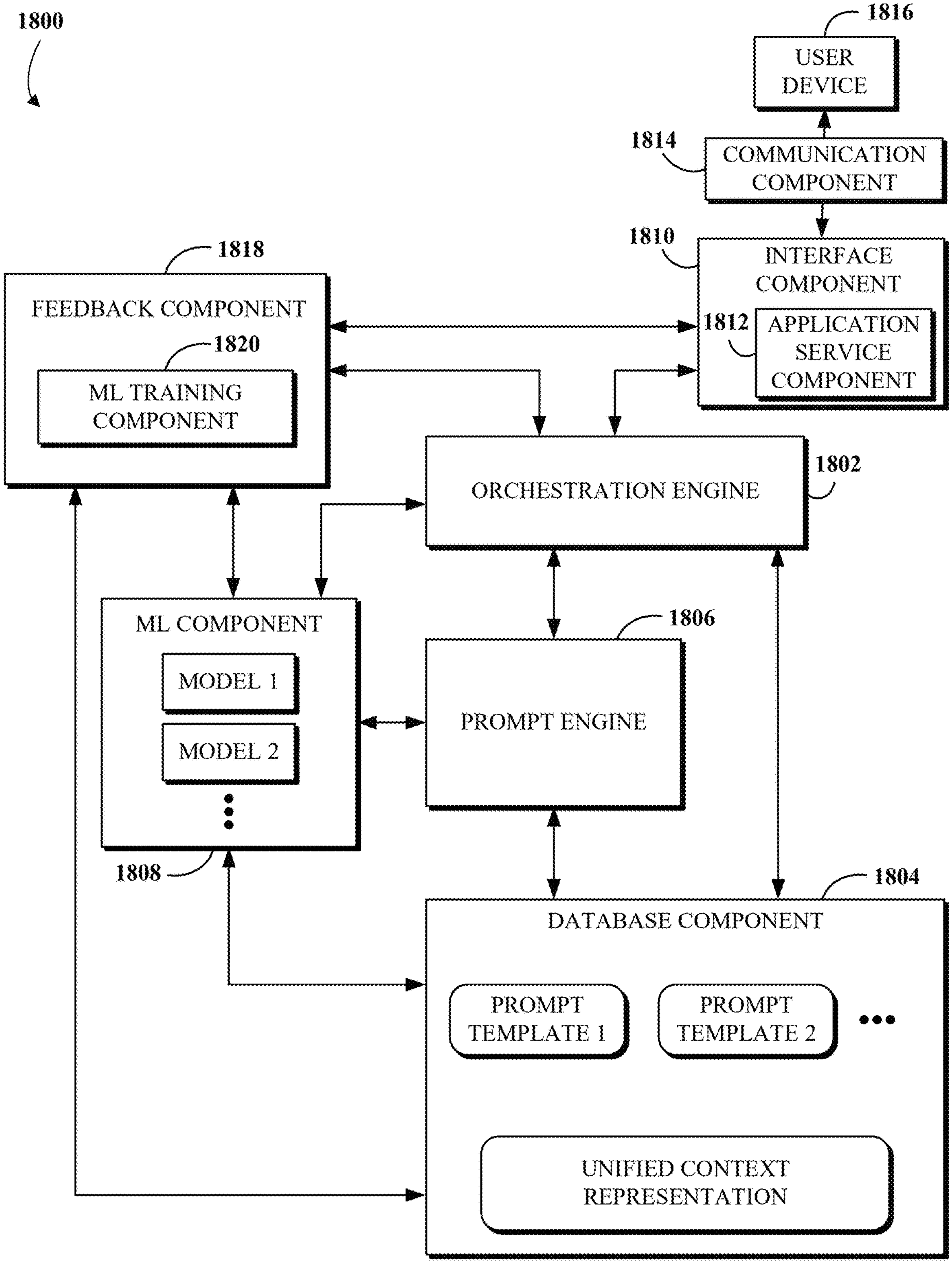
FIG. 18 is a block diagram of an example of an AI system for generating remedial action recommendations for denied transactions using a two-stage conditioned inference architecture.

FIG. 18 is a block diagram of an example of an AI system 1800 for generating remedial action recommendations for denied transactions using a two-stage conditioned inference architecture. As shown, the AI system 1800 includes an orchestration engine 1802, a database component 1804, a prompt engine 1806, a machine learning (ML) component 1808, an interface component 1810, an application service component 1812, a communication component 1814, a user device 1816, a feedback component 1818, and an ML training component 1820. The components of the AI system 1800 may be configured to interact with each other to generate, route, and refine remedial action recommendations for denied transactions in healthcare revenue cycle environments. In some implementations, the AI system 1800 may be, be similar to, include, or be included in the AI-powered automation platform 102 described above with reference to FIG. 1A. In some implementations, two or more of the orchestration engine 1802, the database component 1804, the prompt engine 1806, the ML component 1808, the interface component 1810, the application service component 1812, the communication component 1814, the feedback component 1818, and the ML training component 1820 may be integrated into a single component. In some implementations, one or more of the orchestration engine 1802, the database component 1804, the prompt engine 1806, the ML component 1808, the interface component 1810, the application service component 1812, the communication component 1814, the feedback component 1818, and the ML training component 1820 may be implemented using any number of computing devices, such as the computing device 200 shown in FIG. 2. For example, one or more of the orchestration engine 1802, the database component 1804, the prompt engine 1806, the ML component 1808, the interface component 1810, the application service component 1812, the communication component 1814, the feedback component 1818, and the ML training component 1820 may be distributed among a number of computing devices communicatively coupled via a network such as the network 108 shown in FIG. 1A.

The orchestration engine 1802 may be configured to coordinate the two-stage conditioned inference pipeline within the AI system 1800. The orchestration engine 1802 may be, be similar to, include, or be included in the orchestration engine 122 described above with reference to FIG. 1A. The orchestration engine 1802 may serve as a coordination hub that manages the flow of data between the database component 1804, the prompt engine 1806, and the ML component 1808 during each stage of the inference pipeline. In some implementations, the orchestration engine 1802 may be configured to receive a trigger event indicating that a denied transaction is ready for recommendation processing, retrieve a unified context representation for the denied transaction from the database component 1804, invoke the prompt engine 1806 to construct a first prompt, direct the first prompt to the ML component 1808 for processing, receive a first structured output from the ML component 1808, invoke the prompt engine 1806 to construct a second prompt conditioned on the first structured output, direct the second prompt to the ML component 1808 for processing, receive a second structured output from the ML component 1808, and route the second structured output to a downstream processing component for further action. In some implementations, the orchestration engine 1802 may create versioned records of each stage of the inference pipeline, including the prompts submitted, the outputs received, the model versions used, and the prompt template versions used, to maintain a comprehensive audit trail of the recommendation process.

The orchestration engine 1802 may utilize event-driven architecture to respond dynamically to changes in workflow conditions or external system states. In some implementations, the orchestration engine 1802 may monitor multiple data streams and trigger appropriate actions based on predefined rules or ML-based decision models. The orchestration engine 1802 may support both synchronous and asynchronous execution patterns, facilitating real-time processing of urgent recommendation requests while managing longer-running background processes such as batch recommendation generation. In some implementations, the orchestration engine 1802 may implement scheduling algorithms to optimize resource allocation and task sequencing across multiple concurrent recommendation requests, facilitating efficient pipeline progression while respecting priority levels and deadline constraints such as timely filing limits associated with denied transactions.

The orchestration engine 1802 may provide fault tolerance capabilities, automatically handling failures or exceptions by implementing retry mechanisms, alternative execution paths, or escalation procedures when the inference pipeline encounters unexpected conditions. In some implementations, the orchestration engine 1802 may provide comprehensive audit trails and performance analytics for all managed recommendation workflows. The orchestration engine 1802 may track execution times, resource utilization, success rates, and bottlenecks across different types of recommendation requests, facilitating continuous optimization of the inference pipeline. In some implementations, the orchestration engine 1802 may integrate with external systems through standardized application programming interfaces (APIs), facilitating interoperability with transaction processing systems, electronic health record (EHR) systems, clearinghouse services, and payor portals.

The orchestration engine 1802 may be implemented using various software architectures and technologies to provide robust pipeline management capabilities. In some implementations, the orchestration engine 1802 may be developed as a microservices-based application, where individual pipeline management functions are deployed as separate, loosely-coupled services that communicate through well-defined APIs. In some implementations, the orchestration engine 1802 may utilize containerization technologies to facilitate deployment, scaling, and management of pipeline services across cloud or on-premises infrastructure. The orchestration engine 1802 may incorporate a rule engine that evaluates conditional logic to determine pipeline progression paths, including routing decisions based on confidence scores generated by the ML component 1808. In some implementations, the orchestration engine 1802 may incorporate security and compliance components to facilitate that pipeline execution adheres to healthcare data protection regulations and organizational security policies, including encryption capabilities for data at rest and in transit, access control mechanisms to restrict pipeline operations based on user roles and permissions, and audit logging capabilities to maintain comprehensive records of all pipeline activities for compliance and regulatory reporting purposes.

The database component 1804 may be configured to store structured data and unstructured data used by the AI system 1800 in generating remedial action recommendations. The database component 1804 may be, be similar to, include, or be included in the database component 114 described above with reference to FIG. 1A. As shown in FIG. 18, the database component 1804 may store a unified context representation and a plurality of prompt templates, including a first prompt template (shown as Prompt Template 1) and a second prompt template (shown as Prompt Template 2). The unified context representation (which may also be referred to as an assembled context object, a normalized claim context, or a consolidated data representation) may be configured to combine structured transaction fields obtained from a transaction processing system and unstructured text data obtained from at least one additional data source into a format suitable for input to the ML component 1808. The structured transaction fields may include, but are not limited to, a denial reason code identifying the stated basis of a carrier for a denial, a transaction identifier uniquely identifying a claim, a timestamp indicating when the claim was submitted or denied, and a party identifier identifying at least one of a patient, a provider, or a carrier associated with a transaction. The unstructured text data may include at least one of call notes recording the substance of conversations with carrier representatives, correspondence records documenting written communications regarding the claim, or policy documents specifying adjudication rules and requirements of the carrier.

The database component 1804 may store the plurality of prompt templates used by the prompt engine 1806 during the two-stage conditioned inference process. The plurality of prompt templates may include category-specific prompt templates, where each category-specific prompt template corresponds to a respective action category in a predefined taxonomy of action categories. In some implementations, the database component 1804 may store the predefined taxonomy of action categories and associated sets of action codes, defining the hierarchical structure of remedial actions available for denied transactions. The database component 1804 may store first structured outputs and second structured outputs generated by the ML component 1808, creating a persistent record of each recommendation and the reasoning that produced it. In some implementations, the database component 1804 may store a corpus of previously resolved transactions used for similarity search when constructing prompts that include historical transaction examples as few-shot conditioning examples.

The database component 1804 may serve as the foundational data storage and management layer for the AI system 1800, providing persistent storage capabilities for unified context representations, prompt templates, structured outputs, and associated workflow data. In some implementations, the database component 1804 may utilize a hybrid storage architecture that combines relational database technologies for structured transaction metadata with document-oriented storage systems for unstructured text data such as call notes, correspondence records, and policy documents. The database component 1804 may implement indexing strategies to optimize query performance across large volumes of transaction data, including temporal indexing for tracking recommendation histories and composite indexing for multi-dimensional transaction attribute searches. The database component 1804 may incorporate data integrity and consistency mechanisms to facilitate reliable state management across concurrent recommendation processes. In some implementations, the database component 1804 may include a governance registry (which may also be referred to as an audit repository, a model performance tracking system, or a compliance monitoring infrastructure) configured to track model performance metrics over time, including accuracy rates, confidence calibration, override frequency, resolution outcomes, and potential distributional shifts in the types of claims or denials being processed. Each record logged to the governance registry may include the prompt submitted to the ML component 1808, the output received, the model version used, and the prompt template version used. In some implementations, the database component 1804 may implement data lineage tracking to maintain comprehensive audit trails of all modifications to unified context representations and structured outputs, facilitating compliance with healthcare regulatory requirements and providing detailed recommendation analysis.

The prompt engine 1806 may be configured to construct prompts for the ML component 1808 by assembling unified context representations with prompt templates stored in the database component 1804. The prompt engine 1806 (which may also be referred to as a prompt construction module, a template-based query generator, or a context-to-prompt transformation engine) may be configured to manage the lifecycle of prompts used in the two-stage conditioned inference process. In a first stage of the inference process, the prompt engine 1806 may be configured to retrieve a unified context representation for a denied transaction from the database component 1804 and construct a first prompt comprising the unified context representation. In a second stage of the inference process, the prompt engine 1806 may be configured to select a category-specific prompt template from the plurality of prompt templates stored in the database component 1804 based on a predicted action category generated by the ML component 1808 during the first stage, and to populate the selected category-specific prompt template with the unified context representation, the predicted action category, and a first natural-language justification generated during the first stage. The prompt engine 1806 may provide the constructed prompts to the ML component 1808 for processing.

The prompt engine 1806 may implement a template selection mechanism that maps predicted action categories to corresponding category-specific prompt templates. Each category-specific prompt template (which may also be referred to as a domain-tailored inference template, a specialized query structure, or an action-class-specific reasoning framework) may correspond to a respective action category in the predefined taxonomy of action categories and may be configured to guide the ML component 1808 toward generating a recommended action code selected from a set of action codes associated with that action category. In some implementations, the template selection mechanism may retrieve the appropriate template from the database component 1804 using the predicted action category as a lookup key. The category-specific prompt template approach may facilitate guiding each second-stage inference with domain knowledge and constraints associated with the selected action category, rather than requiring a single generic template to accommodate all categories. For example, a category-specific prompt template for a documentation submission category may include instructions directing the ML component 1808 to evaluate which specific documents are missing or insufficient, whereas a category-specific prompt template for a claim correction category may include instructions directing the ML component 1808 to identify which specific claim fields contain errors.

In some implementations, the prompt engine 1806 may be configured to incorporate historical transaction examples into the first prompt as few-shot conditioning examples. The prompt engine 1806 may perform a similarity search over the corpus of previously resolved transactions stored in the database component 1804 to identify past transactions sharing characteristics with the current denied transaction, such as the same carrier, similar denial reason codes, comparable procedure codes, or analogous documentation requirements, that were successfully resolved through known remedial actions. The prompt engine 1806 may incorporate one or more of these historical transaction examples into the first prompt to provide the ML component 1808 with concrete precedents to inform its reasoning. In some implementations, the prompt engine 1806 may be configured to incorporate content from payer policy documents into the unified context representation using a retrieval-augmented generation (RAG) technique in which the policy documents stored in the database component 1804 are indexed as vector embeddings and relevant passages are retrieved at runtime based on semantic similarity to the claim context.

The prompt engine 1806 may support prompt template versioning, in which multiple versions of each category-specific prompt template may be maintained in the database component 1804 to facilitate tracking of template changes over time and to support rollback to prior template versions if a template modification degrades recommendation quality. In some implementations, the prompt engine 1806 may support A/B testing of prompt templates, in which two or more versions of a category-specific prompt template are deployed concurrently, and the recommendation outcomes associated with each version are tracked by the feedback component 1818 to determine which template version yields higher-quality recommendations. In some implementations, the prompt engine 1806 may incorporate prompt optimization techniques that adjust template parameters based on feedback data, such as modifying instruction phrasing, adjusting the number of few-shot examples, or reorganizing the order in which context elements are presented within a prompt. The prompt engine 1806 may be implemented as a software module executing on one or more processors, and may utilize natural language processing techniques to validate that constructed prompts conform to expected structural and semantic requirements before providing the prompts to the ML component 1808.

The ML component 1808 (which may also be referred to as an artificial intelligence component, an AI inference engine, or a machine learning inference system) may be configured to process prompts received from the prompt engine 1806 and generate structured outputs comprising predictions, confidence scores, and natural-language justifications. The ML component 1808 may be, be similar to, include, or be included in the ML component 116 described above with reference to FIG. 1A. As shown in FIG. 18, the ML component 1808 includes a first model (shown as Model 1) and a second model (shown as Model 2). The ML component 1808 may comprise at least one large language model (LLM) configured to process natural-language prompts and generate structured outputs in response. In some implementations, the ML component 1808 may comprise a single large language model that processes both a first prompt during the first stage of the inference process and a second prompt during the second stage of the inference process. In some implementations, the ML component 1808 may comprise a first large language model (corresponding to Model 1) that processes the first prompt and a second large language model (corresponding to Model 2) that processes the second prompt, where the first large language model and the second large language model may differ in architecture, capacity, or optimization characteristics.

The ML component 1808 may be configured to generate a first structured output in response to the first prompt. The first structured output may comprise a predicted action category selected from the predefined taxonomy of action categories, a first confidence score representing an assessment of the probability that the predicted action category is the correct high-level remedial strategy for the denied transaction, and a first natural-language justification explaining why the predicted action category was selected. The ML component 1808 may be configured to generate a second structured output in response to the second prompt. The second structured output may comprise a recommended action code selected from a set of action codes associated with the predicted action category, a second confidence score, and a second natural-language justification. In some implementations, the first structured output and the second structured output may each be formatted as a machine-readable data object comprising key-value pairs. In some implementations, the machine-readable data object may be a JavaScript Object Notation (JSON) object.

In some implementations, the ML component 1808 may be hosted within a secure computing environment that enforces data residency and access control policies, such that sensitive data within the unified context representation does not leave a controlled infrastructure boundary during processing. The ML component 1808 may implement real-time inference capabilities that facilitate dynamic recommendation generation throughout the denial resolution workflow lifecycle. In some implementations, the ML component 1808 may incorporate adaptive learning mechanisms that facilitate the models evolving and improving their accuracy based on feedback from recommendation outcomes and user interactions captured by the feedback component 1818 and the ML training component 1820. The ML component 1808 may support explainable artificial intelligence (AI) features that provide transparency into model decision-making processes, facilitating healthcare professionals to understand and validate the reasoning behind recommendations through the natural-language justifications included in each structured output.

The ML component 1808 may be utilized by or incorporated into the orchestration engine 1802 to enhance pipeline management through intelligent automation and decision-making. In some implementations, the orchestration engine 1802 may leverage the ML component 1808 to make intelligent routing decisions based on the confidence scores included in the structured outputs, to predict improved pipeline sequencing when processing batches of denied transactions, and to dynamically adjust pipeline parameters based on historical performance data and real-time conditions. In some implementations, the ML component 1808 may provide shared intelligence services that the orchestration engine 1802 may access through standardized interfaces, facilitating integration of inference capabilities into broader workflow management operations.

The interface component 1810 may be configured to provide user-facing services for the AI system 1800 through the application service component 1812. The interface component 1810 may be, be similar to, include, or be included in the interface component 118 described above with reference to FIG. 1A. The interface component 1810 may be configured to connect to the application service component 1812, which may be configured to manage business logic and user interactions associated with the AI system 1800. In some implementations, the interface component 1810 may be configured to output data to cause a graphical user interface (GUI) of the user device 1816 to present user interface elements associated with remedial action recommendations, including the recommended action code, the second confidence score, and the second natural-language justification. In some implementations, the interface component 1810 may be configured to present a human review queue displaying recommendations that have been routed for human evaluation, along with interactive elements that facilitate a human reviewer to provide an indication of whether a recommended action code was accepted or overridden.

The application service component 1812 may be configured to interface with the communication component 1814 and may manage the business logic associated with presenting recommendations, processing human reviewer inputs, and coordinating between the orchestration engine 1802 and the user-facing interface. The application service component 1812 may be, be similar to, include, or be included in the application service component 130 described above with reference to FIG. 1C. In some implementations, the application service component 1812 may implement responsive design principles to facilitate a consistent user experience across various devices and screen sizes. In some implementations, the application service component 1812 may provide dashboards displaying recommendation performance metrics, confidence calibration statistics, and override frequency analytics derived from data stored in the governance registry within the database component 1804.

The communication component 1814 may be configured to facilitate communication between the AI system 1800 and external systems, including the user device 1816 and data sources such as the data sources 106A and 106B described above with reference to FIG. 1A. The communication component 1814 may be, be similar to, include, or be included in the communication component 110 described above with reference to FIG. 1A. The communication component 1814 may implement various communication protocols and data exchange standards, including Health Level Seven Fast Healthcare Interoperability Resources (HL7 FHIR) for healthcare data exchange, X12 electronic data interchange (EDI) standards for exchanging transaction data with carriers, and representational state transfer (RESTful) APIs for web-based integrations. In some implementations, the communication component 1814 may receive structured transaction fields from a transaction processing system and unstructured text data from additional data sources and may provide this data to the database component 1804 for assembly into unified context representations. In some implementations, the communication component 1814 may transmit recommendation outputs to external systems for automated execution by a downstream processing component.

The user device 1816 may include any device that facilitates a user to interact with the AI system 1800. The user device 1816 may be, be similar to, include, or be included in the user devices 104A and 104B described above with reference to FIG. 1A. The user device 1816 may include a mobile device, a tablet, a personal computer, a wearable device, or any other computing device. In some implementations, the user device 1816 may be operated by a human reviewer, such as a billing specialist or a denial resolution manager, who evaluates remedial action recommendations generated by the AI system 1800 and provides accept or override indications through the interface component 1810. In some implementations, the user device 1816 may be implemented using one or more computing devices such as the computing device 200 illustrated with respect to FIG. 2.

The feedback component 1818 may be configured to capture and process various forms of feedback to facilitate continuous improvement of the AI system 1800. The feedback component 1818 may be, be similar to, include, or be included in the feedback component 120 described above with reference to FIG. 1A. The feedback component 1818 may be configured to connect to the ML training component 1820, which may be configured to provide training capabilities for the models within the ML component 1808. The feedback component 1818 and the ML training component 1820 may be configured to interact with the orchestration engine 1802 and the ML component 1808 to facilitate model improvement based on system feedback. In some implementations, the feedback component 1818 may collect explicit feedback from healthcare professionals, including accept or override indications provided by human reviewers who evaluate remedial action recommendations routed to a human review queue. In some implementations, the feedback component 1818 may obtain resolution outcomes indicating whether a denied transaction was subsequently approved, partially approved, or written off after the recommended action was taken. The feedback component 1818 may store resolution outcomes in the database component 1804 in association with the corresponding recommended action codes, creating records linking claim contexts, recommendations, and eventual financial results.

The feedback component 1818 may employ analytics to process and interpret collected feedback data, transforming raw user interactions and resolution outcomes into structured insights that may inform model improvements and prompt template refinements. In some implementations, the feedback component 1818 may implement feedback validation mechanisms to assess the quality and reliability of received feedback, weighting contributions based on user expertise, historical accuracy, or consistency with established best practices. The feedback component 1818 may incorporate temporal analysis capabilities to identify trends in feedback patterns over time, facilitating detection of shifts in recommendation quality, emerging denial patterns, or evolving carrier adjudication practices. In some implementations, the feedback component 1818 may provide feedback analytics and reporting capabilities, generating insights for system administrators about recommendation acceptance rates, model performance trends, and areas indicating potential for enhancement.

The ML training component 1820 may be configured to use feedback data captured by the feedback component 1818 as training signals to refine parameters of the ML component 1808. The ML training component 1820 may be, be similar to, include, or be included in the ML training component 138 described above with reference to FIG. 1C. In some implementations, the ML training component 1820 may be configured to adjust prompt templates stored in the database component 1804 based on patterns in which recommendations led to successful resolutions, for example by modifying the instructions, examples, or structural organization within a category-specific prompt template that is associated with lower-than-expected resolution rates. In some implementations, the ML training component 1820 may be configured to fine-tune model weights within the ML component 1808 using historical pairs of claim contexts, recommended actions, and resolution outcomes. The ML training component 1820 may implement dynamic retraining mechanisms, including a sliding window technique in which the training dataset is continuously updated with the most recent feedback data while gradually phasing out older data, to facilitate that the models within the ML component 1808 adapt to evolving patterns in carrier adjudication behavior and denial resolution outcomes. In some implementations, the ML training component 1820 may facilitate closed-loop learning by automatically triggering model retraining processes when sufficient feedback data has been accumulated or when performance metrics stored in the governance registry within the database component 1804 indicate potential degradation in recommendation quality.

By leveraging the orchestration engine 1802, the database component 1804, the prompt engine 1806, the ML component 1808, the interface component 1810, the application service component 1812, the communication component 1814, the user device 1816, the feedback component 1818, and the ML training component 1820, the AI system 1800 may facilitate generating remedial action recommendations for denied transactions through a two-stage conditioned inference architecture in which a first inference operation determines an appropriate high-level action category and a second inference operation, conditioned on the output and reasoning of the first, determines a specific action code within that category. The conditioning relationship between the two stages, managed by the orchestration engine 1802 and implemented through the prompt engine 1806, may facilitate each stage focusing on a lower-dimensional decision problem while preserving reasoning coherence between stages. The feedback loop provided by the feedback component 1818 and the ML training component 1820 may facilitate continuous refinement of both the prompt templates stored in the database component 1804 and the model parameters within the ML component 1808, based on resolution outcomes and human reviewer inputs captured through the interface component 1810 and the user device 1816.

Figure 19:
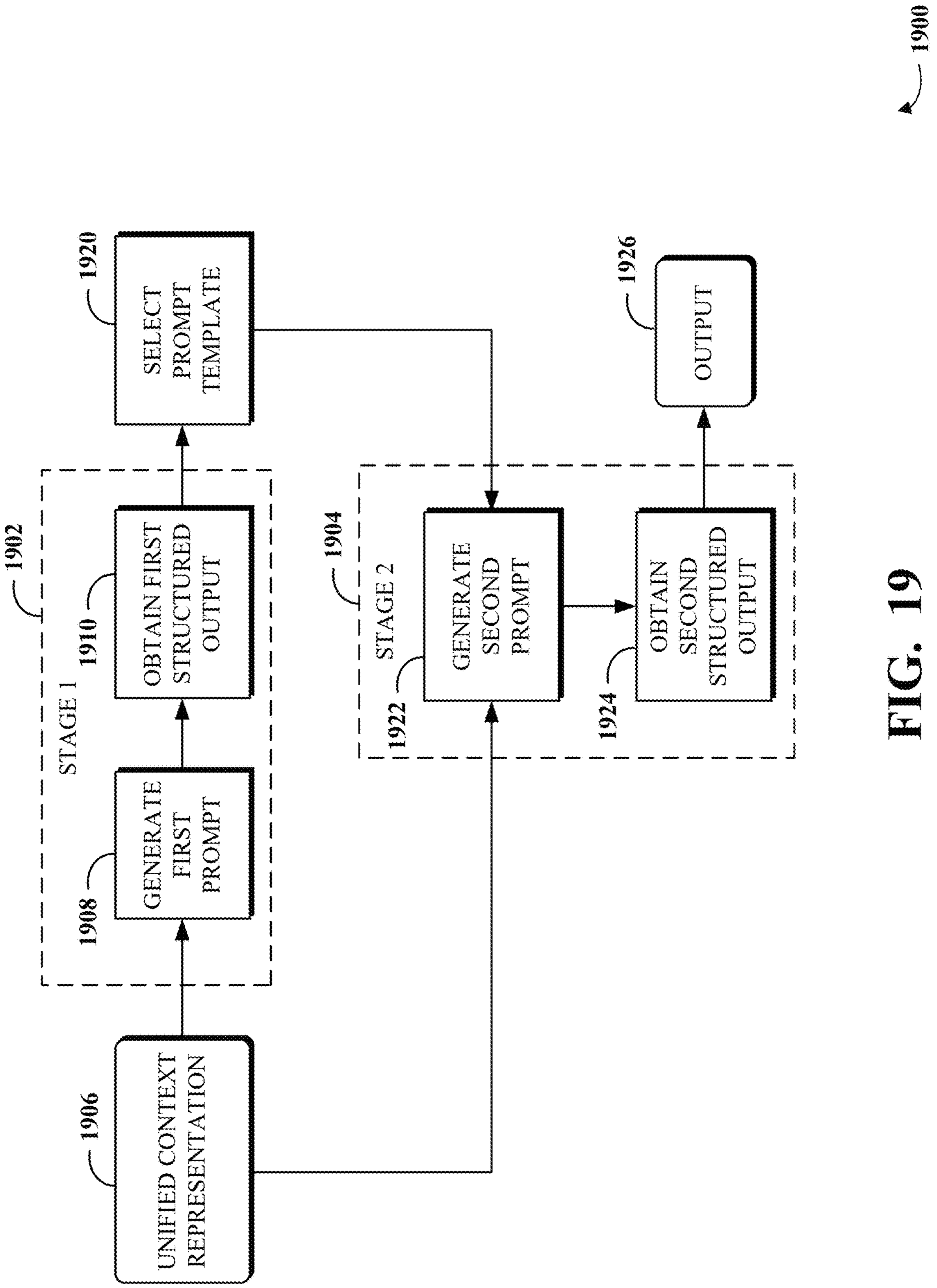
FIG. 19 is a flow diagram of an example of a process for generating a remedial action recommendation for a denied transaction using a two-stage conditioned inference architecture.

FIG. 19 is a flow diagram of an example of a process 1900 for generating a remedial action recommendation for a denied transaction using a two-stage conditioned inference architecture. The process 1900 may be performed by the AI system 1800 described above with reference to FIG. 18. In some implementations, the process 1900 may be performed by one or more processors, such as the processor 202 of the computing device 200 described above with reference to FIG. 2. As shown, the process 1900 includes a first stage 1902 and a second stage 1904. A unified context representation 1906 serves as input to both the first stage 1902 and the second stage 1904. The first stage 1902 includes generating a first prompt at step 1908 and obtaining a first structured output at step 1910. The second stage 1904 includes selecting a prompt template at step 1920, generating a second prompt at step 1922, and obtaining a second structured output at step 1924. The process 1900 produces an output 1926 comprising the results of the two-stage conditioned inference.

The first stage 1902 of the process 1900 may be configured to determine an appropriate high-level remedial strategy for the denied transaction by generating a predicted action category from the unified context representation 1906. The first stage 1902 includes step 1908 and step 1910, which together constitute a first inference operation in which a prompt is constructed from the unified context representation 1906, provided to an artificial intelligence component comprising at least one large language model, and processed to yield a first structured output. The first stage 1902 may operate on the full decision space of the predefined taxonomy of action categories, evaluating which broad class of remedial action is most appropriate for the denied transaction based on the totality of the assembled claim context.

The second stage 1904 of the process 1900 may be configured to determine a specific remedial action code within the action category predicted by the first stage 1902. The second stage 1904 includes step 1920, step 1922, and step 1924, which together constitute a second inference operation that is explicitly conditioned on the output and reasoning of the first stage 1902. The conditioning relationship between the first stage 1902 and the second stage 1904 may facilitate preserving reasoning coherence between the high-level strategic decision (which category of action is appropriate) and the fine-grained tactical decision (which specific action code within that category is appropriate). Because the second stage 1904 receives and is grounded in the reasoning of the first stage 1902, the second-stage inference may operate over a reduced output space constrained to action codes associated with the predicted action category, converting a high-dimensional classification problem into two lower-dimensional problems.

The two-stage conditioned inference architecture of the process 1900 represents an unconventional arrangement of machine learning inference components relative to single-stage inference architectures and multi-model architectures in which separate models operate independently. In a single-stage inference architecture, a machine learning model receives an input and generates a prediction across the full output space in one inference operation. When the output space is hierarchically organized, as in the case of a taxonomy of action categories each containing a set of action codes, a single-stage model must simultaneously learn representations sufficient for both coarse-grained classification (distinguishing among categories) and fine-grained classification (distinguishing among action codes within a category). These two classification tasks may benefit from different learned feature representations, and a single model optimizing for both tasks may produce degraded accuracy at one or both levels of the hierarchy relative to models that specialize for a single level. In a multi-model architecture where separate models operate independently, a first model may generate a coarse-grained classification and a second model may generate a fine-grained classification, but the second model does not receive the first model's output, confidence assessment, or reasoning as input. The second model therefore operates without awareness of the first model's inference state, and the two models may produce incoherent results (for example, the second model may select an action code that is inconsistent with the category identified by the first model, or the second model may rely on different features of the input than those the first model identified as most relevant).

The process 1900 addresses these architectural limitations through two mechanisms that together produce technical effects not achievable by either a single-stage architecture or an independent multi-model architecture. The first mechanism is output space decomposition through the two-stage structure: the first stage 1902 classifies the input into a category from the predefined taxonomy, and the second stage 1904 classifies the input into an action code from the reduced set of action codes associated with the predicted category. This decomposition reduces the output dimensionality at each stage, which may facilitate improved classification accuracy at each stage by permitting the inference at each stage to focus on distinguishing among a smaller set of candidates. The second mechanism is inter-stage conditioning through the category-specific prompt template selected at step 1920 and populated at step 1922: the second stage 1904 receives the first stage's predicted action category, natural-language justification, and category-specific instructions as explicit inputs. This conditioning preserves reasoning coherence across the two stages by grounding the second-stage inference in the first stage's classification rationale and the features of the input that the first stage identified as most relevant. The combination of output space decomposition and inter-stage conditioning may yield a technical effect in which each stage operates over a reduced decision space while maintaining access to the reasoning state of the prior stage, an arrangement that is structurally distinct from both single-stage inference and independent multi-model approaches.

The process 1900 further produces, at each stage, structured outputs that are machine-parseable artifacts comprising a classification result, a confidence score, and a natural-language justification. The availability of machine-parseable intermediate outputs at each stage of the pipeline provides technical capabilities not present in a single-stage architecture. Specifically, the first structured output obtained at step 1910, comprising the predicted action category, the first confidence score, and the first natural-language justification, serves as both a conditioning input to the second stage 1904 and an independently auditable record of the first-stage inference. If the second-stage inference produces an incorrect action code, the first structured output may be examined to determine whether the error originated from an incorrect category classification at the first stage or from an incorrect action code selection within a correctly classified category at the second stage. This diagnostic capability, which arises from the multi-stage architecture producing discrete intermediate outputs, may facilitate targeted correction of inference errors and targeted refinement of the prompt templates or model parameters associated with the stage at which the error occurred The unified context representation 1906 may serve as the primary input to the process 1900. The unified context representation 1906 may be, be similar to, include, or be included in the unified context representation stored in the database component 1804 described above with reference to FIG. 18. The unified context representation 1906 may comprise structured transaction fields obtained from a transaction processing system and unstructured text data obtained from at least one additional data source, combined into a format suitable for input to the artificial intelligence component. The structured transaction fields may comprise at least one of a denial reason code, a transaction identifier, a timestamp, or a party identifier. In some implementations, the structured transaction fields may be obtained from an electronic data interchange (EDI) message. The unstructured text data may comprise at least one of call notes, correspondence records, or policy documents associated with the denied transaction. As shown in FIG. 19, the unified context representation 1906 provides input to step 1908 of the first stage 1902 and to step 1922 of the second stage 1904, indicating that both stages of the inference process have access to the full assembled claim context.

In some implementations, the unified context representation 1906 may further include one or more historical transaction examples retrieved via a similarity search over a corpus of previously resolved transactions stored in the database component 1804 (FIG. 18). The similarity search may identify past transactions sharing characteristics with the current denied transaction, such as the same carrier, similar denial reason codes, comparable procedure codes, or analogous documentation requirements, that were successfully resolved through known remedial actions. These historical transaction examples may be incorporated into the unified context representation 1906 to provide the artificial intelligence component with concrete precedents to inform the reasoning performed during the first stage 1902. In some implementations, the unified context representation 1906 may include content from one or more payer policy documents retrieved using a retrieval-augmented generation technique in which the policy documents are indexed as vector embeddings and relevant passages are retrieved at runtime based on semantic similarity to the claim context.

At step 1908, the process 1900 includes constructing a first prompt for input to an artificial intelligence component comprising at least one large language model. The first prompt may comprise the unified context representation 1906 for the denied transaction. The prompt engine 1806, described above with reference to FIG. 18, may construct the first prompt by retrieving the unified context representation 1906 from the database component 1804 and assembling the structured transaction fields and the unstructured text data into a prompt structure that the artificial intelligence component may process. In some implementations, the prompt engine 1806 may perform a similarity search over a corpus of previously resolved transactions stored in the database component 1804 to identify historical transaction examples sharing characteristics with the current denied transaction, such as the same carrier, similar denial reason codes, comparable procedure codes, or analogous documentation requirements. The prompt engine 1806 may incorporate one or more of the identified historical transaction examples into the first prompt as few-shot conditioning examples, providing the artificial intelligence component with concrete precedents from previously resolved transactions to inform its inference. In some implementations, the prompt engine 1806 may retrieve relevant passages from payer policy documents stored in the database component 1804 using a retrieval-augmented generation technique in which the policy documents are indexed as vector embeddings and relevant passages are retrieved at runtime based on semantic similarity to the claim context, and may incorporate the retrieved passages into the first prompt. In some implementations, step 1908 may include formatting the unified context representation 1906 according to a first-stage prompt template that specifies the structure, instructions, and output format for the first inference operation. The first prompt constructed at step 1908 is provided as input to the ML component 1808 (FIG. 18) for processing at step 1910.

At step 1910, the process 1900 includes obtaining, from the artificial intelligence component and based on the first prompt, a first structured output. The ML component 1808 (FIG. 18) may process the first prompt constructed at step 1908 and may generate the first structured output in response. The first structured output may comprise a predicted action category selected from a predefined taxonomy of action categories, a first confidence score, and a first natural-language justification explaining why the predicted action category was selected.

The predefined taxonomy of action categories may define the hierarchical structure of the output space for the first-stage inference. In some implementations, the predefined taxonomy may include categories such as resubmission, documentation submission, reconsideration, formal appeal, claim correction, coverage verification, secondary billing, patient responsibility transfer, timely filing response, payment review, case closure, and follow-up scheduling. Each category in the predefined taxonomy may encompass a set of more granular action codes that specify the particular remedial step to be taken within that category. The predicted action category selected at step 1910 represents the output of the first-stage inference, classifying the denied transaction into one of the categories defined by the taxonomy based on the unified context representation 1906 provided in the first prompt.

The first confidence score included in the first structured output may represent an assessment, by the artificial intelligence component, of the probability that the predicted action category is the correct classification for the denied transaction within the predefined taxonomy. The first natural-language justification included in the first structured output may provide a human-readable and machine-parseable explanation of the inference that led to the category selection, identifying which elements of the unified context representation 1906 the artificial intelligence component weighted most heavily in generating the classification. In some implementations, the first structured output and the second structured output described below may each be formatted as a machine-readable data object comprising key-value pairs. In some implementations, the machine-readable data object may be a JavaScript Object Notation (JSON) object. The first natural-language justification serves a dual function in the architecture of the process 1900: it provides an auditable record of the first-stage inference, and it serves as a conditioning input to the second stage 1904, grounding the second-stage inference in the specific features and classification rationale identified by the first stage. The first structured output obtained at step 1910 serves as input to step 1920, where a prompt template is selected based on the predicted action category.

At step 1920, the process 1900 includes selecting a prompt template based on the predicted action category obtained at step 1910. The prompt engine 1806 (FIG. 18) may select, based on the predicted action category, a category-specific prompt template from a plurality of category-specific prompt templates stored in the database component 1804 (FIG. 18). Each category-specific prompt template may correspond to a respective action category in the predefined taxonomy. For example, a category-specific prompt template corresponding to a documentation submission category may include instructions and constraints that guide the artificial intelligence component toward evaluating which specific documents are missing or insufficient, whereas a category-specific prompt template corresponding to a claim correction category may include instructions and constraints that guide the artificial intelligence component toward identifying which specific claim fields contain errors.

The template selection performed at step 1920 serves as a conditioning bridge between the first stage 1902 and the second stage 1904 and constitutes a component of the inter-stage conditioning mechanism described above. By selecting a category-specific prompt template based on the output of the first stage 1902, step 1920 constrains the second-stage inference along two dimensions: the output dimension, by directing the ML component 1808 (FIG. 18) toward the set of action codes associated with the predicted action category rather than the full action code space, and the instruction dimension, by providing category-specific processing directives that focus the second-stage inference on the features and distinctions most relevant to the selected category. This template-based conditioning mechanism may facilitate modularity in the system: adding new action categories to the predefined taxonomy may involve adding a new category-specific prompt template to the plurality of prompt templates and updating the first-stage prompt, without modifying the prompt templates for existing categories. In some implementations, the prompt engine 1806 (FIG. 18) may select the category-specific prompt template by using the predicted action category as a lookup key to retrieve the corresponding template from the database component 1804 (FIG. 18). The selected category-specific prompt template is provided to step 1922 for population with the unified context representation 1906 and the first-stage inference results.

At step 1922, the process 1900 includes constructing a second prompt. The prompt engine 1806 (FIG. 18) may populate the category-specific prompt template selected at step 1920 with the unified context representation 1906, the predicted action category, and the first natural-language justification. As shown in FIG. 19, the unified context representation 1906 provides a direct input to step 1922, indicating that the second prompt includes the full assembled claim context in addition to the first-stage inference results. In some implementations, the second prompt may further include the first confidence score from the first structured output obtained at step 1910. By including the first natural-language justification in the second prompt, step 1922 grounds the second-stage inference in the reasoning that led to the category selection at the first stage 1902, facilitating coherence between the strategic category decision and the tactical action code decision.

In some implementations, populating the category-specific prompt template at step 1922 may include inserting the unified context representation 1906 into a context section of the template, inserting the predicted action category and the first natural-language justification into a conditioning section of the template, and inserting instructions that constrain the output of the artificial intelligence component to the set of action codes associated with the predicted action category. The second prompt constructed at step 1922 may include explicit instructions directing the artificial intelligence component to select a recommended action code from the set of action codes associated with the predicted action category, to generate a second confidence score, and to generate a second natural-language justification explaining why the recommended action code was selected. The second prompt is provided as input to the ML component 1808 (FIG. 18) for processing at step 1924.

At step 1924, the process 1900 includes obtaining, from the artificial intelligence component and based on the second prompt, a second structured output. The ML component 1808 (FIG. 18) may process the second prompt constructed at step 1922 and may generate the second structured output in response. The second structured output may comprise a recommended action code selected from a set of action codes associated with the predicted action category, a second confidence score, and a second natural-language justification. Because the set of valid action codes is constrained to those associated with the predicted action category selected during the first stage 1902, the second-stage inference at step 1924 operates over a reduced output space relative to the full space of all possible action codes across all categories. This output space reduction, combined with the conditioning provided by the first natural-language justification and the category-specific instructions included in the second prompt, may facilitate improved classification accuracy at the second stage by permitting the ML component 1808 (FIG. 18) to focus its inference on distinguishing among a smaller set of action code candidates using features of the unified context representation 1906 that the first stage identified as most relevant to the predicted category.

The recommended action code included in the second structured output may specify a particular remedial step within the predicted action category. The second confidence score included in the second structured output may represent an assessment, by the artificial intelligence component, of the probability that the recommended action code is the correct fine-grained classification for the denied transaction within the set of action codes associated with the predicted action category. The second natural-language justification may provide a human-readable and machine-parseable explanation of the inference that led to the action code selection, grounded in both the unified context representation 1906 and the first natural-language justification from the first stage 1902. Because the second natural-language justification references the first natural-language justification, the two justifications together form a chain-of-inference record that traces the classification from the coarse-grained category level through the fine-grained action code level, providing a machine-parseable audit trail of the complete two-stage inference.

In some implementations, the artificial intelligence component may comprise a single large language model that processes both the first prompt at step 1908 and the second prompt at step 1922. In some implementations, the artificial intelligence component may comprise a first large language model that processes the first prompt and a second large language model that processes the second prompt, where the first large language model and the second large language model may differ in architecture, capacity, or optimization characteristics. In some implementations, the artificial intelligence component may be hosted within a secure computing environment that enforces data residency and access control policies, such that sensitive data within the unified context representation 1906 does not leave a controlled infrastructure boundary during processing at step 1910 or step 1924.

The output 1926 of the process 1900 may comprise the recommended action code and the second natural-language justification from the second structured output obtained at step 1924. At the output 1926, the process 1900 includes providing the recommended action code and the second natural-language justification to a downstream processing component for further processing. The downstream processing component may be, be similar to, include, or be included in the downstream processing component 2012 described below with reference to FIG. 20. In some implementations, the output 1926 may further include the second confidence score, the predicted action category, the first confidence score, and the first natural-language justification, providing the downstream processing component with the complete inference chain from both stages of the process 1900. The downstream processing component may surface the recommendation through the interface component 1810 to a user device 1816 via the application service component 1812, route the recommendation to a human reviewer, or initiate automated execution of the recommended action depending on the confidence and risk profile of the recommendation. The confidence-based routing and human review processing of the output 1926 are described in greater detail below with reference to FIG. 20.

Figure 20:
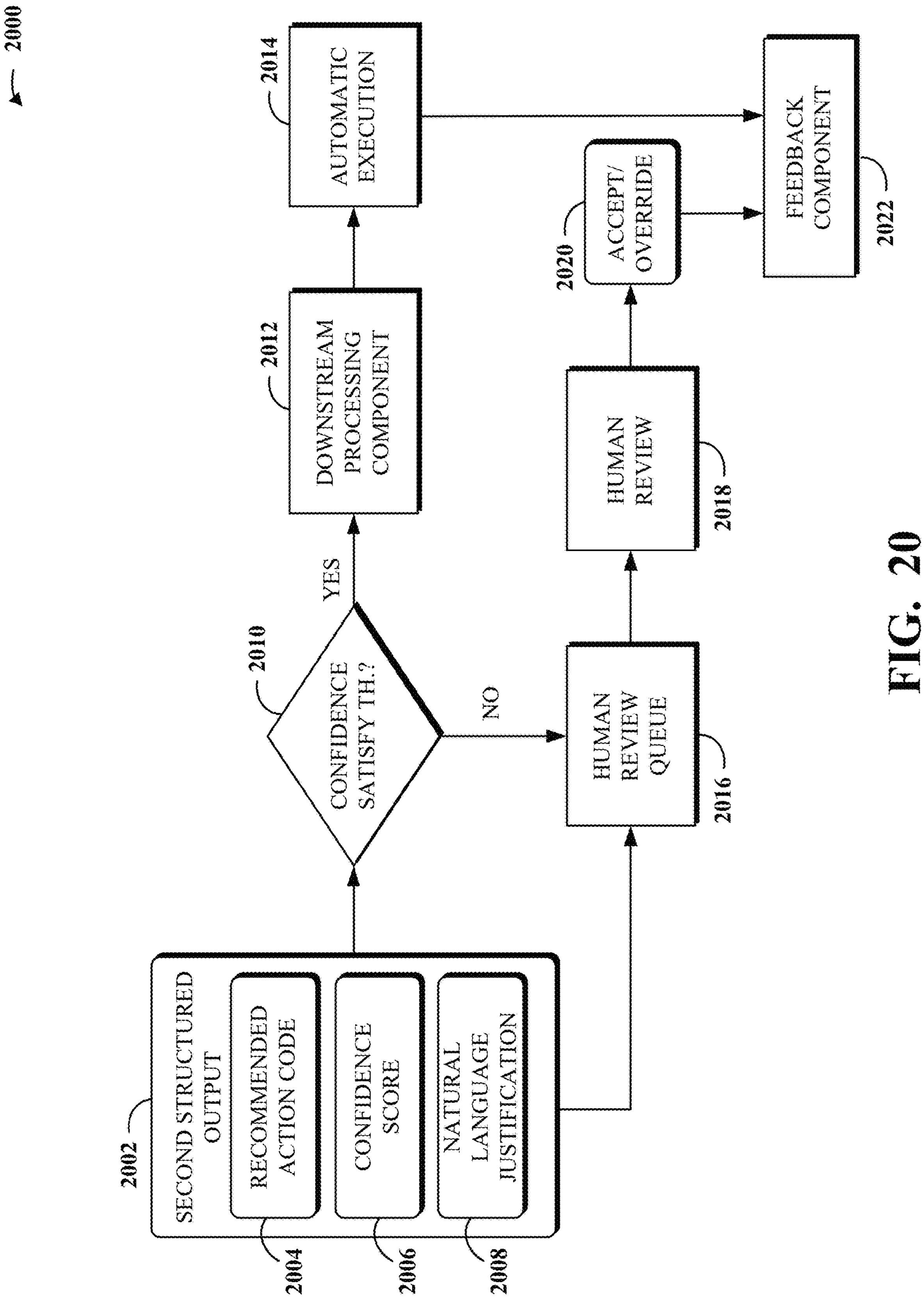
FIG. 20 is a data flow diagram illustrating an example of confidence-based routing and processing of a second structured output.

FIG. 20 is a data flow diagram 2000 illustrating an example of confidence-based routing and processing of a second structured output 2002 generated by the process 1900 described above with reference to FIG. 19. As shown, the second structured output 2002 includes a recommended action code 2004, a confidence score 2006, and a natural language justification 2008. The confidence score 2006 is evaluated at a decision step 2010, which routes the recommendation along one of two paths. Along a first path, a downstream processing component 2012 automatically executes the recommended action at an automatic execution step 2014. Along a second path, a human review queue 2016 receives the recommendation for evaluation by a human reviewer at a human review step 2018, resulting in an output 2020 indicating whether the recommended action code 2004 was accepted or overridden. Both paths converge at a feedback component 2022, which captures data for continuous improvement of the AI system 1800 shown in FIG. 18.

The second structured output 2002 may be, be similar to, include, or be included in the second structured output obtained at step 1924 of the process 1900 described above with reference to FIG. 19. The second structured output 2002 serves as the primary input to the data flow diagram 2000 and may represent the result of the two-stage conditioned inference performed during the process 1900. As shown in FIG. 20, the second structured output 2002 includes three constituent fields: a recommended action code 2004, a confidence score 2006, and a natural language justification 2008. The second structured output 2002 provides data to both the decision step 2010, where the confidence score 2006 is evaluated against a threshold, and to the human review queue 2016, where the full content of the second structured output 2002 may be made available for human evaluation when routing conditions are met.

The recommended action code 2004 may specify a remedial step to be taken for the denied transaction. The recommended action code 2004 may be selected from a set of action codes associated with the predicted action category determined during the first stage 1902 of the process 1900 (FIG. 19). For example, the recommended action code 2004 may specify an action such as submitting medical records, sending an itemized bill, correcting a coding error, correcting demographic information, disputing an underpayment, filing a formal appeal, initiating a reconsideration request, or verifying coverage eligibility, among other remedial actions within the predefined taxonomy of action categories described above with reference to FIG. 19. The recommended action code 2004 may be formatted as a machine-readable value within the second structured output 2002, facilitating automated processing by the downstream processing component 2012 and programmatic display through the interface component 1810 shown in FIG. 18.

The confidence score 2006 may represent the second confidence score generated by the artificial intelligence component during step 1924 of the process 1900 (FIG. 19). The confidence score 2006 may represent an assessment, by the artificial intelligence component, of the probability that the recommended action code 2004 is the correct specific remedial action for the denied transaction. The confidence score 2006 may be expressed as a numerical value, such as a probability between zero and one, a percentage, or a score on a predefined scale. The confidence score 2006 serves as the input to the decision step 2010, where the confidence score 2006 is evaluated to determine the routing path for the recommendation. In some implementations, the confidence score 2006 may be derived from token-level log probabilities generated by the large language model within the ML component 1808 shown in FIG. 18, from a self-reported probability assessment produced by the large language model in response to instructions within the second prompt, or from a calibration function applied to a raw model output.

The natural language justification 2008 may represent the second natural-language justification generated by the artificial intelligence component during step 1924 of the process 1900 shown in FIG. 19. The natural language justification 2008 may provide a human-readable and machine-parseable explanation of the reasoning that led to the selection of the recommended action code 2004. The natural language justification 2008 may reference specific elements of the unified context representation 1906 shown in FIG. 19 that informed the recommendation, such as denial reason codes, call note content, or policy document provisions. The natural language justification 2008 may be provided to the downstream processing component 2012 along with the recommended action code 2004, and may be presented to a human reviewer through the human review queue 2016 to facilitate evaluation of the recommendation.

At the decision step 2010, a determination is made whether the confidence score 2006 satisfies a confidence threshold. The decision step 2010 represents a routing decision that directs the flow of data along one of two paths based on the relationship between the confidence score 2006 and the confidence threshold. The confidence threshold may be a predefined numerical value stored in the database component 1804 shown in FIG. 18 or maintained by the orchestration engine 1802 shown in FIG. 18. In some implementations, the confidence threshold may be configurable and may vary based on factors such as the predicted action category, the carrier associated with the denied transaction, the financial value of the claim, or the risk profile of the recommended action. As shown in FIG. 20, when the confidence score 2006 satisfies the confidence threshold (YES), the data flow proceeds to the downstream processing component 2012. When the confidence score 2006 does not satisfy the confidence threshold (NO), the data flow proceeds to the human review queue 2016.

In some implementations, the decision step 2010 may be performed by the orchestration engine 1802 shown in FIG. 18, which may compare the confidence score 2006 to the confidence threshold and route the second structured output 2002 to the appropriate path based on the result of the comparison. In some implementations, the decision step 2010 may involve evaluating multiple threshold levels rather than a single binary threshold. For example, a first threshold level may define a boundary above which the recommendation proceeds to automatic execution, a second threshold level may define a boundary below which the recommendation proceeds to human review, and an intermediate range between the first threshold level and the second threshold level may trigger a supplementary validation step, such as review by a secondary model or a supervisory queue, before routing to either path. The confidence-based routing mechanism implemented at the decision step 2010 may facilitate autonomous execution of high-confidence recommendations while preserving human oversight for ambiguous or low-confidence cases.

The downstream processing component 2012 (which may also be referred to as a workflow execution engine, an action delivery system, or a remediation orchestration module) may be configured to receive the recommended action code 2004 and the natural language justification 2008 when the confidence score 2006 satisfies the confidence threshold at the decision step 2010. The downstream processing component 2012 may be configured to initiate execution of the remedial action specified by the recommended action code 2004. In some implementations, the downstream processing component 2012 may interface with external systems through the communication component 1814 shown in FIG. 18 to carry out the recommended action. For example, the downstream processing component 2012 may transmit a documentation request to a carrier, generate and submit a corrected claim for resubmission, initiate a formal appeal filing, or trigger a reconsideration request, depending on the recommended action code 2004.

In some implementations, the downstream processing component 2012 may be configured to invoke one or more automated processes to execute the recommended action code 2004. The downstream processing component 2012 may generate electronic documents such as appeal letters, documentation transmittal forms, or corrected claim submissions. In some implementations, the downstream processing component 2012 may interact with the orchestration engine 1802 shown in FIG. 18 to record the initiation of the recommended action as a state change in the transactional workflow associated with the denied transaction. The downstream processing component 2012 may maintain a log of all actions initiated, including timestamps, action codes executed, and references to the second structured output 2002 that triggered each action, facilitating traceability between recommendations and executed actions.

At the automatic execution step 2014, the downstream processing component 2012 automatically initiates execution of the recommended action code 2004. Responsive to the determination at the decision step 2010 that the confidence score 2006 satisfies the confidence threshold, the downstream processing component 2012 may automatically initiate execution of the recommended action code 2004 without requiring human intervention. The automatic execution step 2014 may include transmitting data to external systems, generating documents, updating claim records, or triggering downstream workflows associated with the remedial action. For example, automatic execution at step 2014 may include automatically submitting a documentation request to the carrier or automatically generating a corrected claim for resubmission. As shown in FIG. 20, the automatic execution step 2014 provides data to the feedback component 2022, indicating that the outcome of the automatically executed action is captured for feedback purposes.

The human review queue 2016 may be configured to receive the recommended action code 2004 and the natural language justification 2008 when the confidence score 2006 does not satisfy the confidence threshold at the decision step 2010. Responsive to the determination at the decision step 2010 that the confidence score 2006 does not satisfy the confidence threshold, the recommended action code 2004 and the second natural-language justification may be routed to the human review queue 2016. The human review queue 2016 may store the recommendation along with the associated context data, including the confidence score 2006 and the natural language justification 2008, in a queue structure that a human reviewer may access through the interface component 1810 shown in FIG. 18 via the application service component 1812 shown in FIG. 18 and the user device 1816 shown in FIG. 18. In some implementations, the human review queue 2016 may prioritize queued recommendations based on factors such as the financial value of the denied transaction, the proximity of a timely filing deadline, the magnitude of the gap between the confidence score 2006 and the confidence threshold, or the predicted action category.

In some implementations, the human review queue 2016 may present each queued recommendation with contextual information that facilitates efficient human evaluation. The contextual information may include the recommended action code 2004, the natural language justification 2008, the confidence score 2006, the predicted action category and the first natural-language justification from the first stage 1902 of the process 1900 (FIG. 19), and relevant portions of the unified context representation 1906 (FIG. 19) such as call notes, denial reason codes, and correspondence records. By presenting the complete inference chain from both stages alongside the underlying claim context, the human review queue 2016 may facilitate the human reviewer in understanding the basis for the recommendation and making an informed decision about whether to accept or override the recommended action code 2004.

At the human review step 2018, a human reviewer evaluates the recommendation received from the human review queue 2016. The human reviewer may access the recommendation through a graphical user interface presented on the user device 1816 shown in FIG. 18 by the interface component 1810 shown in FIG. 18. At the human review step 2018, the human reviewer may examine the recommended action code 2004, the natural language justification 2008, the confidence score 2006, and any contextual information provided by the human review queue 2016. Based on this examination, the human reviewer may determine whether the recommended action code 2004 is appropriate for the denied transaction or whether an alternative action is warranted. The human review step 2018 may include the human reviewer consulting additional information sources not included in the unified context representation 1906 (FIG. 19), such as updated carrier communications, revised policy guidelines, or supplementary clinical documentation.

At the output 2020, the human reviewer provides an indication of whether the recommended action code 2004 was accepted or overridden. The output 2020 may include a structured indication that specifies whether the human reviewer accepted the recommended action code 2004 as the appropriate remedial action or overrode the recommended action code 2004 in favor of an alternative action. In some implementations, when the human reviewer overrides the recommended action code 2004, the output 2020 may further include an alternative action code selected by the human reviewer and a reason for the override. The output 2020 may be transmitted from the user device 1816 shown in FIG. 18 through the communication component 1814 shown in FIG. 18 and the interface component 1810 shown in FIG. 18 to the feedback component 2022 for storage and analysis. In some implementations, when the human reviewer accepts the recommended action code 2004, the output 2020 may trigger the downstream processing component 2012 to initiate execution of the accepted action, similar to the automatic execution path described above with reference to the automatic execution step 2014.

The indication provided at the output 2020 may be stored in a feedback data store associated with the denied transaction. In some implementations, the feedback data store may be, be similar to, include, or be included in the database component 1804 shown in FIG. 18. Storing the indication in the feedback data store in association with the denied transaction may create a record linking the claim context, the recommendation, and the human evaluation of the recommendation. This adherence data, which captures whether human experts agree with the recommendations generated by the AI system 1800 shown in FIG. 18, may provide a feedback signal that is qualitatively distinct from resolution outcome data, because adherence data reflects expert judgment at the time of the recommendation rather than the eventual financial result of the action taken.

The feedback component 2022 may be configured to receive data from both the automatic execution step 2014 and the output 2020, as shown by the connections in FIG. 20. The feedback component 2022 may be, be similar to, include, or be included in the feedback component 1818 described above with reference to FIG. 18. By receiving data from both processing paths, the feedback component 2022 may capture a comprehensive record of recommendation outcomes regardless of whether the recommendation was executed automatically or reviewed by a human. For recommendations processed through the automatic execution step 2014, the feedback component 2022 may track whether the automated action was successfully completed and may subsequently obtain a resolution outcome indicating whether the denied transaction was subsequently approved, partially approved, or written off after the recommended action was taken. For recommendations processed through the human review step 2018, the feedback component 2022 may store the accept or override indication from the output 2020 and may subsequently obtain a resolution outcome for the denied transaction.

The feedback component 2022 may store the resolution outcome in association with the recommended action code 2004, creating a record linking the claim context, the recommendation, and the eventual financial result. This combined dataset of adherence data and resolution outcome data may provide a rich feedback signal that captures both whether human experts agree with the recommendations generated by the AI system 1800 shown in FIG. 18 and whether following or overriding the recommendations leads to better financial outcomes. In some implementations, the ML training component 1820 shown in FIG. 18 may use the resolution outcome as a training signal to refine parameters of the artificial intelligence component, for example by adjusting prompt templates stored in the database component 1804 shown in FIG. 18 based on patterns in which recommendations led to successful resolutions, or by fine-tuning model weights within the ML component 1808 shown in FIG. 18 using historical pairs of claim contexts, recommended actions, and resolution outcomes. The feedback component 2022 may aggregate feedback data across multiple denied transactions over time to identify systematic patterns, such as action categories or specific carriers for which the confidence calibration of the AI system 1800 shown in FIG. 18 may benefit from adjustment, or action codes for which human reviewers consistently override the recommendation, indicating a potential gap in the training data or prompt template design.

In some implementations, the feedback component 2022 may facilitate continuous calibration of the confidence threshold used at the decision step 2010. By analyzing the relationship between the confidence scores 2006 associated with recommendations that were accepted by human reviewers at the output 2020 and recommendations that were overridden, the feedback component 2022 may generate data that the orchestration engine 1802 shown in FIG. 18 or the ML training component 1820 shown in FIG. 18 may use to adjust the confidence threshold over time, shifting the boundary between automatic execution and human review to reflect the observed accuracy of the AI system 1800 shown in FIG. 18 at different confidence levels. In some implementations, the feedback component 2022 may generate periodic reports or dashboard data provided through the interface component 1810 shown in FIG. 18 to the application service component 1812 shown in FIG. 18 for presentation on the user device 1816 shown in FIG. 18, displaying metrics such as recommendation acceptance rates, override frequencies, resolution success rates, and confidence calibration curves, facilitating system administrators in monitoring and optimizing the performance of the two-stage conditioned inference architecture.

Figure 21:
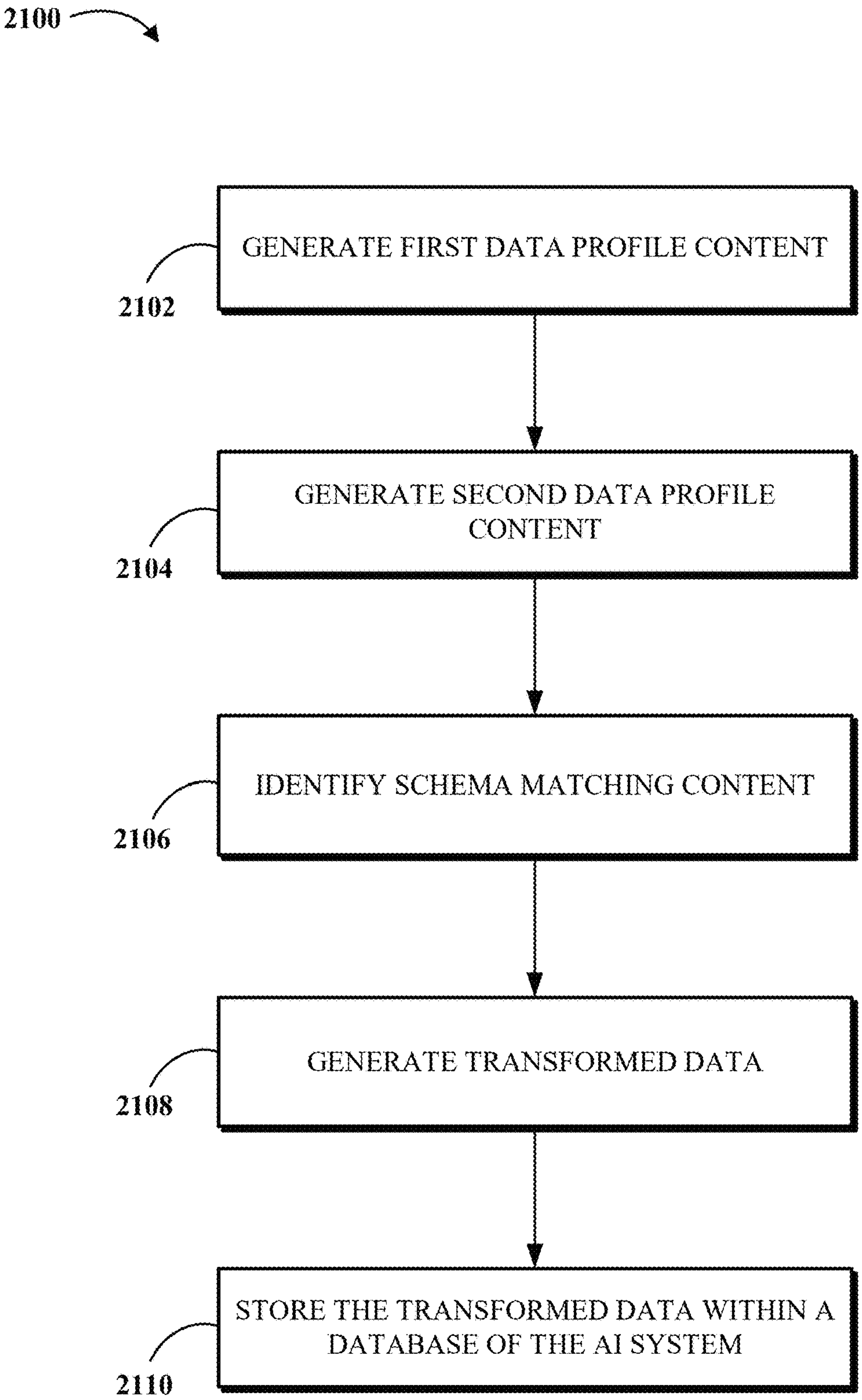
FIG. 21 is a flowchart of an example of a technique associated with data integration and transformation for healthcare revenue cycle management.

FIG. 21 is a flowchart of an example of a technique 2100 associated with data integration and transformation for healthcare revenue cycle management. The technique 2100 can be executed using computing devices, such as the systems, hardware, and software described with respect to FIGS. 1A-20. The technique 2100 can be performed, for example, by executing a machine-readable program or other computer-executable instructions, such as routines, instructions, programs, or other code. The steps, or operations, of the technique 2100, or another technique, method, process, or algorithm described in connection with the implementations disclosed herein can be implemented directly in hardware, firmware, software executed by hardware, circuitry, or a combination thereof.

For simplicity of explanation, the technique 2100 is depicted and described herein as a series of steps or operations. However, the steps or operations of the technique 2100 can occur in various orders and/or concurrently. Additionally, other steps or operations not presented and described herein may be used. Furthermore, not all illustrated steps or operations may be required to implement a technique in accordance with the disclosed subject matter.

At 2102, the technique 2100 may include generating first data profile content. For example, a data layer and/or a processing layer (e.g., the data layer 402 and/or the processing layer 404 shown in FIG. 4) may generate the first data profile content by performing, using an ML-based data profiling tool, an analysis on first data associated with a first data source. The first data profile content may identify first data schema content associated with the first data. The first data source may be a computer-based data source such as, for example, an EHR system, a practice management system, or a clearinghouse service. The ML-based data profiling tool may employ various data analysis techniques, such as statistical analysis, pattern recognition, and metadata extraction, to identify data types, formats, relationships, and anomalies within the input data.

At 2104, the technique 2100 may involve generating second data profile content. For example, a data layer and/or a processing layer (e.g., the data layer 402 and/or the processing layer 404 shown in FIG. 4) may generate the second data profile content by performing, using the ML-based data profiling tool, an analysis on second data associated with a second data source, wherein the second data profile content identifies second data schema content associated with the second data. Similar to the first data profile content, the second data profile content may identify second data schema content associated with the second data. The second data source may be different from the first data source, such as a payor portal or a financial management system. In some implementations, the first and second data profile content may further identify data type information associated with their respective data sources.

At 2106, the technique 2100 may include identifying schema matching content. For example, a data layer and/or a processing layer (e.g., the data layer 402 and/or the processing layer 404 shown in FIG. 4) may identify the schema matching content by performing, using an ML-based schema matching component, a schema matching operation wherein the schema matching content is associated with a match between a first schema associated with the first data schema content and a second schema associated with the second data schema content. This step may involve using NLP techniques to detect relationships between column names, descriptions, or metadata associated with the first and second data schema content. In some implementations, the ML component may comprise a rule engine configured to apply one or more rules to the first and second data profile content to generate an identification of data type information corresponding thereto.

At 2108, the technique 2100 may involve generating transformed data. For example, a processing layer (e.g., the processing layer 404 shown in FIG. 4) may generate the transformed data by performing, using an ML-based data transformation component and based on the schema matching content, a data transformation operation based on converting at least one of the first data or the second data from a source data format to a unified data format associated with a unified data schema. This operation may involve converting at least one of the first data or the second data from a source data format to a unified data format associated with a unified data schema. The unified data schema may be generated based on patterns associated with the first and second schemas, allowing for comprehensive analysis across previously siloed data sources.

At 2110, the technique 2100 may include storing the transformed data within a database. For example, a database component (e.g., the database component 114 shown in FIGS. 1A-IC) may store the transformed data. This step may involve using an ML-based data management component configured to manage data consistency, versioning, and quality within the database. In some implementations, the database may be part of a larger data lake architecture designed to efficiently store and manage large volumes of diverse healthcare data.

In some implementations, the technique 2100 may further include performing, using an ML-based data cleaning component, a data cleaning operation to correct anomalies in the first or second data. This operation may involve standardizing medical code formats, handling inconsistent units of measurement, or resolving conflicts between overlapping data elements. In some implementations, an ML-based completion tool may be employed to complete incomplete fields in the data, using historical trends or similarity analysis to infer missing information.

The technique 2100 may also involve performing, using an ML-based entity resolution component, an entity resolution operation to resolve entity differences or duplicate record differences between the first and second data schema information. This operation may employ fuzzy matching techniques, clustering algorithms, or deep learning models to identify and reconcile discrepancies in entity representations across different data sources.

In some implementations, the technique 2100 may include performing, using an ML-based data integration component, a data integration operation to establish data flows between the AI system and the data sources. This may involve using AI-powered APIs to facilitate seamless data exchange and synchronization across multiple databases associated with the AI system. The data integration component may also be responsible for managing the ongoing flow of data, ensuring that the AI system's database remains up-to-date with the latest information from various healthcare IT systems.

The technique 2100 may incorporate a feedback mechanism to continuously improve the AI system's performance. This may involve collecting user feedback on the accuracy and usefulness of the transformed data, which can be used to refine the data profiling, schema matching, and transformation processes. In some implementations, reinforcement learning techniques may be employed to optimize the data integration and transformation workflows based on observed outcomes and user interactions.

By leveraging AI and ML techniques throughout the data integration and transformation process, the technique 2100 may address the technical challenges associated with unifying disparate healthcare data sources. This approach may enable healthcare providers to gain a more comprehensive view of their revenue cycle, identify opportunities for optimization, and make data-driven decisions to improve financial performance. The resulting unified data model may serve as a foundation for advanced analytics, predictive modeling, and automated decision-making in healthcare revenue cycle management.

Figure 22:
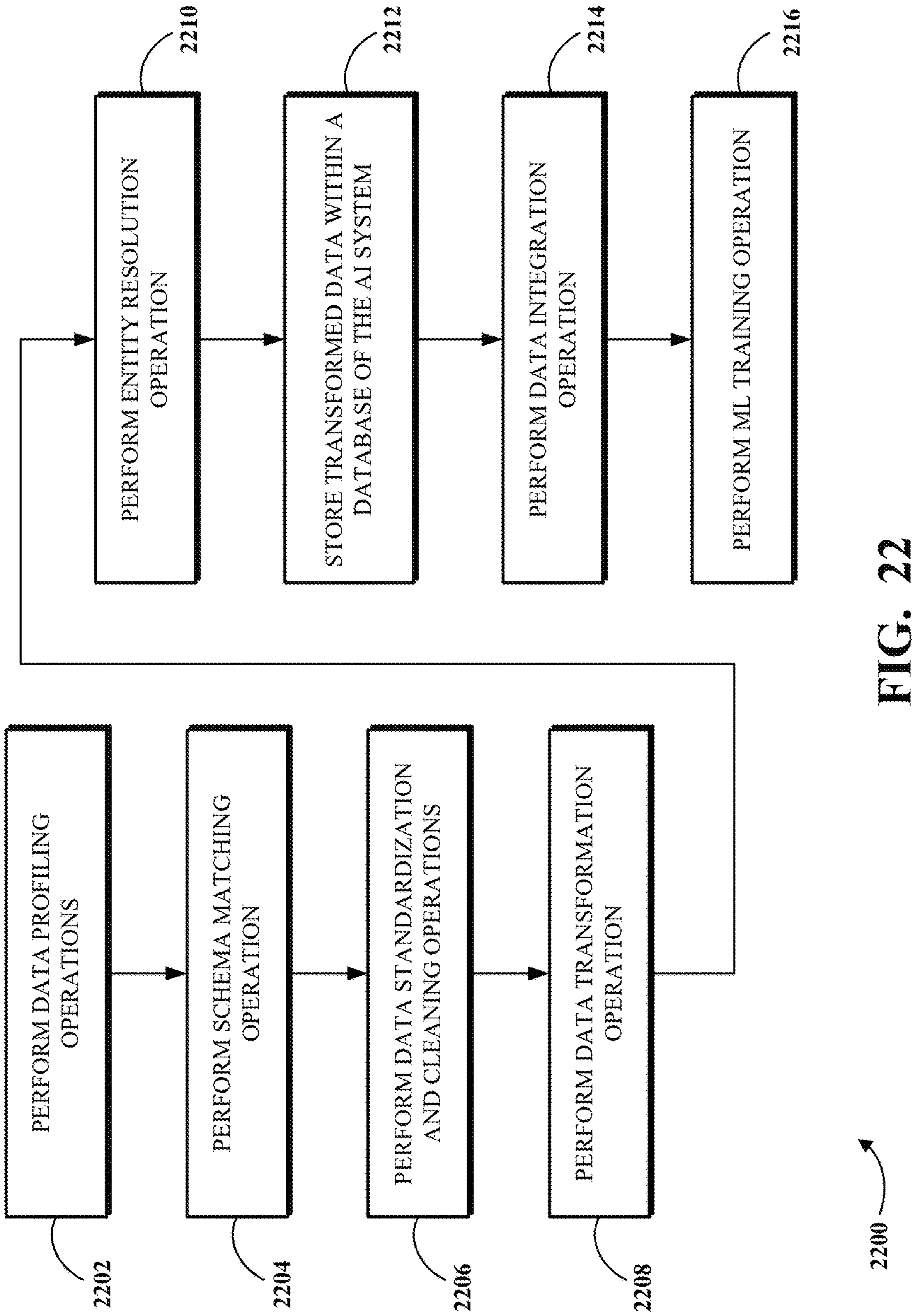
FIG. 22 is a flowchart of an example of a technique associated with data integration and transformation for healthcare revenue cycle management.

FIG. 22 is a flowchart of an example of a technique 2200 associated with data integration and transformation for healthcare revenue cycle management. The technique 2200 can be executed using computing devices, such as the systems, hardware, and software described with respect to FIGS. 1A-20. The technique 2200 can be performed, for example, by executing a machine-readable program or other computer-executable instructions, such as routines, instructions, programs, or other code. The steps, or operations, of the technique 2200, or another technique, method, process, or algorithm described in connection with the implementations disclosed herein can be implemented directly in hardware, firmware, software executed by hardware, circuitry, or a combination thereof.

For simplicity of explanation, the technique 2200 is depicted and described herein as a series of steps or operations. However, the steps or operations of the technique 2200 can occur in various orders and/or concurrently. Additionally, other steps or operations not presented and described herein may be used. Furthermore, not all illustrated steps or operations may be required to implement a technique in accordance with the disclosed subject matter.

At 2202, the technique 2200 may include performing data profiling operations. For example, a data layer and/or a processing layer (e.g., the data layer 402 and/or the processing layer 404 shown in FIG. 4) may be used to perform the data profiling operations. In some implementations, this step may involve using an ML-based data profiling tool of an AI system to analyze first data associated with a first data source and generate first data profile content. The first data profile content may identify first data schema content associated with the first data. In some implementations, the ML-based data profiling tool may be used to analyze second data associated with a second data source and generate second data profile content, which may identify second data schema content associated with the second data. In some implementations, the first and second data profile content may further identify data type information associated with their respective data sources. The data profiling operation may employ various data analysis techniques, such as statistical analysis, pattern recognition, and metadata extraction, to identify data types, formats, relationships, and anomalies within the input data.

At 2204, the technique 2200 may involve performing a schema matching operation on the profiled data. For example, a data layer and/or a processing layer (e.g., the data layer 402 and/or the processing layer 404 shown in FIG. 4) may perform the schema matching operation. In some implementations, this step may use an ML component of the AI system to identify schema matching content associated with a match between a first schema associated with the first data schema content and a second schema associated with the second data schema content. The ML component may comprise a natural language processing component configured to use natural language processing to detect relationships between column names, descriptions, or metadata associated with the first and second data schema information. In some implementations, the ML component may include a rule engine configured to apply one or more rules to the first and second data profile content to generate an identification of the data type information. The rule engine may be further configured to update these rules based on an ML clustering operation.

At 2206, the technique 2200 may include performing data standardization and cleaning operations on the matched data. For example, a data layer and/or a processing layer (e.g., the data layer 402 and/or the processing layer 404 shown in FIG. 4) may perform the data standardization and cleaning operations on the matched data. In some implementations, this step may involve using an ML-based data cleaning component to correct anomalies in the first or second data. This may include standardizing medical code formats, handling inconsistent units of measurement, or resolving conflicts between overlapping data elements. In some implementations, an ML-based completion tool may be employed to complete incomplete fields in the data, using historical trends or similarity analysis to infer missing information. In some implementations, the system may implement a standardization operation to map a first medical code format associated with the first data to a second medical code format associated with the second data.

At 2208, the technique 2200 may involve performing a data transformation operation to convert the standardized data into a desired format. For example, a processing layer (e.g., the processing layer 404 shown in FIG. 4) may perform the data transformation operation. In some implementations, this step may use an ML-based data transformation component of the AI system to generate transformed data based on the schema matching content. The operation may involve converting at least one of the first data or the second data from a source data format to a unified data format associated with a unified data schema. The unified data schema may be generated based on patterns associated with the first and second schemas, allowing for comprehensive analysis across previously siloed data sources. In some implementations, the data transformation operation may incorporate advanced entity resolution techniques, using probabilistic matching algorithms to link patient records or claims data across disparate systems, even in the absence of perfect identifier matches.

At 2210, the technique 2200 may include performing an entity resolution operation on the transformed data. For example, a processing layer (e.g., the processing layer 404 shown in FIG. 4) may perform the entity resolution operation. In some implementations, this step may use an ML-based entity resolution component to resolve entity differences or duplicate record differences between the first and second data schema content. The entity resolution operation may employ fuzzy matching techniques, clustering algorithms, or deep learning models to identify and reconcile discrepancies in entity representations across different data sources. This process may be particularly important in healthcare revenue cycle management, where patient and provider information may be represented differently across various systems.

At 2212, the technique 2200 may involve storing the transformed data within a database of the AI system. For example, a database component (e.g., the database component 114 shown in FIGS. 1A-1C) may store the transformed data. In some implementations, this step may use an ML-based data management component configured to manage data consistency, versioning, and quality within the database. The database may be part of a larger data lake architecture designed to efficiently store and manage large volumes of diverse healthcare data. In some implementations, the system may implement advanced data compression techniques or utilize a combination of relational and NoSQL databases to accommodate the diverse types of data encountered in revenue cycle management.

At 2214, the technique 2200 may include performing a data integration operation to connect the stored data with other system components. For example, a database manager (e.g., the database manager 114B shown in FIGS. 1A-1C) may perform the data integration operation. In some implementations, the database manager may include an ML-based data integration component configured to establish data flows throughout the AI system. This may involve using ML-powered APIs to facilitate seamless data exchange and synchronization across multiple databases associated with the AI system. The data integration component may also be responsible for managing the ongoing flow of data, ensuring that the AI system's database remains up-to-date with the latest information from various healthcare IT systems.

At 2216, the technique 2200 may involve performing an ML training operation using the integrated data. For example, an intelligence layer (e.g., the intelligence layer 406 shown in FIG. 4) may perform the ML training operation. In some implementations, this step may use the transformed and integrated data to train or update the ML models used throughout the AI system. This may include refining the models used for anomaly detection, predictive analytics, or automated decision-making in healthcare revenue cycle management. The training process may incorporate feedback mechanisms to continuously improve the AI system's performance based on observed outcomes and user interactions.

In some implementations, the technique 2200 may also include additional steps or variations of the described steps. For example, the system may incorporate blockchain technology to enhance data integrity and traceability, particularly for sensitive healthcare information. The data transformation process may also involve semantic enrichment, where additional context and meaning are added to the raw data. This may include mapping local codes to standardized terminologies, inferring missing information based on available data, and linking related data elements across different sources.

The technique 2200 may also implement advanced privacy and security measures throughout the data integration and transformation process. This may include techniques for data anonymization, encryption, and access control to ensure compliance with healthcare data privacy regulations such as HIPAA. In some implementations, the system may employ differential privacy techniques to allow for meaningful analysis of healthcare data while protecting individual patient privacy.

By leveraging AI and ML techniques throughout the data integration and transformation process, the technique 2200 may address the technical challenges associated with unifying disparate healthcare data sources. This approach may enable healthcare providers to gain a more comprehensive view of their revenue cycle, identify opportunities for optimization, and make data-driven decisions to improve financial performance. The resulting unified data model may serve as a foundation for advanced analytics, predictive modeling, and automated decision-making in healthcare revenue cycle management.

The data integration and transformation techniques 2100 and 2200 may be managed as an orchestrated workflow. An initial version of a VOO may be created to represent the raw data from the data sources. Each subsequent step, including data profiling at 2202, schema matching at 2204, data standardization at 2206, and data transformation at 2208, may be an orchestrated task. The completion of each task would trigger the orchestration engine to create a new version of the VOO, thereby creating a comprehensive, version-controlled audit trail of the data's journey from disparate sources to a unified and structured format.

Figure 23:
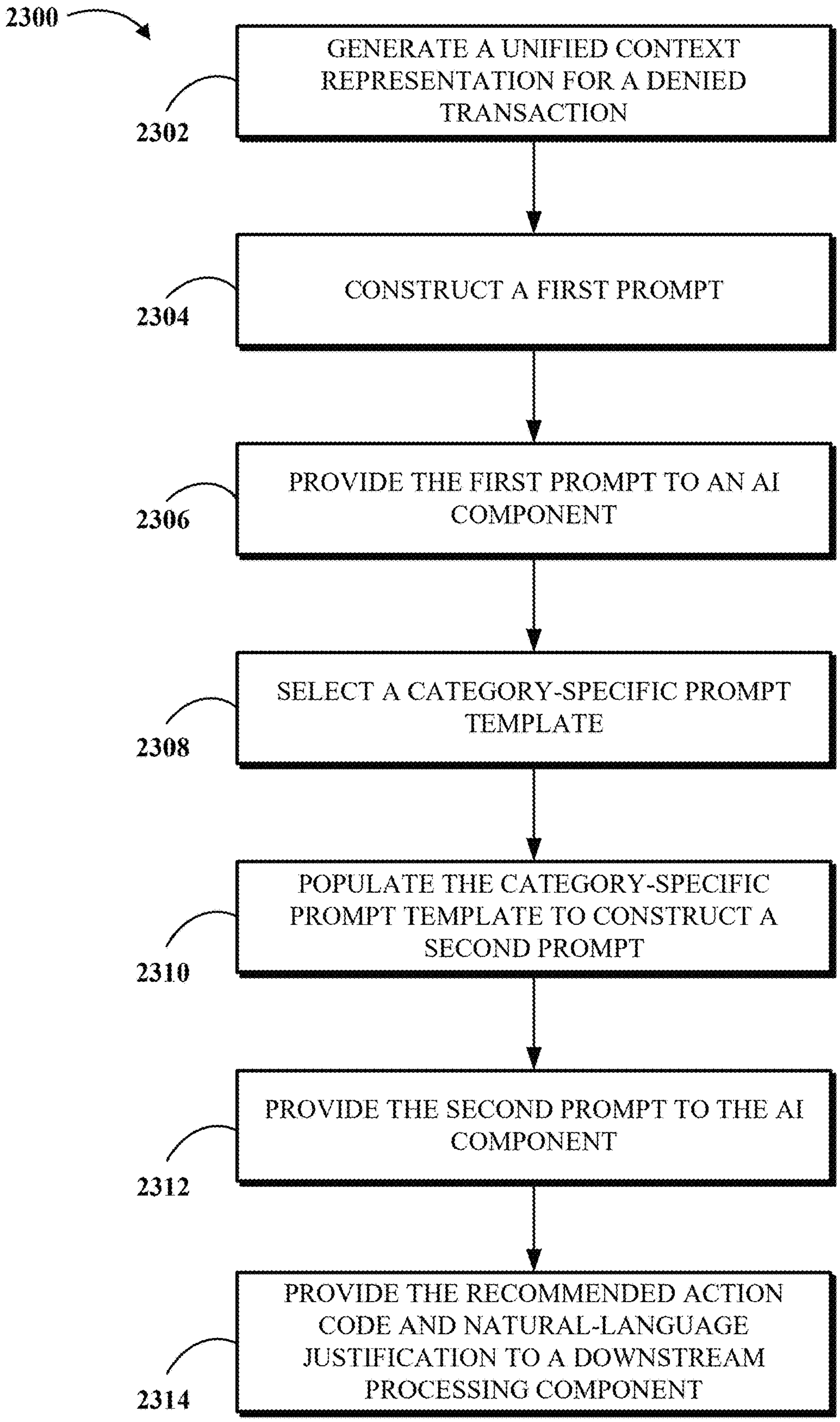
FIG. 23 is a flowchart of an example of a technique associated with generating remedial action recommendations for denied transactions using a two-stage conditioned inference architecture.

FIG. 23 is a flowchart of an example of a technique 2300 associated with generating remedial action recommendations for denied transactions using a two-stage conditioned inference architecture. The technique 2300 may be executed using computing devices, such as the systems, hardware, and software described with respect to FIGS. 1A-22. The technique 2300 may be performed, for example, by the AI system 1800 described above with reference to FIG. 18, using the process 1900 described above with reference to FIG. 19 and the confidence-based routing described above with reference to FIG. 20. The technique 2300 may be performed by executing a machine-readable program or other computer-executable instructions, such as routines, instructions, programs, or other code. The steps, or operations, of the technique 2300, or another technique, method, process, or algorithm described in connection with the implementations disclosed herein, may be implemented directly in hardware, firmware, software executed by hardware, circuitry, or a combination thereof.

For simplicity of explanation, the technique 2300 is depicted and described herein as a series of steps or operations. However, the steps or operations of the technique 2300 may occur in various orders and/or concurrently. Additionally, other steps or operations not presented and described herein may be used. Furthermore, not all illustrated steps or operations may be needed to implement a technique in accordance with the disclosed subject matter.

At step 2302, the technique 2300 includes generating a unified context representation for a denied transaction. For example, the technique 2300 may include transforming structured transaction fields received from a transaction processing system and unstructured text data received from at least one additional data source according to a unified data schema to generate a unified context representation for the denied transaction. The data processing component 112 shown in FIG. 1A, or a data processing component within the AI system 1800 shown in FIG. 18, may perform transformation operations that map the structured transaction fields from their native schema representations and the unstructured text data from its native format into the unified data schema, producing the unified context representation as output. The unified context representation may be stored in the database component 1804 shown in FIG. 18. In some implementations, the structured transaction fields may include at least one of a denial reason code, a transaction identifier, a timestamp, or a party identifier. In some implementations, the structured transaction fields may be obtained from an electronic data interchange (EDI) message received by the communication component 1814 shown in FIG. 18. The unstructured text data may include at least one of call notes, correspondence records, or policy documents associated with the denied transaction. In some implementations, the prompt engine 1806 shown in FIG. 18 may perform a similarity search over a corpus of previously resolved transactions stored in the database component 1804 shown in FIG. 18 to identify historical transaction examples sharing characteristics with the current denied transaction, and may incorporate one or more of the identified historical transaction examples into the unified context representation as few-shot conditioning examples. In some implementations, the prompt engine 1806 shown in FIG. 18 may retrieve relevant passages from payer policy documents stored in the database component 1804 shown in FIG. 18 using a retrieval-augmented generation technique in which the policy documents are indexed as vector embeddings and relevant passages are retrieved at runtime based on semantic similarity to the claim context.

In some implementations, prior to constructing the first prompt at step 2304, the technique 2300 may further include de-identifying sensitive data within the unified context representation by replacing sensitive data elements with surrogate identifiers. The sensitive data elements may include patient names, dates of birth, social security numbers, medical record numbers, or other personally identifiable information or protected health information. The surrogate identifiers may be generated using tokenization, hashing, or random substitution techniques. By de-identifying the sensitive data prior to constructing the first prompt, the technique 2300 may facilitate processing by the artificial intelligence component without exposing sensitive data elements to the large language model.

At step 2304, the technique 2300 includes constructing a first prompt. For example, the technique 2300 may include constructing a first prompt comprising the unified context representation. The prompt engine 1806 shown in FIG. 18 may construct the first prompt by retrieving the unified context representation from the database component 1804 shown in FIG. 18 and assembling the structured transaction fields and the unstructured text data into a prompt structure that the artificial intelligence component may process. In some implementations, step 2304 may include formatting the unified context representation according to a first-stage prompt template that specifies the structure, instructions, and output format for the first inference operation.

At step 2306, the technique 2300 includes providing the first prompt to an artificial intelligence component. For example, the technique 2300 may include providing the first prompt as input to an artificial intelligence component comprising at least one large language model, wherein the artificial intelligence component processes the first prompt and generates a first structured output comprising a predicted action category selected from a predefined taxonomy of action categories, a first confidence score, and a first natural-language justification explaining why the predicted action category was selected. The ML component 1808 shown in FIG. 18 may process the first prompt constructed at step 2304 and may generate the first structured output in response. Because the first-stage inference at step 2306 operates over the predefined taxonomy of action categories rather than the full space of action codes, the output dimensionality of the first-stage classification is limited to the number of categories in the taxonomy.

In some implementations, the first structured output may be formatted as a machine-readable data object comprising key-value pairs, such as a JavaScript Object Notation (JSON) object. The first confidence score may represent an assessment, by the artificial intelligence component, of the probability that the predicted action category is the correct classification for the denied transaction within the predefined taxonomy. The first natural-language justification may provide a human-readable and machine-parseable explanation of the inference that led to the category selection, identifying which elements of the unified context representation the artificial intelligence component weighted most heavily in generating the classification. The first natural-language justification serves a dual function in the architecture: it provides an auditable record of the first-stage inference, and it serves as a conditioning input to the second-stage inference at steps 2308 through 2312.

In some implementations, the technique 2300 may further include logging the first structured output to a governance registry, the governance registry configured to track model performance metrics over time. Each record logged to the governance registry may include the prompt submitted to the artificial intelligence component, the output received, the model version used, and the prompt template version used.

At step 2308, the technique 2300 includes selecting a category-specific prompt template. For example, the technique 2300 may include selecting, based on the predicted action category, a category-specific prompt template from a plurality of category-specific prompt templates stored in a database component, wherein each category-specific prompt template corresponds to a respective action category in the predefined taxonomy of action categories. The prompt engine 1806 shown in FIG. 18 may select the category-specific prompt template by using the predicted action category as a lookup key to retrieve the corresponding template from the plurality of category-specific prompt templates stored in the database component 1804 shown in FIG. 18. The template selection at step 2308 constitutes a component of the inter-stage conditioning mechanism of the two-stage architecture, constraining the second-stage inference along two dimensions: the output dimension, by directing the artificial intelligence component toward the set of action codes associated with the predicted action category rather than the full action code space, and the instruction dimension, by providing category-specific processing directives that focus the second-stage inference on the features and distinctions most relevant to the selected category. In some implementations, the category-specific prompt template may include domain-specific instructions directing the artificial intelligence component toward action codes particular to the selected category. For example, a category-specific prompt template corresponding to a documentation submission category may include instructions directing the artificial intelligence component to evaluate which specific documents are absent or insufficient based on the context data, whereas a category-specific prompt template corresponding to a claim correction category may include instructions directing the artificial intelligence component to identify which specific transaction fields contain errors.

At step 2310, the technique 2300 includes populating the category-specific prompt template to construct a second prompt. For example, the technique 2300 may include populating the selected category-specific prompt template with the unified context representation, the predicted action category, and the first natural-language justification to construct a second prompt. The prompt engine 1806 shown in FIG. 18 may populate the selected category-specific prompt template by inserting the unified context representation into a context section of the template, inserting the predicted action category and the first natural-language justification into a conditioning section of the template, and inserting instructions that constrain the output of the artificial intelligence component to the set of action codes associated with the predicted action category. In some implementations, the second prompt may further include the first confidence score from the first structured output. By including the first natural-language justification in the second prompt, step 2310 grounds the second-stage inference in the specific features of the unified context representation that the first stage identified as most relevant, providing the artificial intelligence component with an explicit conditioning signal for the fine-grained action code classification.

At step 2312, the technique 2300 includes providing the second prompt to the artificial intelligence component. For example, the technique 2300 may include providing the second prompt as input to the artificial intelligence component, wherein the artificial intelligence component processes the second prompt and generates a second structured output comprising a recommended action code selected from a set of action codes associated with the predicted action category, a second confidence score, and a second natural-language justification. The ML component 1808 shown in FIG. 18 may process the second prompt constructed at step 2310 and may generate the second structured output in response. Because the set of valid action codes is constrained to those associated with the predicted action category selected at step 2306, the inference at step 2312 operates over a reduced output space relative to a single-stage architecture that would predict across the full set of all action codes in all categories. This output space reduction, combined with the conditioning provided by the first natural-language justification and the category-specific instructions included in the second prompt, may facilitate improved classification accuracy at the second stage by permitting the artificial intelligence component to focus its inference on distinguishing among a smaller set of action code candidates.

In some implementations, the second structured output may be formatted as a machine-readable data object comprising key-value pairs, such as a JSON object. The recommended action code may specify a remedial step to be taken for the denied transaction within the predicted action category. The second confidence score may represent an assessment, by the artificial intelligence component, of the probability that the recommended action code is the correct fine-grained classification for the denied transaction within the set of action codes associated with the predicted action category. The second natural-language justification may provide a human-readable and machine-parseable explanation of the inference that led to the action code selection, grounded in both the unified context representation and the first natural-language justification from the first structured output. Because the second natural-language justification references the first natural-language justification, the two justifications together form a chain-of-inference record that traces the classification from the coarse-grained category level through the fine-grained action code level, providing a machine-parseable audit trail of the complete two-stage inference.

In some implementations, the technique 2300 may further include logging the second structured output to the governance registry. By logging both the first structured output and the second structured output to the governance registry, the technique 2300 may facilitate tracking model performance metrics over time, including accuracy rates, confidence calibration, override frequency, resolution outcomes, and potential distributional shifts in the types of claims or denials being processed.

In some implementations, the artificial intelligence component may comprise a single large language model that processes both the first prompt at step 2306 and the second prompt at step 2312. In some implementations, the artificial intelligence component may comprise a first large language model that processes the first prompt and a second large language model that processes the second prompt, where the first large language model and the second large language model may differ in architecture, capacity, or optimization characteristics. In some implementations, the artificial intelligence component may be hosted within a secure computing environment that enforces data residency and access control policies, such that sensitive data within the unified context representation does not leave a controlled infrastructure boundary during processing at step 2306 or step 2312.

In some implementations, after obtaining the second structured output at step 2312, the technique 2300 may further include re-identifying the sensitive data by replacing the surrogate identifiers with the corresponding sensitive data elements. The re-identification operation may restore the original sensitive data elements in the second structured output prior to providing the recommended action code and the second natural-language justification to the downstream processing component at step 2314, facilitating that the recommendation references actual patient, provider, and carrier identifiers rather than surrogate values.

At step 2314, the technique 2300 includes providing the recommended action code and natural-language justification to a downstream processing component. For example, the technique 2300 may include providing the recommended action code and the second natural-language justification to a downstream processing component. The downstream processing component may be, be similar to, include, or be included in the downstream processing component 2012 described above with reference to FIG. 20. The downstream processing component may receive the recommended action code and the second natural-language justification and may initiate further processing based on the recommendation.

In some implementations, the technique 2300 may further include determining that the second confidence score satisfies a confidence threshold, and, responsive to the determining, automatically initiating execution of the recommended action code by the downstream processing component. The confidence-based routing may be performed as described above with reference to the decision step 2010 and the downstream processing component 2012 of FIG. 20. The downstream processing component may automatically initiate execution of the recommended action without human intervention when the second confidence score meets or exceeds the confidence threshold.

In some implementations, the technique 2300 may further include determining that the second confidence score does not satisfy a confidence threshold, and, responsive to the determining, routing the recommended action code and the second natural-language justification to a human review queue. The human review queue may be, be similar to, include, or be included in the human review queue 2016 described above with reference to FIG. 20. The human review queue may store the recommendation along with the associated context data for evaluation by a human reviewer through the interface component 1810 shown in FIG. 18 and the user device 1816 shown in FIG. 18.

In some implementations, the technique 2300 may further include receiving, from a human reviewer, an indication of whether the recommended action code was accepted or overridden. The human reviewer may access the recommendation through a graphical user interface presented on the user device 1816 shown in FIG. 18 by the interface component 1810 shown in FIG. 18, and may examine the recommended action code, the second confidence score, the second natural-language justification, and contextual information from the unified context representation. In some implementations, when the human reviewer overrides the recommended action code, the indication may further include an alternative action code selected by the human reviewer and a reason for the override.

In some implementations, the technique 2300 may further include storing the indication in a feedback data store associated with the denied transaction. The feedback data store may be, be similar to, include, or be included in the database component 1804 shown in FIG. 18. Storing the indication in the feedback data store in association with the denied transaction may create a record linking the claim context, the recommendation, and the human evaluation of the recommendation. The feedback component 1818 shown in FIG. 18 may capture and process the indication to facilitate continuous improvement of the AI system 1800 shown in FIG. 18.

In some implementations, the technique 2300 may further include obtaining a resolution outcome indicating whether the denied transaction was subsequently approved, partially approved, or written off, and storing the resolution outcome in association with the recommended action code. The resolution outcome may represent the eventual financial result of taking the recommended action (or an alternative action selected by a human reviewer). The feedback component 1818 shown in FIG. 18 may obtain the resolution outcome from external data sources, such as remittance data received through the communication component 1814 shown in FIG. 18, and may store the resolution outcome in the database component 1804 shown in FIG. 18 in association with the recommended action code, creating a record linking the claim context, the recommendation, and the financial result.

In some implementations, the technique 2300 may further include using the resolution outcome as a training signal to refine parameters of the artificial intelligence component. The ML training component 1820 shown in FIG. 18 may use the resolution outcome, along with adherence data from human reviewer indications and the associated claim contexts and recommendations, to adjust prompt templates stored in the database component 1804 shown in FIG. 18 or to fine-tune model weights within the ML component 1808 shown in FIG. 18. The training signal derived from resolution outcomes may facilitate continuous refinement of the two-stage conditioned inference architecture, improving the classification accuracy at steps 2306 and 2312 over time.

Some implementations include a method, comprising: transforming structured transaction fields received from a transaction processing system and unstructured text data received from at least one additional data source according to a unified data schema to generate a unified context representation for a denied transaction; constructing a first prompt comprising the unified context representation; providing the first prompt as input to an artificial intelligence component comprising at least one large language model, wherein the artificial intelligence component processes the first prompt and generates a first structured output comprising a predicted action category selected from a predefined taxonomy of action categories, a first confidence score, and a first natural-language justification explaining why the predicted action category was selected; selecting, based on the predicted action category, a category-specific prompt template from a plurality of category-specific prompt templates stored in a database component, wherein each category-specific prompt template corresponds to a respective action category in the predefined taxonomy of action categories; populating the selected category-specific prompt template with the unified context representation, the predicted action category, and the first natural-language justification to construct a second prompt; providing the second prompt as input to the artificial intelligence component, wherein the artificial intelligence component processes the second prompt and generates a second structured output comprising a recommended action code selected from a set of action codes associated with the predicted action category, a second confidence score, and a second natural-language justification; and providing the recommended action code and the second natural-language justification to a downstream processing component.

In some implementations, the category-specific prompt template includes domain-specific instructions directing the artificial intelligence component toward action codes particular to the selected category.

In some implementations, the method further comprises: determining that the second confidence score satisfies a confidence threshold; and responsive to the determining, automatically initiating execution of the recommended action code by the downstream processing component.

In some implementations, the method further comprises: determining that the second confidence score does not satisfy a confidence threshold; and responsive to the determining, routing the recommended action code and the second natural-language justification to a human review queue.

In some implementations, the method further comprises receiving, from a human reviewer, an indication of whether the recommended action code was accepted or overridden.

In some implementations, the method further comprises storing the indication in a feedback data store associated with the denied transaction.

In some implementations, the method further comprises: obtaining a resolution outcome indicating whether the denied transaction was subsequently approved, partially approved, or written off; and storing the resolution outcome in association with the recommended action code.

In some implementations, the method further comprises using the resolution outcome as a training signal to refine parameters of the artificial intelligence component.

In some implementations, the method further comprises: de-identifying, prior to constructing the first prompt, sensitive data within the unified context representation by replacing sensitive data elements with surrogate identifiers.

In some implementations, the method further comprises: re-identifying, after obtaining the second structured output, the sensitive data by replacing the surrogate identifiers with the sensitive data elements.

In some implementations, the method further comprises: logging the first structured output and the second structured output to a governance registry, the governance registry configured to track model performance metrics over time.

Some implementations include a non-transitory computer-readable medium storing instructions operable to cause one or more processors to perform operations comprising: transforming structured transaction fields received from a transaction processing system and unstructured text data received from at least one additional data source according to a unified data schema to generate a unified context representation for a denied transaction; constructing a first prompt comprising the unified context representation; providing the first prompt as input to an artificial intelligence component comprising at least one large language model, wherein the artificial intelligence component processes the first prompt and generates a first structured output comprising a predicted action category selected from a predefined taxonomy of action categories, a first confidence score, and a first natural-language justification explaining why the predicted action category was selected; selecting, based on the predicted action category, a category-specific prompt template from a plurality of category-specific prompt templates stored in a database component, wherein each category-specific prompt template corresponds to a respective action category in the predefined taxonomy of action categories; populating the selected category-specific prompt template with the unified context representation, the predicted action category, and the first natural-language justification to construct a second prompt; providing the second prompt as input to the artificial intelligence component, wherein the artificial intelligence component processes the second prompt and generates a second structured output comprising a recommended action code selected from a set of action codes associated with the predicted action category, a second confidence score, and a second natural-language justification; and providing the recommended action code and the second natural-language justification to a downstream processing component.

In some implementations, the first prompt further comprises one or more historical transaction examples retrieved via a similarity search over a corpus of previously resolved transactions.

In some implementations, the structured transaction fields are obtained from an electronic data interchange message.

In some implementations, the first structured output and the second structured output are each formatted as a machine-readable data object comprising key-value pairs.

In some implementations, the machine-readable data object is a JavaScript Object Notation (JSON) object.

Some implementations include a system, comprising: one or more memories; and one or more processors configured to execute instructions stored in the one or more memories to cause the system to: transform structured transaction fields received from a transaction processing system and unstructured text data received from at least one additional data source according to a unified data schema to generate a unified context representation for a denied transaction; construct a first prompt comprising the unified context representation; provide the first prompt as input to an artificial intelligence component comprising at least one large language model, wherein the artificial intelligence component processes the first prompt and generates a first structured output comprising a predicted action category selected from a predefined taxonomy of action categories, a first confidence score, and a first natural-language justification explaining why the predicted action category was selected; select, based on the predicted action category, a category-specific prompt template from a plurality of category-specific prompt templates stored in a database component, wherein each category-specific prompt template corresponds to a respective action category in the predefined taxonomy of action categories; populate the selected category-specific prompt template with the unified context representation, the predicted action category, and the first natural-language justification to construct a second prompt; provide the second prompt as input to the artificial intelligence component, wherein the artificial intelligence component processes the second prompt and generates a second structured output comprising a recommended action code selected from a set of action codes associated with the predicted action category, a second confidence score, and a second natural-language justification; and provide the recommended action code and the second natural-language justification to a downstream processing component.

In some implementations, the artificial intelligence component comprises a single large language model that processes both the first prompt and the second prompt.

In some implementations, the artificial intelligence component comprises a first large language model that processes the first prompt and a second large language model that processes the second prompt.

In some implementations, the artificial intelligence component is hosted within a secure computing environment that enforces data residency and access control policies.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

The adjectives "first," "second," "third," and so on are used for contextual distinction between two or more of the modified nouns in connection with a discussion and are not meant to be absolute modifiers that apply only to a certain respective node throughout the entire document. For example, a component may be referred to as a "first component" in connection with one discussion and may be referred to as a "second component" in connection with another discussion, or vice versa. Reference to a component, a computing device, a server, a client, an application, an apparatus, a device, a system, a computing system, or the like may include disclosure of the computing device, server, client, application, apparatus, device, system, computing system, or the like, respectively, being a node. For example, disclosure that a computing device is configured to receive information from a server also discloses that a first node is configured to receive information from a second node. Consistent with this disclosure, once a specific example is broadened in accordance with this disclosure (e.g., a computing device is configured to receive information from a server also discloses that a first node is configured to receive information from a second node), the broader example of the narrower example may be interpreted in the reverse, but in a broad open-ended way. In the example above where a computing device being configured to receive information from a server also discloses a first node being configured to receive information from a second node, "first node" may refer to a first computing device, a first server, a first client, a first application, a first apparatus, a first device, a first system, a first computing system, or the like, configured to receive the information from a second node; and "second node" may refer to a second computing device, a second server, a second client, a second application, a second apparatus, a second device, a second system, a second computing system, or the like.

As used herein, unless explicitly stated otherwise, any term specified in the singular may include its plural version. For example, "a computer that stores data and runs software," may include a single computer that stores data and runs software or two computers—a first computer that stores data and a second computer that runs software. Also "a computer that stores data and runs software," may include multiple computers that together stored data and run software. At least one of the multiple computers stores data, and at least one of the multiple computers runs software.

As used herein, the term "computer-readable medium" encompasses one or more computer readable media. A computer-readable medium may include any storage unit (or multiple storage units) that store data or instructions that are readable by a processing system. A computer-readable medium may include, for example, at least one of a data repository, a data storage unit, a computer memory, a hard drive, a disk, or a random access memory. A computer-readable medium may include a single computer-readable medium or multiple computer-readable media. A computer-readable medium may be a transitory computer-readable medium or a non-transitory computer-readable medium.

As used herein, the term "engine" may include software, hardware, or a combination of software and hardware. An engine may be implemented using software stored in the memory subsystem. In some implementations, an engine may be hard-wired into the processing system. In some cases, an engine includes a combination of software stored in the memory subsystem and hardware that is hard-wired into the processing system.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:

transforming structured transaction fields received from a transaction processing system and unstructured text data received from at least one additional data source according to a unified data schema to generate a unified context representation for a denied transaction;

constructing a first prompt comprising the unified context representation;

providing the first prompt as input to an artificial intelligence component comprising at least one large language model, wherein the artificial intelligence component processes the first prompt and generates a first structured output comprising a predicted action category selected from a predefined taxonomy of action categories, a first confidence score, and a first natural-language justification explaining why the predicted action category was selected;

selecting, based on the predicted action category, a category-specific prompt template from a plurality of category-specific prompt templates stored in a database component, wherein each category-specific prompt template corresponds to a respective action category in the predefined taxonomy of action categories;

populating the selected category-specific prompt template with the unified context representation, the predicted action category, and the first natural-language justification to construct a second prompt;

providing the second prompt as input to the artificial intelligence component, wherein the artificial intelligence component processes the second prompt and generates a second structured output comprising a recommended action code selected from a set of action codes associated with the predicted action category, a second confidence score, and a second natural-language justification; and providing the recommended action code and the second natural-language justification to a downstream processing component.

2. The method of claim 1, wherein the category-specific prompt template includes domain-specific instructions directing the artificial intelligence component toward action codes particular to the selected category.

3. The method of claim 1, further comprising:

determining that the second confidence score satisfies a confidence threshold; and responsive to the determining, automatically initiating execution of the recommended action code by the downstream processing component.

4. The method of claim 1, further comprising:

determining that the second confidence score does not satisfy a confidence threshold; and responsive to the determining, routing the recommended action code and the second natural-language justification to a human review queue.

5. The method of claim 4, further comprising receiving, from a human reviewer, an indication of whether the recommended action code was accepted or overridden.

6. The method of claim 5, further comprising storing the indication in a feedback data store associated with the denied transaction.

7. The method of claim 1, further comprising:

obtaining a resolution outcome indicating whether the denied transaction was subsequently approved, partially approved, or written off, and storing the resolution outcome in association with the recommended action code.

8. The method of claim 7, further comprising using the resolution outcome as a training signal to refine parameters of the artificial intelligence component.

9. The method of claim 1, further comprising:

de-identifying sensitive data within the unified context representation prior to constructing the first prompt by replacing sensitive data elements with surrogate identifiers.

10. The method of claim 9, further comprising:

re-identifying, after obtaining the second structured output, the sensitive data by replacing the surrogate identifiers with the sensitive data elements.

11. The method of claim 1, further comprising:

logging the first structured output and the second structured output to a governance registry, the governance registry configured to track model performance metrics over time.

12. A non-transitory computer-readable medium storing instructions operable to cause one or more processors to perform operations comprising:

transforming structured transaction fields received from a transaction processing system and unstructured text data received from at least one additional data source according to a unified data schema to generate a unified context representation for a denied transaction;

constructing a first prompt comprising the unified context representation;

providing the first prompt as input to an artificial intelligence component comprising at least one large language model, wherein the artificial intelligence component processes the first prompt and generates a first structured output comprising a predicted action category selected from a predefined taxonomy of action categories, a first confidence score, and a first natural-language justification explaining why the predicted action category was selected;

selecting, based on the predicted action category, a category-specific prompt template from a plurality of category-specific prompt templates stored in a database component, wherein each category-specific prompt template corresponds to a respective action category in the predefined taxonomy of action categories;

populating the selected category-specific prompt template with the unified context representation, the predicted action category, and the first natural-language justification to construct a second prompt;

providing the second prompt as input to the artificial intelligence component, wherein the artificial intelligence component processes the second prompt and generates a second structured output comprising a recommended action code selected from a set of action codes associated with the predicted action category, a second confidence score, and a second natural-language justification; and providing the recommended action code and the second natural-language justification to a downstream processing component.

13. The non-transitory computer-readable medium of claim 12, wherein the first prompt further comprises one or more historical transaction examples retrieved via a similarity search over a corpus of previously resolved transactions.

14. The non-transitory computer-readable medium of claim 12, wherein the structured transaction fields are obtained from an electronic data interchange message.

15. The non-transitory computer-readable medium of claim 12, wherein the first structured output and the second structured output are each formatted as a machine-readable data object comprising key-value pairs.

16. The non-transitory computer-readable medium of claim 15, wherein the machine-readable data object is a JavaScript object notation (JSON) object.

17. A system, comprising:

one or more memories; and one or more processors configured to execute instructions stored in the one or more memories to cause the system to:

transform structured transaction fields received from a transaction processing system and unstructured text data received from at least one additional data source according to a unified data schema to generate a unified context representation for a denied transaction;

construct a first prompt comprising the unified context representation;

provide the first prompt as input to an artificial intelligence component comprising at least one large language model, wherein the artificial intelligence component processes the first prompt and generates a first structured output comprising a predicted action category selected from a predefined taxonomy of action categories, a first confidence score, and a first natural-language justification explaining why the predicted action category was selected;

select, based on the predicted action category, a category-specific prompt template from a plurality of category-specific prompt templates stored in a database component, wherein each category-specific prompt template corresponds to a respective action category in the predefined taxonomy of action categories;

populate the selected category-specific prompt template with the unified context representation, the predicted action category, and the first natural-language justification to construct a second prompt;

provide the second prompt as input to the artificial intelligence component, wherein the artificial intelligence component processes the second prompt and generates a second structured output comprising a recommended action code selected from a set of action codes associated with the predicted action category, a second confidence score, and a second natural-language justification; and provide the recommended action code and the second natural-language justification to a downstream processing component.

18. The system of claim 17, wherein the artificial intelligence component comprises a single large language model that processes both the first prompt and the second prompt.

19. The system of claim 17, wherein the artificial intelligence component comprises a first large language model that processes the first prompt and a second large language model that processes the second prompt.

20. The system of claim 17, wherein the artificial intelligence component is hosted within a secure computing environment that enforces data residency and access control policies.

* * * * *